(12) United States Patent
Park et al.

(10) Patent No.: US 8,934,440 B2
(45) Date of Patent: Jan. 13, 2015

(54) METHOD AND DEVICE FOR TRANSMITTING RESPONSE INFORMATION, AND RESOURCE ALLOCATION FOR RESPONSE INFORMATION TRANSMISSION ACCORDING TO TRANSMISSION CONDITIONS IN A WIRELESS COMMUNICATION SYSTEM

(75) Inventors: Donghyun Park, Seoul (KR); Kibum Kwon, Seoul (KR)

(73) Assignee: Pantech Co., Ltd., Seoul (KR)

( * ) Notice: Subject to any disclaimer, the term of this patent is extended or adjusted under 35 U.S.C. 154(b) by 0 days.

(21) Appl. No.: 13/978,524

(22) PCT Filed: Jan. 6, 2012

(86) PCT No.: PCT/KR2012/000180
§ 371 (c)(1),
(2), (4) Date: Jul. 5, 2013

(87) PCT Pub. No.: WO2012/093906
PCT Pub. Date: Jul. 12, 2012

(65) Prior Publication Data
US 2013/0286990 A1    Oct. 31, 2013

(30) Foreign Application Priority Data

Jan. 7, 2011  (KR) ........................ 10-2011-0001992
Jan. 7, 2011  (KR) ........................ 10-2011-0001996

(51) Int. Cl.
*H04W 4/00* (2009.01)
*H04W 72/04* (2009.01)
*H04L 1/18* (2006.01)
*H04L 5/00* (2006.01)

(52) U.S. Cl.
CPC ............. *H04W 72/04* (2013.01); *H04L 1/1861* (2013.01); *H04L 1/1896* (2013.01); *H04L 5/001* (2013.01);

(Continued)

(58) Field of Classification Search
USPC .................................................. 370/310–349
See application file for complete search history.

(56) References Cited

U.S. PATENT DOCUMENTS 8,107,426 B2 *  1/2012  Cho et al. ....................... 370/329
8,295,155 B2 * 10/2012  Cho et al. ....................... 370/209

(Continued)

FOREIGN PATENT DOCUMENTS

| KR | 10-0881967     | 2/2009  |
|----|----------------|---------|
| KR | 10-2009-0030562| 3/2009  |
| KR | 10-0984819     | 10/2010 |

OTHER PUBLICATIONS

International Search Report issued to International Application No. PCT/KR2012/000180 dated Sep. 14, 2012.

*Primary Examiner* — Kwang B Yao
*Assistant Examiner* — Juvena Loo
(74) *Attorney, Agent, or Firm* — H.C. Park & Associates, PLC

(57) ABSTRACT

A method for allocating a resource for response information transmission and transmitting according to transmission conditions in a wireless communication system according to the present invention comprises the steps of: setting a specific field value of a control channel depending on the allocation method by determining a transmission method or transmission quantity of data to be transmitted to a user's terminal from a data channel, a method of generating response information of the data according to the transmission quantity or transmission method, and an allocation method for indicating the response information resource; transmitting the data channel including the transmitting data and the control channel to the user's terminal; confirming the response information, which is transmitted from a resource allocated by the allocation method, for the data transmitted from the user's terminal; and determining whether the transmitted data area retransmitted according to the confirmed response information.

14 Claims, 25 Drawing Sheets

(52) U.S. Cl.
    CPC ............ *H04L 5/0055* (2013.01); *H04L 5/0094* (2013.01); *H04W 72/042* (2013.01); *H04L 1/1854* (2013.01); *H04L 5/0078* (2013.01)
    USPC ........................................................ 370/329

(56) References Cited

U.S. PATENT DOCUMENTS

| | | | |
|---|---|---|---|
| 8,472,471 B2 * | 6/2013 | Yang et al. .................... | 370/464 |
| 8,630,240 B2 * | 1/2014 | Shen et al. .................... | 370/329 |
| 2007/0183384 A1 | 8/2007 | Kwak et al. | |
| 2008/0273513 A1 * | 11/2008 | Montojo et al. .............. | 370/342 |
| 2008/0293424 A1 * | 11/2008 | Cho et al. ...................... | 455/450 |
| 2009/0080397 A1 | 3/2009 | Kim et al. | |
| 2011/0002309 A1 * | 1/2011 | Park et al. .................... | 370/335 |
| 2011/0032897 A1 * | 2/2011 | Ihm et al. ...................... | 370/329 |
| 2011/0194500 A1 * | 8/2011 | Kim et al. ...................... | 370/328 |
| 2012/0236812 A1 * | 9/2012 | Chen et al. .................... | 370/329 |
| 2012/0327885 A1 * | 12/2012 | Chung et al. .................. | 370/329 |

* cited by examiner

METHOD AND DEVICE FOR TRANSMITTING RESPONSE INFORMATION, AND RESOURCE ALLOCATION FOR RESPONSE INFORMATION TRANSMISSION ACCORDING TO TRANSMISSION CONDITIONS IN A WIRELESS COMMUNICATION SYSTEM

CROSS-REFERENCE TO RELATED APPLICATION

This application is the National Stage Entry of International Application No. PCT/KR2012/000180, filed on Jan. 6, 2012, and claims priority from and the benefit of Korean Patent Application Nos. 10-2011-0001992, filed on Jan. 7, 2011 and 10-2011-0001996, filed on Jan. 7, 2011, all of which are hereby incorporated by reference for all purposes as if fully set forth herein.

BACKGROUND

1. Field

The present invention relates to a method and device for allocating a resource required for transmitting response information with respect to a signal including control information or data information transmitted over a component carrier in a wireless communication system using a single or a plurality of component carriers (Component Carrier, CC).

2. Discussion of the Background

As communication systems have developed, various wireless terminals have been utilized by consumers such as companies and individuals.

Current mobile communication systems, for example, 3GPP, LTE (Long Term Evolution), LTE-A (LTE-Advanced), and the like, may be high capacity communication systems capable of transmitting and receiving various types of data such as image data, wireless data, and the like, beyond providing a sound-based service. Accordingly, there is a desire for a technology that transmits high capacity data, which is comparable to a wired communication network. Also, the system is required to include an appropriate error detection scheme that minimizes loss of information and increases transmission efficiency of the system so as to enhance performance of the system.

Also, there are provided various technologies for determining whether transmitted and received information is accurately received. As a communication system has developed, a technology that flexibly and extensively determines transmission and reception information has been required. In particular, when a plurality of antennas are used or various carriers are used, an amount of data to be transmitted and received increases. Accordingly, an amount of response information required for a process of determining each piece of data and sending (transmitting) the determined result increases. Therefore, there is a desire for a method which effectively allocates a resource where response information is to be included.

SUMMARY

Therefore, the present invention has been made in view of the above-mentioned problems, and an aspect of the present invention is to provide a method of effectively allocating a resource required for transmitting response information based on a transmission environment in a wireless communication system, and a user equipment and a base station that transceives a signal based on the allocation method.

In accordance with an aspect of the present invention, there is provided a method of allocating a resource for response information transmission based on a transmission environment in a wireless communication system, the method including: determining a transmission scheme or an amount of data to be transmitted from a data channel to a user equipment, determining, based on the transmission scheme or the amount of data to be transmitted, a scheme of generating response information with respect to the data and an allocation scheme indicating a response information resource, and setting a value of a predetermined field of a control channel based on the allocation scheme; transmitting, to the user equipment, the control channel and the data channel including the data to be transmitted; determining response information transmitted from the user equipment with respect to the transmitted data in the resource allocated based on the allocation scheme; and determining whether to retransmit the transmitted data based on the determined response information, wherein the allocation scheme corresponds to one of an implicit allocation scheme that implicitly performs calculation in a first field of the control channel and an explicit allocation scheme that explicitly performs calculation in a second field of the control channel.

In accordance with another aspect of the present invention, there is provided a method of allocating a resource for response information transmission based on a transmission environment, and performing transmission in a wireless communication system, the method including: receiving, by a user equipment from a base station, a control channel and a data channel in which the control channel instructs data transmission; determining a transmission scheme or an amount of received data, determining, based on the transmission scheme or the amount of received data, a scheme of generating response information with respect to the data and an allocation scheme indicating a response information resource, and calculating response information resource indication information using a value of a predetermined field of the control channel based on the allocation scheme; and generating the response information resource based on the scheme of generating the response information, and including the generated response information in a resource indicated by the calculated indication information for transmission to the base station, wherein the allocation scheme corresponds to one of an implicit allocation scheme that implicitly performs calculation in a first field of the control channel and an explicit allocation scheme that explicitly performs calculation in a second field of the control channel.

In accordance with another aspect of the present invention, there is provided a base station, including: a response information resource determining unit to determine a transmission scheme or an amount of data to be transmitted from a data channel to a user equipment, to determine, based on the transmission scheme or the amount of data to be transmitted, a scheme of generating response information with respect to the data and an allocation scheme indicating a response information resource; a controller to set a value of a predetermined field of a control channel based on the determined allocation scheme; and a transceiving unit to transmit the control channel and a data channel including data to be transmitted to the user equipment, and to receive, from the user equipment, response information transmitted with respect to the transmitted data in a resource allocated based on the allocation scheme, wherein the controller determines the transmitted response information and determines whether to retransmit the transmitted data based on the determined response information, and the allocation scheme corresponds to one of an implicit allocation scheme that implicitly performs calculation in a first field of the control channel and an explicit allocation scheme that explicitly performs calculation in a second field of the control channel, and the first field is applied to the calculation of an allocation resource of the control channel and the second field is applied to the calculation of power control information of the control channel.

In accordance with another aspect of the present invention, there is provided a user equipment, including: a transceiving unit to receive, by the user equipment from a base station, a control channel and a data channel in which the control channel instructs data transmission; a response information resource calculator to determine a transmission scheme or an amount of received data, to determine, based on the transmission scheme or the amount of received data, a scheme of generating response information with respect to the data and an allocation scheme to indicate a response information resource, and to calculate response information resource indication information using a value of a predetermined field of the control channel based on the allocation scheme; and a controller to generate the response information resource based on the scheme of generating the response information, and to include the generated response information in a resource indicated by the calculated indication information for generation of a control channel, wherein the controller controls the transceiving unit to transmit the control channel to the base station, the allocation scheme corresponds to one of an implicit allocation scheme that implicitly performs calculation in a first field of the control channel or an explicit allocation scheme that explicitly performs calculation in a second field of the control channel, and the first field is applied to the calculation of an allocation resource of the control channel and the second field is applied to the calculation of power control information of the control channel.

DETAILED DESCRIPTION OF THE ILLUSTRATED EMBODIMENTS

Figure 1:
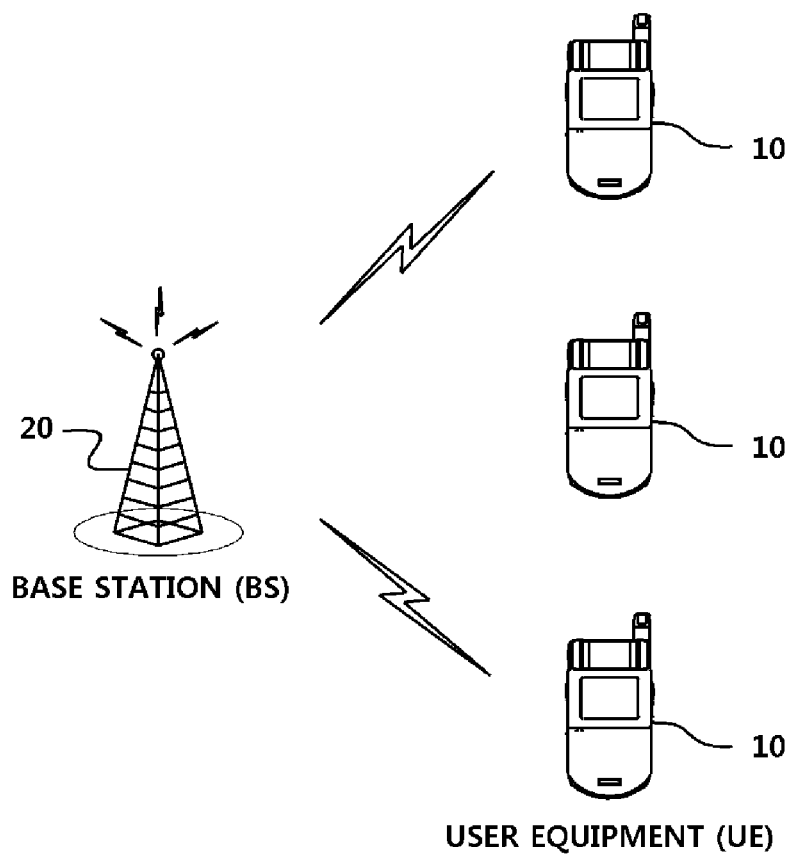
FIG. 1 illustrates a wireless communication system according to embodiments of the present invention.

Hereinafter, embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

FIG. 1 illustrates a wireless communication system according to embodiments of the present invention.

The wireless communication system may be widely installed so as to provide various communication services, such as a voice service, packet data, and the like.

Referring to FIG. 1, the wireless communication system may include a User Equipment (UE) 10 and a Base Station (BS or eNB) 20. Throughout the specifications, the user equipment 10 may be an inclusive concept indicating a user terminal utilized in wireless communication, including a UE (User Equipment) in WCDMA, LTE, HSPA, and the like, and an MS (Mobile station), a UT (User Terminal), an SS (Subscriber Station), a wireless device, and the like in GSM.

The base station 20 or a cell may refer to a fixed station where communication with the user equipment 10 is performed, and may also be referred to as a Node-B, an eNB (evolved Node-B), a BTS (Base Transceiver System), an Access Point, a relay node, and the like.

That is, the base station 20 or the cell may be construed as an inclusive concept indicating a portion of an area covered by a BSC (Base Station Controller) in CDMA, a NodeB in WCDMA, and the like, and the concept may include various coverage areas, such as a megacell, a macrocell, a microcell, a picocell, a femtocell, a communication range of a relay node, and the like.

In the specifications, the user equipment 10 and the base station 20 are used as two inclusive transceiving subjects to embody the technology and technical concepts described in the specifications, and may not be limited to a predetermined term or word.

In the specifications, the user equipment 10 and the base station 20 are used as two inclusive transceiving subjects to embody the technology and technical concepts described in the specifications, and may not be limited to a predetermined term or word. The user equipment 10 and the base station 20 are used as two (Uplink or Downlink) inclusive transceiving subjects to embody the technology and technical concepts described in the present invention, and may not be limited to a predetermined term or word. Here, the UL (Uplink) refers to a scheme of performing transmission and reception of data by the user equipment 10 with respect to the base station 20, and the DL (Downlink) refers to a scheme of performing transmission and reception of data by the base station 20 with respect to the user equipment 10.

The wireless communication system may utilize varied multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like.

Uplink transmission and downlink transmission may be performed based on a TDD (Time Division Duplex) scheme that performs transmission based on different times, or based on an FDD (Frequency Division Duplex) scheme that performs transmission based on different frequencies.

An embodiment of the present invention may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. Embodiments of the present invention may not be limited to a specific wireless communication field, and may be applicable to all technical fields to which a technical idea of the present invention is applicable.

In LTE, a standard may be developed by forming an uplink (UL) and a downlink (DL) based on a single carrier or a pair of carriers. The uplink and the downlink may transmit control information through a control channel, such as a PDCCH (Physical Downlink Control CHannel), PCFICH (Physical Control Format Indicator CHannel), PHICH (Physical Hybrid ARQ Indicator CHannel), PUCCH (Physical Uplink Control CHannel), and the like, and may be configured as a data channel, such as PDSCH (Physical Downlink Shared CHannel), PUSCH (Physical Uplink Shared CHannel), and the like, so as to transmit data.

LTE uses a standard based on a single carrier as a base and has discussed coupling of a few bands having a bandwidth of 20 MHz or less, whereas LTE-A has discussed a to band of a component carrier having a bandwidth of 20 MHz or more. LTE-A has discussed a multiple-carrier aggregation by taking backward compatibility into consideration based on the base standard of LTE. In an uplink and a downlink, five or more carriers are taken into consideration. The important issue in the discussion of the carrier aggregation may be how to extend a control channel and how to form a data channel, as the number of carriers increases. In the uplink and the downlink, when one or more carriers or a pair of carriers correspond to an anchor carrier, a primary cell, a serving cell, or a special cell, and there may exist a carrier that may access a UE in an initial stage and may receive security and authentication information, and may be controlled with respect to a multiple-carrier aggregation.

With respect to the carrier aggregation, uplink ACK/NACK (ACKnowledgement/Negative ACKnowledgement) transmission and uplink channel information transmission including CQI (Channel Quality Indicator, hereinafter referred to as "CQI"), PMI (Precoding Matrix Indicators, hereinafter referred to as "PMI"), and RI (Rank Indicator, hereinafter referred to as "RI") are to be taken into consideration among varied matters to be considered associated with designing of a control channel.

In LTE-A, backward compatibility of the 3GPP LTE 8 Rel. is basically taken into consideration to form a carrier aggregation. CQI/PMI/RI information determined to be a standard in LTE Rel-8 may be transmitted through an uplink control channel such as PUCCH (Physical Uplink Control Channel) and PUSCH (Physical Uplink Shared Channel).

In the case of the carrier aggregation in LTE-A, a plurality of component carriers exist and an amount of information transmitted through a control channel of an uplink increases based on a number of the carriers and thus, resource allocation performed by configuring a resource block group for each carrier may be inefficient. Particularly, in the case of the carrier aggregation in LTE-A, there may be an asymmetric situation in which a number of uplink carriers is different from a number of downlink carriers. When an amount of information transmitted through a control channel of the uplink increases based on a number of carriers, resource allocation performed by configuring a resource block group for each carrier may be more inefficient.

The wireless communication system according to an embodiment of the present invention may support an uplink and/or downlink HARQ, and may use a CQI (channel quality indicator) for link adaptation. Also, a multiple access scheme for downlink transmission and a multiple access scheme for uplink transmission may be different from each other. For example, a downlink may use OFDMA (Orthogonal Frequency Division Multiple Access) and an uplink may use SC-FDMA (Single Carrier-Frequency Division Multiple Access).

Layers of a radio interface protocol between a user equipment and a network may be distinguished as a first layer (L1), a second layer (L2), and a third layer (L3), based on three lower layers of a well-known Open System Interconnection (OSI) model in a communication system, and a physical layer of the first layer may provide an information transfer service using a physical channel.

An embodiment of the present invention may be applied to a component carrier aggregation (hereinafter "CA"). The CA refers to an environment where a base station and a user equipment transmit and receive a signal using a plurality of component carriers. The plurality of component carriers may be adjacent to one another, or may not be adjacent to one another since a frequency band is spaced apart from one another. Also, a downlink component carrier and an uplink component carrier exist independently and thus, a number of downlink component carriers and a number of uplink component carriers may be the same as or different from one another. The plurality of component carriers may include at least one primary component carrier (PCC) and at least one secondary component carrier (SCC) which is different from the PCC.

Figure 2:
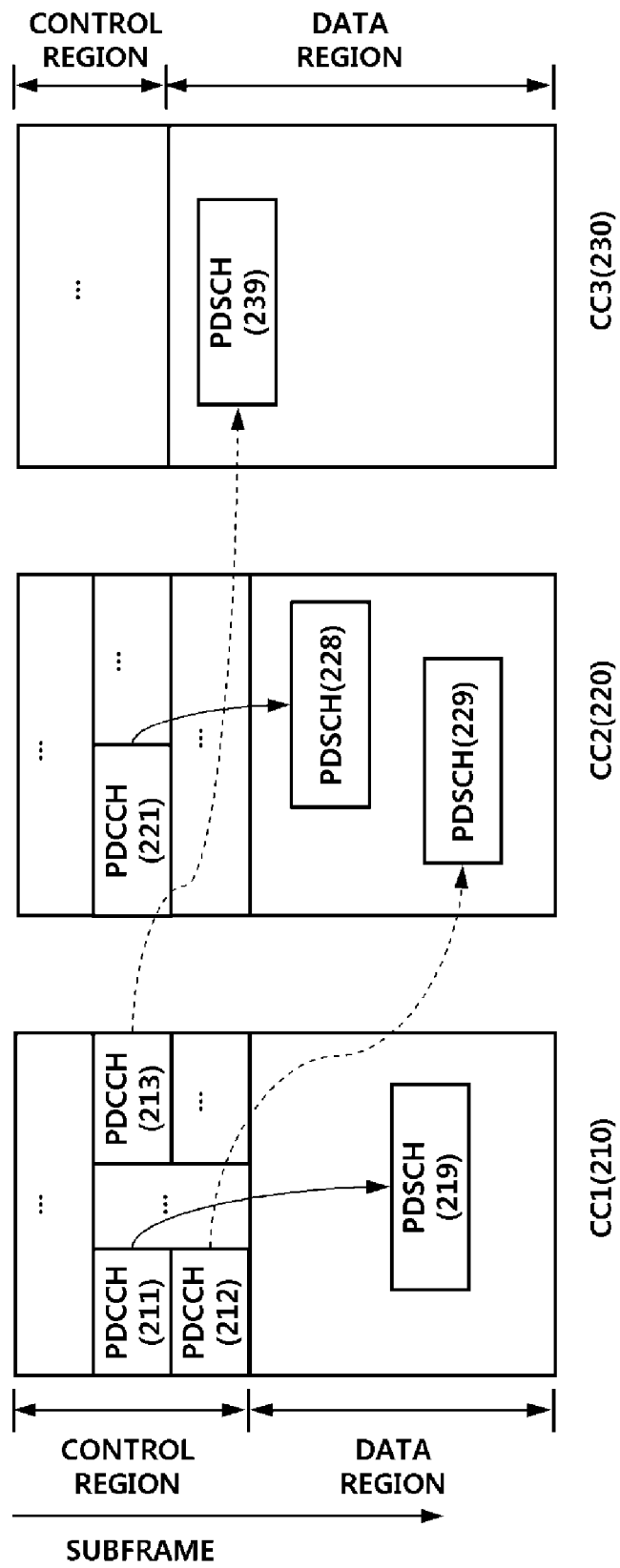
FIG. 2 is a diagram illustrating the case in which a plurality of component carriers are used according to an embodiment of the present invention.

FIG. 2 illustrates the case in which a plurality of component carriers is used according to an embodiment of the present invention. FIG. 2 shows cross carrier scheduling with respect to a plurality of component carriers of which control information and data information independently exist for each component carrier, and non-cross carrier scheduling. A first component carrier CC1 210, a second component carrier CC2 220, and a third component carrier CC3 230 are illustrated.

In a control region of the CC1 210, respective PDCCHs (Physical Dedicated Control Channel) 211, 212, and 213 exist. The PDCCH 211 corresponds to control information associated with a PDSCH 219 of a data region of the CC1 210, the PDCCH 212 corresponds to control information associated with a PDSCH 229 of a data region of the CC2 220, and the PDCCH 213 corresponds to control information associated with a PDSCH 239 of a data region of the CC3 230. In the same manner, the PDCCH 221 corresponds to control information associated with a PDSCH 228. Here, the PDCCH 211 and the PDSCH 219 are located in the same CC1 210, but the PDCCH 212 and the PDSCH 229, the PDCCH 213 and the PDSCH 239, and the PDCCH 221 and the PDSCH 228 are located in different component carriers from each other, which may be referred to as cross-carrier scheduling. In a CA environment, a base station includes a PDCCH and a PDSCH in a signal for transmission to a user equipment, and the user equipment determines whether an error occurs in the PDSCH that is identified using the PDCCH, and transmits, to the base station, response information (ACK/NACK/DTX and the like) associated with whether an error occurs. That is, the user equipment includes an uplink control channel (PUCCH, Physical Uplink Control CHannel) in a signal for transmission of data to the base station. An embodiment of information transmitted through a PUCCH is response information with respect to a downlink signal (packet) as described above, for example, response information (ACK/NACK or ACK/NAK) with respect to HARQ (Hybrid Automatic Repeat Request). Also, indication information associated with a channel quality (CQI, Channel Quality Indicator) and MIMO feedback information with respect to downlink transmission such as an RI (Rank Indicator) and a PMI (Precoding Matrix Indicator) may be included in a PUCCH. To transmit the information, a control information format (Uplink control information format) as shown in Table 1 may be used.

TABLE 1

| PUCCH format | Uplink Control Information |
| --- | --- |
| | Uplink control information (UCI, Uplink Control Information) |
| Format 1 | Scheduling request (SR, Scheduling Request) |
| Format 1a | 1-bit HARQ ACK/NACK (including or excluding SR) |
| Format 1b | 2-bit HARQ ACK/NACK (including or excluding SR) |
| Format 2 | CQI (20 coded bits) |
| Format 2 | CQI and 1-or 2-bit HARQ ACK/NACK (20 bits) in Extended CP |
| Format 2a | CQI and 1-bit HARQ ACK/NACK (20 + 1 coded bits) |
| Format 2b | CQI and 2-bit HARQ ACK/NACK (20 + 2 coded bits) |

3GPP LTE-A (LTE Advanced) uses the CA that couples up and down component carriers as described in FIG. 2. In this example, to process HARQ with respect to data transmitted in a plurality of downlink component carriers (DLCC, Downlink CC), ACK/NAK transmission in an uplink may be required. That is, a plurality of pieces of downlink component carrier information may need to be efficiently transmitted. Also, the compatibility with an existing system that uses a single component carrier may need to be considered.

That is, under a CA environment, a number of ACKs/NAKs that a UE is required to transmit in an uplink may increase in proportion to a number of a downlink CCs that the UE uses. An HARQ result may be transmitted to a base station in a form of ACK/NACK (NAK) based on the 1a/1b format as shown in Table 1, or may be transmitted based on the 2a/2b format. The format 2 is for transmission of CQI information. The format 2 indicates a transmission scheme that enables 4 to 13 bits of information transmission, and is mostly used for CQI information transmission. In the case of an Extended CP, the transmission of CQI information and ACK/NAK information is limitedly used in the format 2.

Hereinafter, in the present invention, when one or more downlink component carriers and uplink component carriers exist, one or more component carriers that may transmit and receive primary control information may be included, which are referred to as a primary uplink component carrier (Primary Uplink CC) and a primary downlink component carrier (Primary Downlink CC).

In an LTE or LTE-A system, as an example, a user equipment receives a packet included in a signal, determines whether an error occurs during a process of decoding a PDSCH using a PDCCH, and provides an ACK or an NACK as response information. Also, when control information is not included in the received packet, for example, when a PDCCH is not included, a DTX may be response information. Also, the response information may include control information that determines network condition information and requests a predetermined process for a base station, such as an SR (Scheduling Request).

When the user equipment desires to transmit response information with respect to a downlink packet that is previously received through a PUCCH, the user equipment may need to be assigned with a resource in a PUCCH region. Resource allocation with respect to the to response information may be performed in a downlink control region such as a PDCCH. However, a region that the PDCCH may occupy is limited and thus, an amount of information to be included in the PDCCH is also limited. A predetermined time after a user equipment receives a signal in a downlink, the user equipment may need to transmit response information with respect to the corresponding signal such as an ACK/NACK or a DTX, and thus, information associated with resource allocation for the response information may be required.

Hereinafter, there is provided a process in which a base station provides a user equipment with allocation information associated with a resource where response information is stored in a wireless communication that uses a limited control region, and a configuration thereof according to an embodiment of the present invention. Hereinafter, although a description is provided based on a PDCCH as an example of a control region, the present invention may not be limited thereto and may be applicable to all systems and network configurations for effectively providing transmission of response information in a limited control region.

In an environment of a plurality of component carriers, a PDCCH region may be used to include information required for resource allocation of response information. Hereinafter, indication information for resource allocation of response information is referred to as a response information resource indicator. To provide a response information resource indicator in a PDCCH, a base station provides the response information resource indicator to a user equipment based on an implicit allocation scheme (Implicit Resource Allocation) and an explicit allocation scheme (Explicit Resource Allocation). The implicit allocation scheme corresponds to a scheme in which a user equipment infers or calculates an indicated resource based on information included in a PDCCH or information calculated using information of the PDCCH. The explicit allocation scheme corresponds to a scheme that includes, in a predetermined region or a predetermined field of a PDCCH, a response information resource indicator or a value used for inferring the response information resource indicator.

To use the explicit allocation scheme, a predetermined region or a predetermined field of a PDCCH is used as information for calculating the response information resource indicator or an indicator. However, the region or the field is a region (field) where the PDCCH transmits another control information and thus, a region that is not used in a predetermined point in time may be used for calculating the response information resource indicator or the indicator.

Detailed descriptions thereof will be provided as follows.

A resource index $n^{(1)}_{PUCCH}$ corresponding to a resource for transmission of PUCCH format 1/1a/1b is used to determine a location of a physical resource block through which a response information (ACK/NACK) signal is transmitted, and is also used to determine an orthogonal sequence index $n_{occ}$ that provides a cyclic shift value of a basic sequence and orthogonality. Therefore, the resource index $n^{(1)}_{PUCCH}$ for an HARQ ACK/NACK signal may be calculated as illustrated in Table 2.

TABLE 2

|  | Dynamic Scheduling | Semi-Persistent Scheduling |
| --- | --- | --- |
| Resource Index | $n^{(1)}_{PUCCH} = n_{CCE} + N^{(1)}_{PUCCH}$ | Signaled by higher layer or a control channel |
| Higher Layer Signaling value | $N^{(1)}_{PUCCH}$ | $n^{(1)}_{PUCCH}$ |

That is, according to Table 2, an HARQ ACK/NACK signal with respect to a PDSCH transmitted in an $n^{th}$ subframe is transmitted in an $n+4^{th}$ subframe using a resource index $n^{(1)}_{PUCCH}$ which is a sum of a first CCE (Control Channel Element) index nCCE of a PDCCH transmitted in the $n^{th}$ subframe and $N^{(1)}_{PUCCH}$ obtained through a higher layer signaling or a separate control channel. $N^{(1)}_{PUCCH}$ is a total number of PUCCH format 1/1a/1b resources required for Semi-Persistent Scheduling (SPS) transmission and SR (Service Request) transmission. In the case of the Semi-Persistent Scheduling (SPS) transmission and the SR (Service Request) transmission, a PDCCH indicating corresponding PDSCH transmission does not exist and thus, a base station explicitly informs a user equipment of $N^{(1)}_{PUCCH}$. Setting of the $n+4^{th}$ subframe may be adjusted or set to be different during an implementation process.

When a single carrier is used with respect to an uplink and a downlink, one $n_{CCE}$ is allocated to a single PDCCH. A user equipment that receives a single PDSCH indicated by a PDCCH may transmit an ACK/NACK signal with respect to the PDSCH through a PUCCH resource based on $n_{CCE}$. Conversely, when an ACK/NACK signal is transmitted through a multi-antenna in an uplink and a downlink, the same ACK/NACK symbol is transmitted through different antennas using different resources and thus, diversity may be obtained. However, the same ACK/NACK signal is transmitted through different antennas and thus, a resource collision needs to be prevented by allocating different ACK/NACK transmission resources for respective antennas. That is, the same ACK/NACK signal is transmitted through different antennas by allocating an ACK/NACK transmission resource with respect to a first antenna based on a signal transmission table, and allocating an ACK/NACK transmission resource with respect to a second antenna in a resource region that is not designated by a signal transmission table and thus, a resource collision may be prevented and a transmission diversity may be obtained. In regard to the second antenna, when SORTD (Spatial Orthogonal Resource Transmit Diversity) is set, a transmission resource to be allocated to the second antenna may be allocated as a resource for indication. In a CA environment, that is, in a multiple component carrier system, a resource may be allocated with respect to HARQ ACK/NACK information of 4 bits or less based on a signal transmission table using a PUCCH format 1/1a/1b. The signal transmission table is a table for mapping a message to be transmitted and a resource and modulation symbol to be used for transmission of the corresponding message. The signal transmission table may be configured based on various methods. For example, the table may be configured as a combination of a plurality of resource indices and a modulation symbol of an ACK/NACK signal, and may be differently configured based on a bit number (M) used for transmitting an ACK/NACK signal, and may be configured as a single table to include all bit numbers (M). Therefore, in the case where a signal transmission table is used with respect to ACK/NACK information of 4 bit or less in a CA environment, when M is 2, 3, and 4, the signal transmission table may be configured and may be utilized for ACK/NACK transmission resource allocation. A format of the signal transmission table may be transferred in advance to a user equipment and a base station through a higher layer signaling. The user equipment may obtain a resource index for configuring a signal transmission table through a received PDCCH, a separate signaling from an upper channel, a transmission channel, or the like.

For resource allocation of the PUCCH format 1/1a/1b for transmission of an ACK/NACK signal, a base station may allocate a resource index based on the implicit resource allocation scheme as described above. As an example of the implicit allocation of a resource index by a base station, a resource index may be allocated that is calculated using, as a parameter, $n_{CCE}$ indicating a number of a CCE from among at least one CCE configuring a PDCCH of a predetermined CC (CC1). As described above, the explicit allocation of a resource index means allocation of a resource index of a predetermined user equipment dedicated PUCCH to a user equipment through a resource allocation indicator separately obtained from a base station and the like without depending on $n_{CCE}$. In this example, the resource allocation indicator separately obtained from the base station may include a signaling from a higher layer or a physical layer and the like. Also, the resource allocation indicator may be included in a PDCCH as control information or system information. To explicitly allocate a resource index, the base station may utilize an indicator used for transferring another piece of control information as a resource allocation indicator.

For example, the base station may utilize a power indicator (PI) with respect to an uplink transmission power as a resource allocation indicator. The PI is an indicator to control and adjust the uplink transmission power. In general, a DCI format indicating downlink allocation (Downlink Grant) may include a PI field of 2 bits for a power control with respect to a PUCCH, and a DCI format indicating an uplink grant may include a PI field of 2 bits for a power control with respect to a PUSCH. The described transmission power control (TPC) is one of the examples of the PI. In the case of cross carrier scheduling, downlink allocation with respect to one or more controlled carriers may be transmitted through a control carrier. In the cross-carrier scheduling, the control carrier is a carrier that transmits a PDCCH indicating a PDSCH of a controlled carrier, and may correspond to a primary carrier (PCC or PCell, Primary Cell). The controlled carrier is a carrier of which a PDSCH is indicated by a PDCCH of a control carrier, and may correspond to a secondary carrier (SCC or SCell, Secondary Cell). The downlink allocation transmits a PI with respect to a PUCCH of an uplink component carrier lined with a control carrier. In this example, one or more identical PIs may be transmitted for a power control of an identical uplink PUCCH. This may act as overhead of downlink control information. Therefore, when a plurality of PIs exist for a single PUCCH due to a plurality of downlink grant transmission, a bit allocated to the same PI field may be used for transmission of another control information and thus, a limited radio resource may be effectively used.

In the present invention, a scheme of indicating a response information resource may be implemented by effectively using explicit resource allocation and implicit resource allocation. Hereinafter, with respect to resource allocation, a TDD system according to an embodiment of the present invention will be briefly described as follows.

A TDD scheme refers to a scheme that performs uplink transmission and downlink transmission based on resources of different times. Therefore, a timing associated with an uplink subframe for providing response information with respect to a PDSCH received through a downlink may be determined in advance as illustrated in Table 3. It may be selected based on an amount of data transmitted in an uplink and a downlink.

TABLE 3

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Referring to table 3, when a UL-DL configuration is 2, downlink subframes 8, 7, 4, and 6 are connected to uplink subframe 2. That is, as a scheme for providing response information with respect to a plurality of downlink subframes, ACK/NACK bundling, ACK/NACK multiplexing, or ACK/NACK Channel Selection may be performed. The bundling refers to a scheme of generating an identical data, that is, representative data, with respect to a predetermined number of subframes successive on a time-axis and transmitting the generated data. The channel selection or multiplexing refers to a scheme of multiplying a plurality of response data and providing the data. In the case of Table 3, both the bundling and the multiplexing may be applied, except for UL-DL configuration 5 (bundling being applied).

Hereinafter, an example of bundling according to the present invention will be described as follows.

Figure 3:
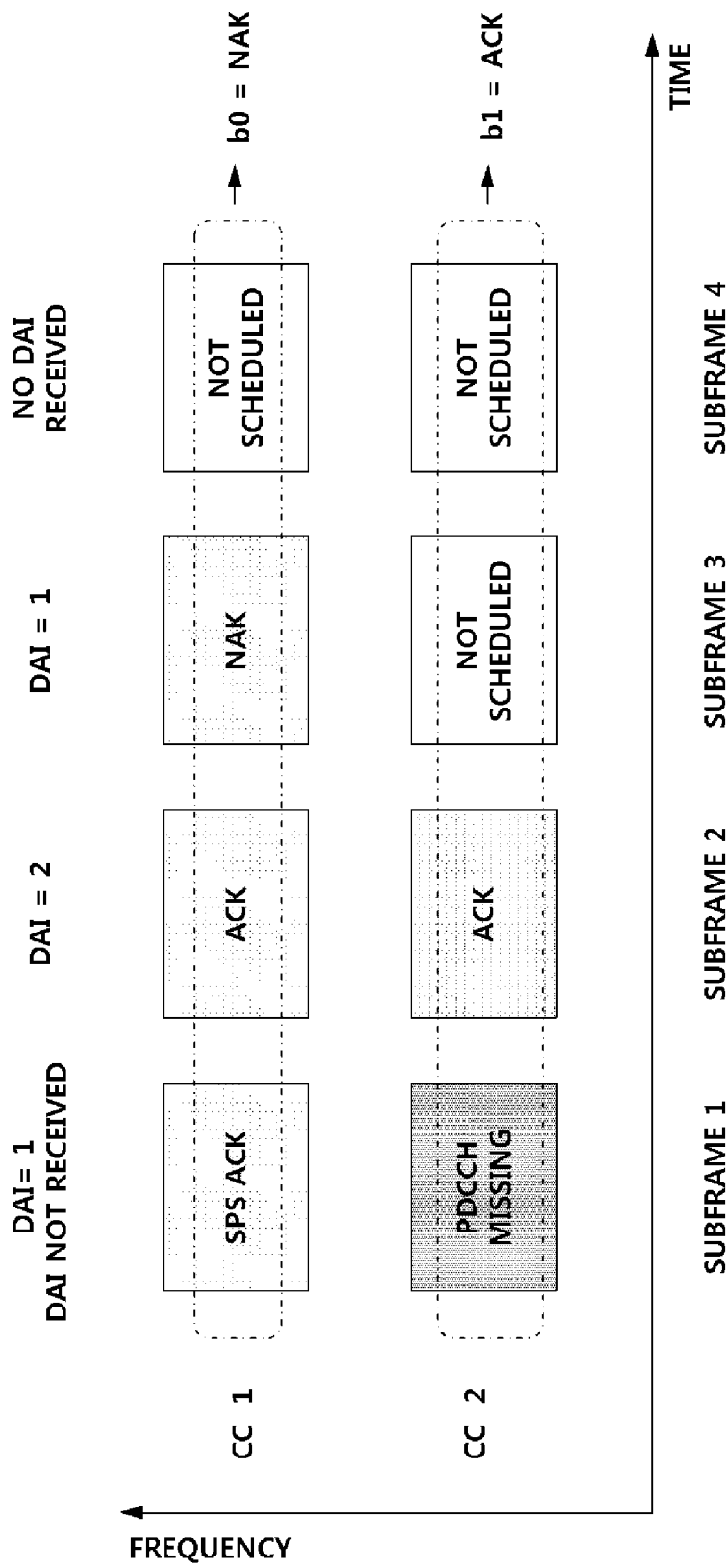
FIG. 3 illustrates an example of bundling according to an embodiment of the present invention.

FIG. 3 illustrates an example of bundling according to an embodiment of the present invention. In FIG. 3, a time domain bundling method that is based on a time (subframe) used. A spatial bundling among codes of each CC is mandatorily performed, and ACK/NACK response information of 1 bit is generated (b0, b1) for each CC as shown in FIG. 3.

Information associated with downlink allocation (Downlink Assignment Index or Downlink Assignment Indicator, DAI) may indicate a number of PDCCHs to be allocated, and a PDCCH of a first subframe of CC2 is missing.

Most time domain bundling schemes are designed based on only 2 CCs. An error case handling is required due to a PDCCH that is missing from a last subframe and thus, secondary information of 2 bits (Assistant bits, b2 and b3) may be used for error case handling. Therefore, a situation where two or more CCs are configured may not be provided.

When time domain bundling is not performed (CA TDD environment), corresponding response information may be transmitted by performing channel selection. In this example, a scheme of implementing and configuring a table in advance and providing resource information may be used to allocate a resource with respect to a plurality of CCs. However, the use of a mapping table or bundling in a TDD environment may affect the accuracy of response information and the efficiency of a network and, thus, there is desire for a resource allocation method that may be applied to varied network conditions. Hereinafter, various embodiments provided in the present invention to allocate a response information resource in varied network conditions will be described.

Bundling may be selectively performed based on the size of response information or may not be performed. That is, when the size of response information is less than or equal to K, bundling may not be performed, and when the size of response information is greater than K, bundling may be performed so as to decrease a resource allocated as response information. Hereinafter, although a description is provided based on K of 4, the present invention is not limited thereto and may increase or decrease K corresponding to a number of pieces of response information based on a condition of a system. Hereinafter, the case in which 4 or less pieces of response information are provided will be described. Although the description is provided by assuming the case in which a resource of 1 bit is allocated for transmission of a single piece of response information, this may be changed based on contents of response information. Also, there are the case where cross-carrier scheduling is performed and the case where cross-carrier scheduling is not performed in a CA environment. In detail, in each case, there are the case where a single codeword (CW) is transmitted and the case where two codewords are transmitted. For each case, a scheme of providing response resource information according to the present invention will be described as follows.

For ease of description, as an embodiment that enables implicit resource allocation, the following Equation 1 is used, which is a scheme that indicates a response information resource using a value of $n_{CCE}$ in a predetermined subframe.

Indication information of response information
 resource of PCC=Implicit_$p$_$k$($n_{CCE}$,subframe_number);

Indication information of response information
 resource of SCC=Implicit_$s$_$k$($n_{CCE}$, subframe_number); [Equation 1]

k of Equation 1 is an identifier to identify a function that calculates a response information resource, which varies based on a resource. For example, when $n_{CCE}$ causes a collision, a different function may be used for each subframe or each codeword.

As an embodiment that enables explicit resource allocation, an example of explicitly performing resource allocation to a separate field may be provided. For example, when a TPC of 2 bits is used, it may be variously determined based on a number of pieces of response information resources to be allocated. As an embodiment that enables explicit resource allocation, the following Equation 2 is used, which is a scheme that indicates a response information resource using response information resource indication information (ACK/NACK Resource Indicator, ARI) included in a predetermined field (e.g., a TPC field) of a predetermined subframe.

Indication information of response information
 resource of PCC=Explicit_$p$_$k$(ARI,subframe_number);

or

Explicit_$p$_$k$(ARI_PAIR,subframe_number);

Indication information of response information
 resource of SCC=Explicit_$s$_$k$(ARI,subframe_number);

or

Explicit_$s$_$k$(ARI_PAIR,subframe_number); [Equation 2]

k of Equation 2 is an identifier to identify a function that calculates a response information resource, which varies based on a resource. For example, an ARI value may be used, and a different function may be used for each subframe or each codeword.

An ARI may be information for indication in a TPC field. An ARI_PAIR indicates a set of two or more resources. It means that an ARI value transmitted through a TPC field is one, but two or more resources are allocated through this. Mapping between an ARI and a resource is as illustrated in Table 4 through Table 10. The following ARI resource mapping table may be transferred to a user equipment in advance through a higher layer signaling. That is, an explicitly allocated resource set and a corresponding ARI value may be transferred to a user equipment in advance through a higher layer signaling. Subframe_number shows information associated with a subframe that includes a TPC field to be used, for explicit information allocation, that is, for the use of the TPC field.

First, the case where a single piece of response information resource is mapped through an ARI will be described. Table 4 corresponds to the case where a single ACK/NACK transmission resource is required.

4 explicitly allocated resource sets and corresponding ARI values are transferred to a user equipment in advance through higher layer signaling. Here, although a TPC of 2 bits on a PDCCH with respect to a PDSCH of a secondary component carrier from among a plurality of component carriers transmitted in a downlink may be used as an ARI, this may not be limited thereto. Table 4 through Table 10 are configured as ARI resource mapping tables for ease of description of the present invention, and detailed values of the ARI resource mapping table according to the present invention may not be limited thereto. Based on an ARI value of a PDCCH with respect to a PDSCH of a secondary component carrier, which the user equipment receives, an ACK/NACK transmission resource matched to an ARI value may be allocated.

In table 4, when resource sets transferred in advance through a higher layer signaling are {n1}, {n2}, {n3}, and {n4}, the ARI resource mapping table may be configured as follows.

TABLE 4

| ACK/NACK Resource Indicator | Mapped ACK/NACK transmission resource |
| --- | --- |
| 00 | First resource set, i.e., {n1} |
| 01 | Second resource set, i.e., {n2} |
| 10 | Third resource set, i.e., {n3} |
| 11 | Fourth resource set, i.e., {n4} |

The table may be configured with a single set of elements of {n1, n2, n3, n4}, as opposed to being configured with sets, each having a single element. In Table 4, when an ARI is '00', a resource set {n1} may be allocated.

Next, the case where two ACK/NACK transmission resources are required will be described. It is the case where two ACK/NACK transmission resources are required and thus, resource sets may be organized into four sets, each having elements corresponding to two ACK/NACK transmission resources or there may be two sets, each having elements corresponding to four ACK/NACK transmission resources. When resource sets transferred in advance through a higher layer signaling correspond to four sets, each having elements corresponding to two ACK/NACK transmission resources, for example, {n1, n2}, {n3, n4}, {n5, n6}, and {n7, n8}, the ARI resource mapping table may be configured as shown in Table 5.

TABLE 5

| ACK/NACK Resource Indicator | Mapped ACK/NACK transmission resource |
| --- | --- |
| 00 | First resource set, i.e., {n1, n2} |
| 01 | Second resource set, i.e., {n3, n4} |
| 10 | Third resource set, i.e., {n5, n6} |
| 11 | Fourth resource set, i.e., {n7, n8} |

When resource sets transferred in advance through a higher layer signaling correspond to two sets, each having elements corresponding to four ACK/NACK transmission resources, for example, {n1, n2, n3, n4} and {n5, n6, n7, n8}, the ARI resource mapping table may be configured as shown in Table 6.

TABLE 6

| ACK/NACK Resource Indicator | Mapped ACK/NACK transmission resource |
| --- | --- |
| 00 | First resource in each set, i.e., {n1, n5} |
| 01 | Second resource in each set, i.e., {n2, n6} |
| 10 | Third resource in each set, i.e., {n3, n7} |
| 11 | Fourth resource in each set, i.e., {n4, n8} |

When an ARI is '00', a resource set {n1, n2} is allocated based on Table 5. Also, when an ARI is '00', a resource set {n1, n5} is allocated based on Table 6.

Next, the case where three ACK/NACK transmission resources are required will be described. It is the case where three ACK/NACK transmission resources are required and thus, there may be four resource sets, each having elements corresponding to three ACK/NACK transmission resources, or there may be three sets, each having elements corresponding to four ACK/NACK transmission resources. When resource sets transferred in advance through a higher layer signaling correspond to four sets, each having elements corresponding to three ACK/NACK transmission resources, for example, {n1, n2, n3}, {n4, n5, n6}, {n7, n8, n9}, and {n10, n11, n12}, the ARI resource mapping table may be configured as shown in Table 7.

TABLE 7

| ACK/NACK Resource Indicator | Mapped ACK/NACK transmission resource |
| --- | --- |
| 00 | First resource set, i.e., {n1, n2, n3} |
| 01 | Second resource set, i.e., {n4, n5, n6} |
| 10 | Third resource set, i.e., {n7, n8, n9} |
| 11 | Fourth resource set, i.e., {n10, n11, n12} |

When resource sets transferred in advance through a higher layer signaling correspond to three sets, each having elements corresponding to four ACK/NACK transmission resources, for example, {n1, n2, n3, n4}, {n5, n6, n7, n8}, and {n9, n10, n11, n12}, the ARI resource mapping table may be configured as shown in Table 8.

TABLE 8

| ACK/NACK Resource Indicator | Mapped ACK/NACK transmission resource |
| --- | --- |
| 00 | First resource in each set, i.e., {n1, n5, n9} |
| 01 | Second resource in each set, i.e., {n2, n6, n10} |
| 10 | Third resource in each set, i.e., {n3, n7, n11} |
| 11 | Fourth resource in each set, i.e., {n4, n8, n12} |

When an ARI is '00', a resource set {n1, n2, n3} is allocated based on Table 7. Also, when an ARI is '00', a resource set {n1, n5, n9} is allocated based on Table 8.

Next, the case where four ACK/NACK transmission resources are required will be described. It is the case where four ACK/NACK transmission resources are required and thus, resource sets may correspond to four sets, each having elements corresponding to four ACK/NACK transmission resources. When resource sets transferred in advance through a higher layer signaling correspond to four sets, each having elements corresponding to four ACK/NACK transmission resources, for example, {n1, n2, n3, n4}, {n5, n6, n7, n8}, {n9, n10, n11, n12}, and {n13, n14, n15, n16}, the ARI resource mapping table may be configured as shown in Table 9.

TABLE 9

| ACK/NACK Resource Indicator | Mapped ACK/NACK transmission resource |
| --- | --- |
| 00 | First resource set, i.e., {n1, n2, n3, n4} |

TABLE 9-continued

| ACK/NACK Resource Indicator | Mapped ACK/NACK transmission resource |
| --- | --- |
| 01 | Second resource set, i.e., {n5, n6, n7, n8} |
| 10 | Third resource set, i.e., {n9, n10, n11, n12} |
| 11 | Fourth resource set, i.e., {n13, n14, n15, n16} |

When resource sets transferred in advance through a higher layer signaling are, for example, {n1, n2, n3, n4}, {n5, n6, n7, n8}, {n9, n10, n11, n12}, and {n13, n14, n15, n16}, the ARI resource mapping table may also be configured as shown in Table 9.

TABLE 10

| ACK/NACK Resource Indicator | Mapped ACK/NACK transmission resource |
| --- | --- |
| 00 | First resource in each set, i.e., {n1, n5, n9, n13} |
| 01 | Second resource in each set, i.e., {n2, n6, n10, n14} |
| 10 | Third resource in each set, i.e., {n3, n7, n11, n15} |
| 11 | Fourth resource in each set, i.e., {n4, n8, n12, n16} |

When an ARI is '00', a resource set {n1, n2, n3, n4} is allocated based on Table 9. Also, when an ARI is '00', a resource set {n1, n5, n9, n13} is allocated based on Table 10.

Hereinafter, there is provided a process in which a base station indicates a response information resource based on a corresponding transmission environment during transmission of a PDSCH, and a user equipment determines the indication. In the case where a plurality of response information resources are used, when a base station provides explicit or implicit information indicating the response information resources to the user equipment, priorities may be variously set. That is, it is calculated to indicate an implicit response information resource, and then to indicate an explicit response information, and vice versa.

Figure 4:
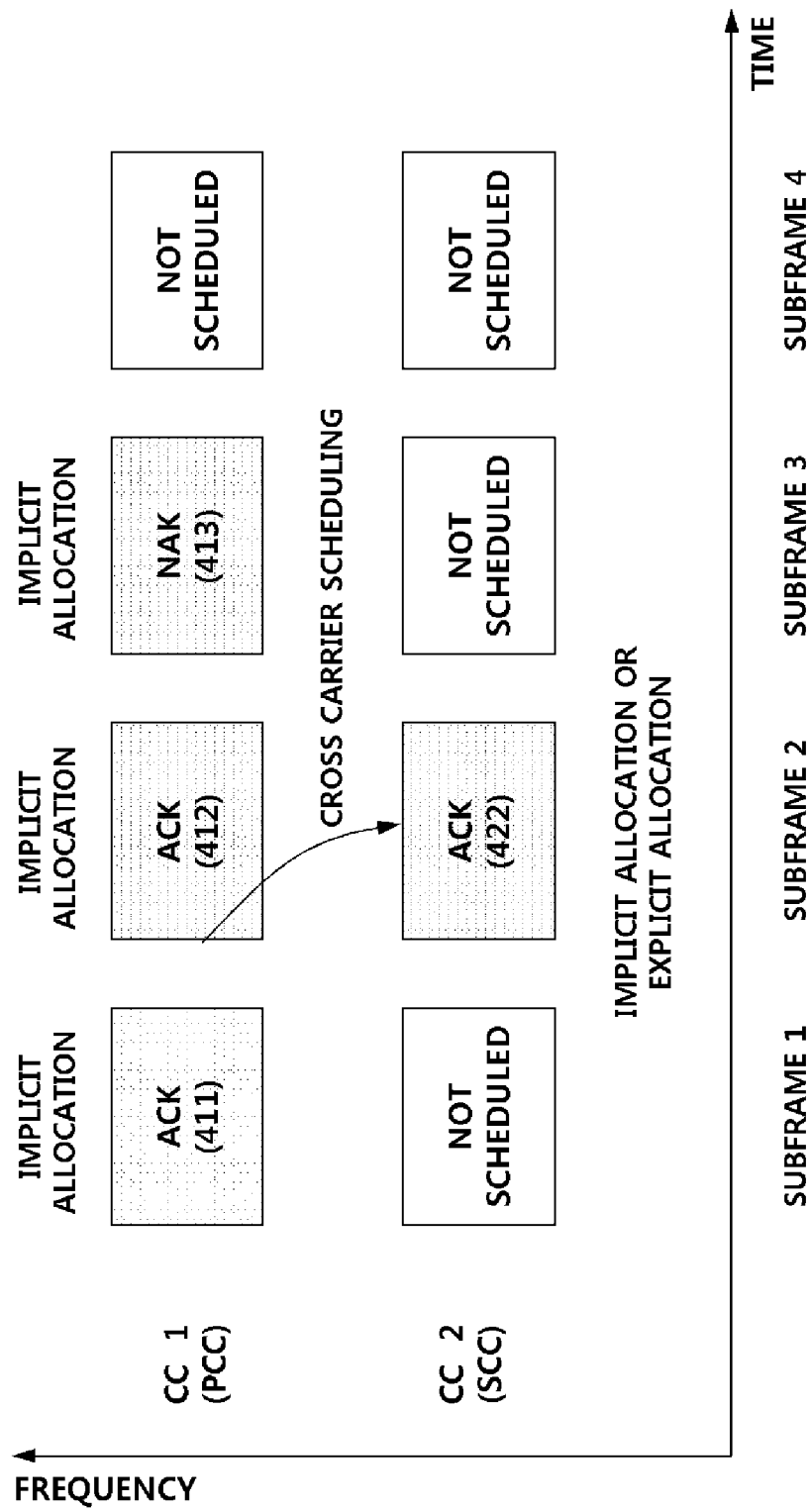
FIG. 4 is a diagram illustrating the case in which cross carrier scheduling is performed, and a single codeword is transmitted for each PDSCH according to an embodiment of the present invention.

FIG. 4 is a diagram illustrating the case in which cross carrier scheduling is performed, 4 or less pieces of response information are provided, and a codeword is transmitted for each PDSCH according to an embodiment of the present invention. 411, 412, and 413 correspond to PDSCHs transmitted in CC1 corresponding to a PCC, and 422 corresponds to a PDSCH transmitted in CC2 corresponding to an SCC. The PDSCH 422 is allocated by cross carrier scheduling in subframe 2 of CC1 and thus, a PDCCH with respect to the PDSCH 422 is included in 412 and transmitted. Therefore, in the case where response information resource is allocated with respect to each PDSCH, 411, 412, and 413 transmitted in the PCC may allocate a resource index that is calculated using, as a parameter, $n_{CCE}$ indicating a number of a CCE from among at least one CCE configuring a PDCCH of a PCC(CC1), which is an embodiment of the implicit allocation as described above. A PDCCH with respect to 422 and a PDCCH with respect to 412 are transmitted through subframe 2 by cross carrier scheduling and thus, a value of $n_{CCE}$ may be differently set (resources with respect to two PDSCHs are allocated in an identical PDCCH region and thus, $n_{CCE}$ may be different). Accordingly, resources of response information obtained based on an $n_{CCE}$ value of the PDCCH with respect to 422 and an $n_{CCE}$ value of the PDCCH with respect to 412 are different from each other and thus, a collision may not occur. Therefore, with respect to 422, a response information resource may be allocated using an implicit allocation scheme that uses $n_{CCE}$ value. A response information resource may be explicitly allocated with respect to the PDSCH 422. As an embodiment that allocates an explicit response information resource, a resource to which response information is to be stored may be explicitly allocated using a PI field associated with a power control as described above.

Response resource allocation applicable to the case of FIG. 4 may be as shown in Table 11.

TABLE 11

| Resource 1 (PCC-subframe 1) | Resource 2 (PCC-subframe 2) | Resource 3 (PCC-subframe 3) | Resource 1 (SCC-Subframe 2) |
| --- | --- | --- | --- |
| Implicit_p_1(n_CCE, subframe_1) | Implicit_p_2(n_CCE, subframe_2) | Implicit_p_3(n_CCE, subframe_3) | Implicit_s_1(n_CCE, subframe_2) Explicit_s_1(ARI, subframe_2) |

A response resource with respect to the PDSCH 411 transmitted through subframe 1 of the PCC may be implicitly calculated based on an n_CCE value transmitted from 411, that is, subframe 1 (Implicit_p_1(n_CCE, subframe_1 )). In the same manner, a response resource with respect to the PDSCH 412 transmitted through subframe 2 of the PCC may be implicitly calculated based on an n_CCE value transmitted from 412, that is, subframe 2 (Implicit_p_2(n_CCE, subframe_2)), and a response resource with respect to the PDSCH 413 transmitted through subframe 3 of the PCC may be implicitly calculated based on an n_CCE value transmitted from 413, that is, subframe 3 (Implicit_p_3(n_CCE, subframe_3)).

In the case of a response resource with respect to the PDSCH 412 transmitted in subframe 2 of the SCC, cross-carrier scheduling with the PCC occurs and thus, n_CCE ($n_{CCE}$) values are different from each other. Therefore, the response resource may be implicitly calculated based on an n_CCE value of a PDCCH with respect to the PDSCH 412 (Implicit_s_1(n_CCE, subframe_2)). However, an explicit method is also applicable and thus, the explicit method may be used based on an ARI value set on a TPC value included in the PDCCH with respect to the PDSCH 412 (Explicit_s_1 (ARI, subframe_2)). A single piece of response information is to be allocated and thus, the ARI mapping table of Table 4 may be used.

Figure 5:
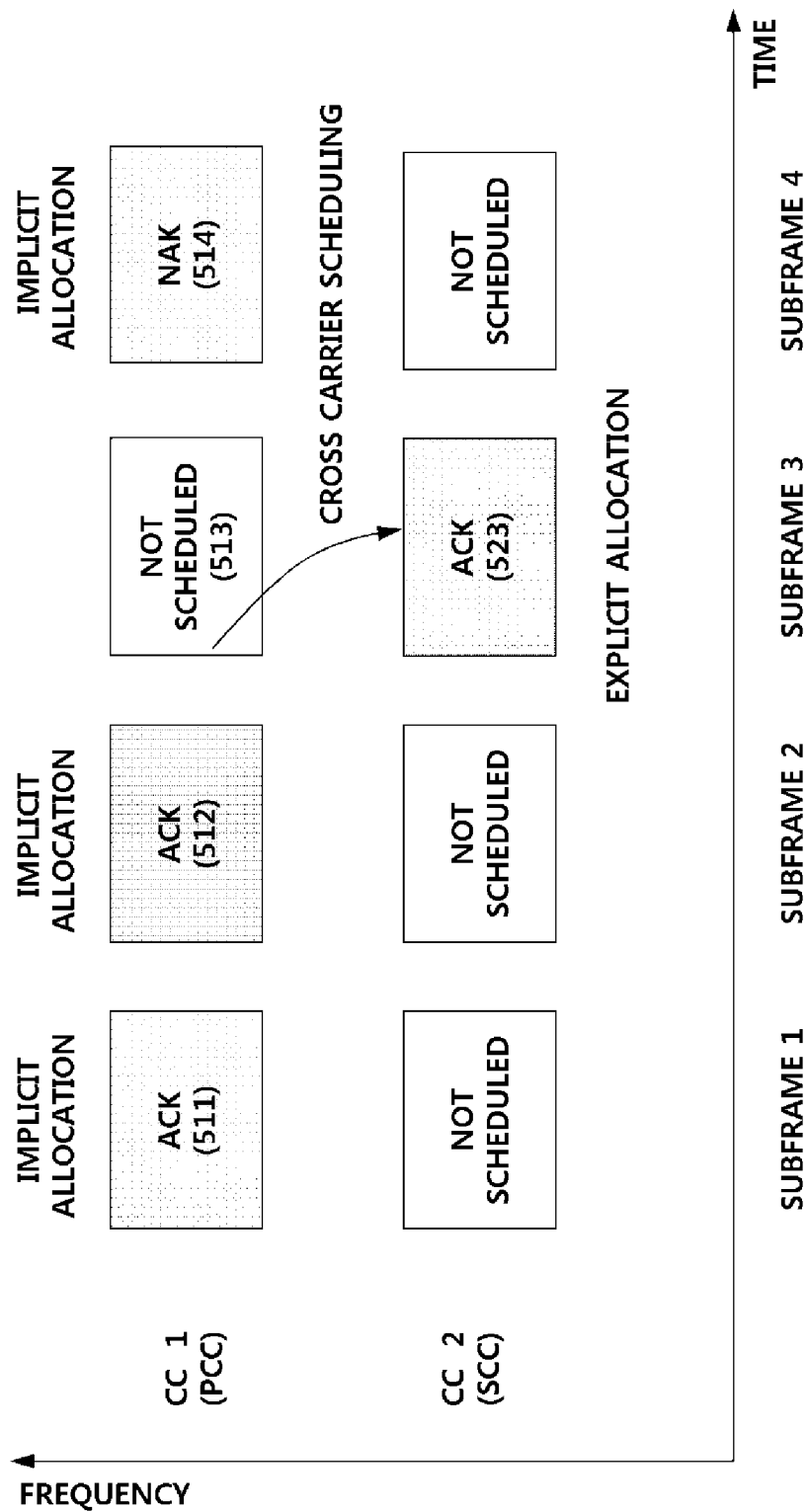
FIG. 5 is a diagram illustrating the case in which cross carrier scheduling is performed, and a single codeword is transmitted for each PDSCH according to another embodiment of the present invention.

FIG. 5 is a diagram illustrating the case in which cross carrier scheduling is performed, 4 or less pieces of response information are provided, and a codeword is transmitted for each PDSCH according to another embodiment of the present invention.

511, 512, and 514 correspond to the cases where a PDSCH is transmitted in CC1 corresponding to a PCC, and 523 corresponds to the case where a PDSCH is transmitted in CC2 corresponding to an SCC and cross-carrier scheduling is performed. In the case where a response information resource is allocated with respect to each PDSCH, 511, 512, and 514 transmitted in the PCC may implicitly allocate a resource index that is calculated using, as a parameter, $n_{CCE}$ indicating a number of a first CCE from among at least one CCE configuring a PDCCH of a PCC(CC1), which is an embodiment of the implicit allocation as described above. In the case of 523 subframe (subframe 3) allocated from a PDCCH of 513 of CC1(PCC) through cross-carrier scheduling, a PDSCH does not exist in 513 subframe and thus, explicit resource allocation may be required. As an embodiment that allocates an explicit response information resource, a resource in which response information is to stored may be explicitly allocated using a PI field associated with a power control as described above.

Response resource allocation that is applicable to the case of FIG. 5 may be as shown in Table 12.

TABLE 12

| Resource 1 (PCC-subframe 1) | Resource 2 (PCC-subframe 2) | Resource 3 (PCC-Subframe 4) | Resource 1 (SCC-subframe 3) |
|---|---|---|---|
| Implicit_p_1(n_CCE, subframe_1) | Implicit_p_2(n_CCE, subframe_2) | Implicit_p_3(n_CCE, subframe_4) | Explicit_s_1(ARI, Subframe_3) |

Response resources with respect to PDSCHs (511, 512, and 514) transmitted through subframes 1, 2, and 4 of the PCC may be implicitly calculated based on n_CCE values transmitted from 511, 512, and 514, respectively. Therefore, a response information resource may be implicitly allocated with respect to the PDSCH 511 based on Implicit_p_1 (n_CCE, subframe_1), a response information resource may be implicitly allocated with respect to the PDSCH 512 based on Implicit_p_2(n_CCE, subframe_2), and a response information resource may be implicitly allocated with respect to the PDSCH 514 based on Implicit_p_3(n_CCE, subframe_4).

The PDSCH 523 transmitted through subframe 3 of the SCC may be explicitly calculated. Therefore, a resource of response information may be calculated using Explicit_s_1 (ARI, subframe_3) by calculating an ARI from a value that explicitly indicates the response information resource, such as a TPC field included in the PDCCH 513 with respect to the PDSCH 523. In the case where a response resource is explicitly calculated in FIGS. 4 and 5, this is the case of calculating a single piece of response information resource and thus, the ARI mapping table of FIG. 4 may be used.

Next, an example of indicating a response information resource when two codewords are transmitted will be described.

Figure 6:
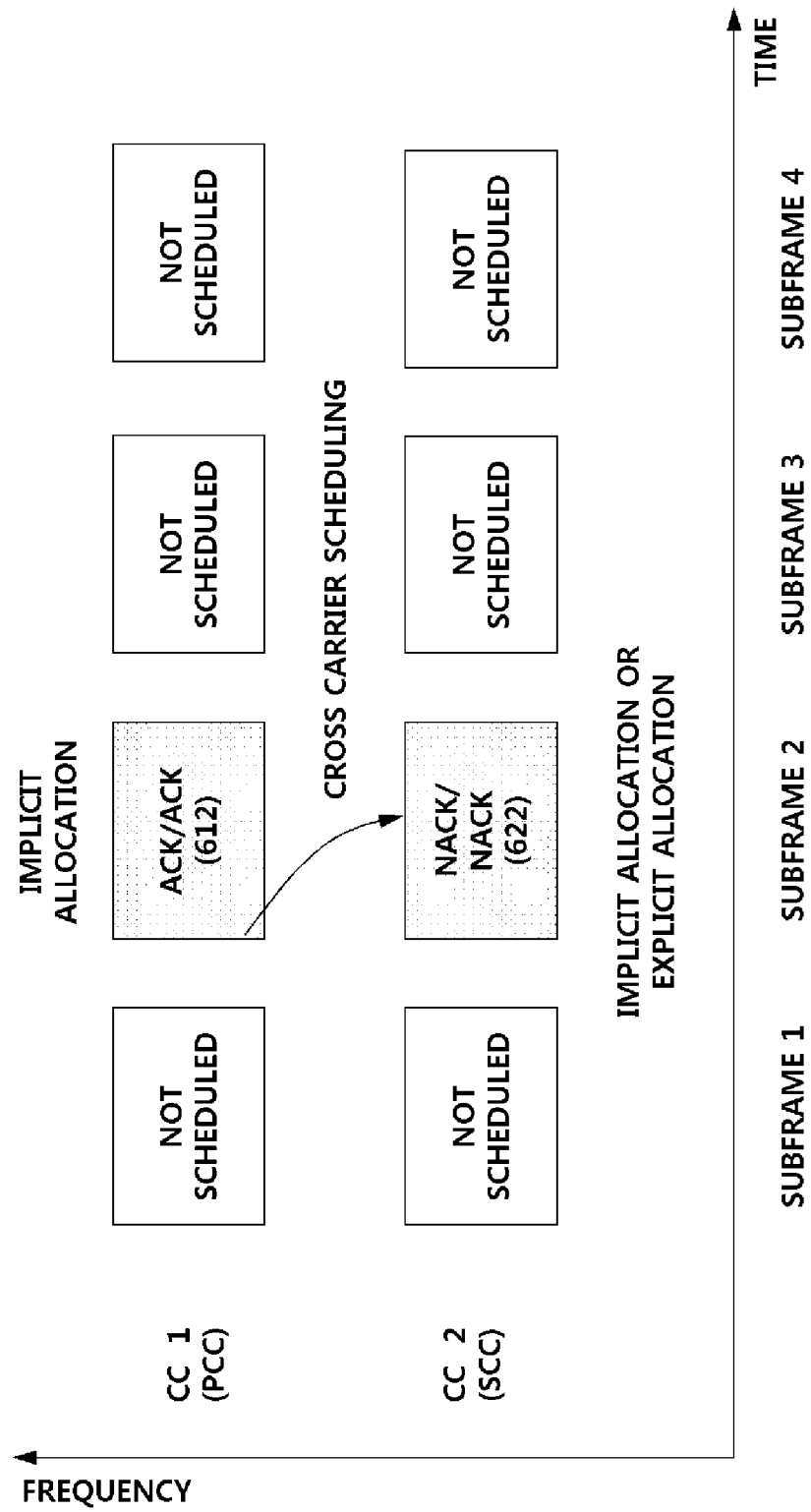
FIG. 6 is a diagram illustrating the case in which cross carrier scheduling is performed, and two codewords are transmitted for each PDSCH according to another embodiment of the present invention.

FIG. 6 is a diagram illustrating the case in which cross carrier scheduling is performed, 4 or less pieces of response information are provided, and two codewords are transmitted for each PDSCH according to another embodiment of the present invention.

A PDSCH 612 is transmitted in CC1 corresponding to a PCC, and two codewords are transmitted. Therefore, two response information resources are required. A PDSCH 622 is transmitted in CC2 corresponding to an SCC, and also two codewords are transmitted and thus, two response information resources are required. Cross carrier scheduling between CC2 and CC1 has been performed. In the case where a response information resource is allocated for each PDSCH, to allocate a response information resource to one of the two codewords of 612 transmitted in the PCC, a resource index may be allocated that is calculated using, as a parameter, $n_{CCE}$ indicating a number of a CCE from among at least one CCE configuring a PDCCH of a PCC(CC1) which is an embodiment of the implicit allocation. To allocate a response information resource with respect to a remaining codeword of the PDSCH 612, a resource index may be allocated that is calculated using, as a parameter, a value obtained by adding 1 to $n_{CCE}$. As shown in Tables 13 and 14, a response information resource with respect to a first codeword of the PDSCH 612 may be indicated by Implicit_p_1(n_CCE, subframe_2), and a response information resource with respect to a second codeword may be indicated by Implicit_p_2(n_CCE+1, ubframe_2). In this example, a base station selects $n_{CCE}$ values that have a difference greater than or equal to 1, so as to prevent a collision with another resource.

The PDSCH 622 transmitted through the SCC may also require two codewords. Allocation of two response information resources is required and thus, an explicit allocation method may be applied to the two codewords as shown in Table 13, and Explicit_s_1(ARI_PAIR, subframe2) may be used for a first codeword of the PDSCH 622 and Explicit_s_2 (ARI_PAIR, subframe2) may be used for a second codeword. A TPC value transmitted through subframe 2 may be used as ARI resource indication information, and may also be used as an ARI value for allocating two resources as shown in Table 5 or 6. For example, when Table 5 is used as a mapping table and an ARI value transmitted in subframe 2 is '01', a resource of n3 may be allocated for the first codeword of the PDSCH 622 and a resource of n4 may be allocated for the second codeword of the PDSCH 622. (A different number for each function is to distinguish whether a first resource or a second resource is to be used from among resources to be mapped using an ARI value, which may be reversely applied.

The PDSCH 622 is transmitted through cross carrier scheduling and thus, an $n_{CCE}$ value of 612 is different from an $n_{CCE}$ value of 622, which may enable implicit allocation. In this example, for the second codeword of the PDSCH 622, separate explicit allocation may be required. Therefore, as shown in Table 14, with respect to the first codeword of the PDSCH 622, a response information resource may be allocated by implicitly calculating Implicit_s_1(n_CCE, subframe2) using $n_{CCE}$, and with espect to the second codeword of the PDSCH 622, a response information resource may be allocated by explicitly calculating Explicit_s_2(ARI, subframe2). An example of allocating a response information resource of FIG. 6 may correspond to Tables 13 and 14. For a response information resource with respect to CC2, an explicit allocation scheme using an ARI value indicating two response resources may be used, or explicit allocation and implicit allocation may be used together.

TABLE 13

| Resource 1 (first CW, PCC-subframe 2) | Resource 2 (second CW, PCC-subframe 2) | Resource 1 (first CW, SCC-subframe 2) | Resource 2 (second CW, SCC-subframe 2) |
|---|---|---|---|
| Implicit_p_1(n_CCE,subframe_2) | Implicit_p_2(n_CCE+1,subframe_2) | Explicit_s_1(ARI_PAIR,subframe_2) | Explicit_s_2(ARI_PAIR,subframe_2) |

TABLE 14

| Resource 1 (first CW, PCC-subframe 2) | Resource 2 (second CW, PCC-subframe 2) | Resource 1 (first CW, SCC-subframe 2) | Resource 2 (second CW, SCC-subframe 2) |
|---|---|---|---|
| Implicit_p_1(n_CCE,subframe_2) | Implicit_p_2(n_CCE+1,subframe_2) | Implicit_s_1(n_CCE,subframe_2) | Explicit_s_2(ARI,subframe_2) |

Taking into consideration the case where cross carrier scheduling is performed in Tables 13 and 14, all SCC-related resources are implicitly allocated. For example, Table 15 may be applied to resource 1 of an SCC/resource 2 of the SCC in Tables 13 and 14, as follows.

TABLE 15

| Resource 1 (first CW, PCC-subframe 2) | Resource 2 (second CW, PCC-subframe 2) | Resource 1 (first CW, SCC-subframe 2) | Resource 2 (second CW, SCC-subframe 2) |
|---|---|---|---|
| Implicit_p_1(n_CCE,subframe_2) | Implicit_p_2(n_CCE+1,subframe_2) | Implicit_s_1(n_CCE,subframe_2) | Implicit_s_1(n_CCE+1,subframe_2) |

Figure 7:
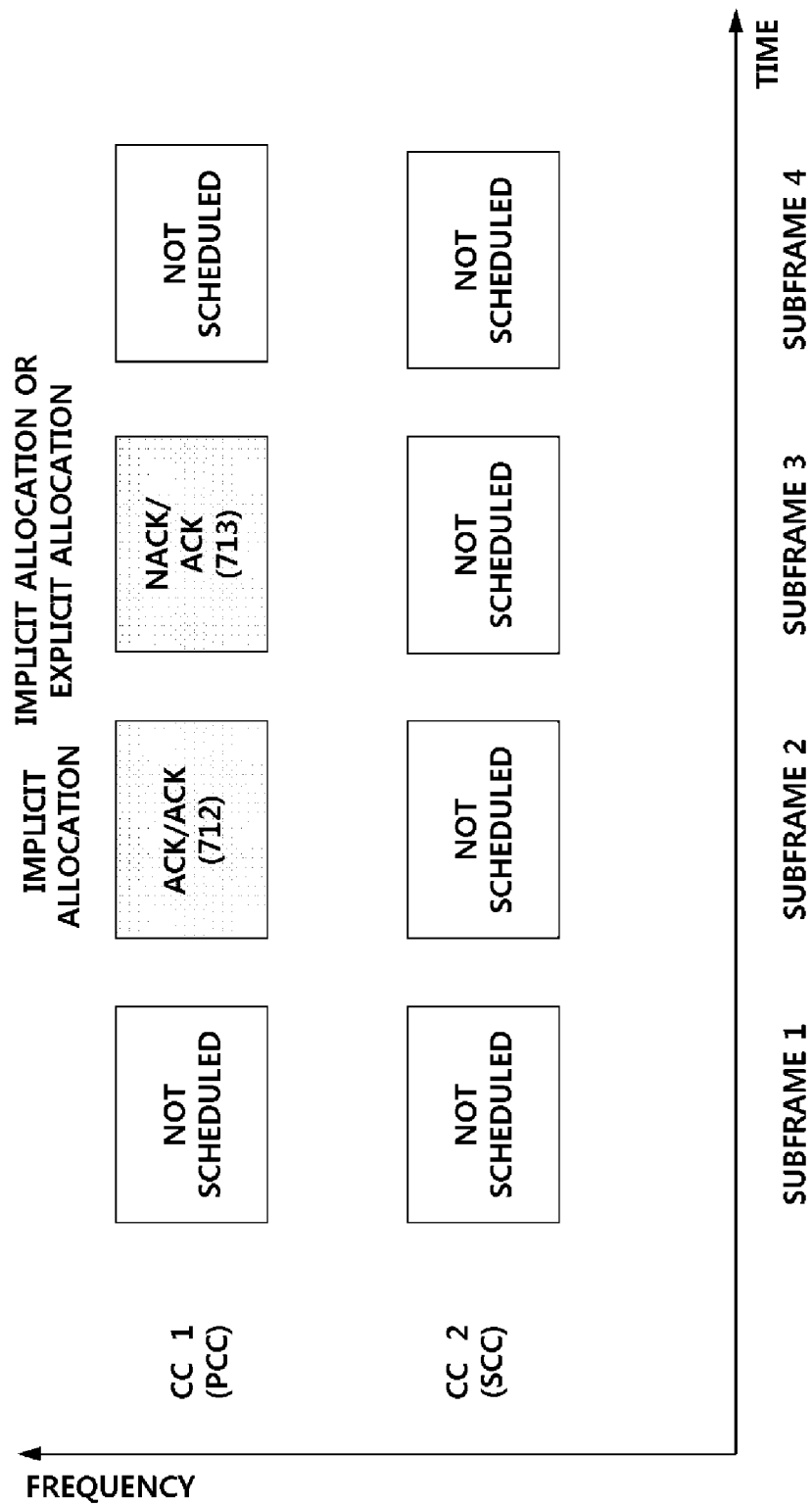
FIG. 7 is a diagram illustrating the case in which two codewords are transmitted for each PDSCH in a single component carrier according to another embodiment of the present invention.

FIG. 7 is a diagram illustrating the case in which 4 or less pieces of response information are provided and two codewords are transmitted for each PDSCH in a single component carrier according to another embodiment of the present invention.

A PDSCH 712 is transmitted in CC1 corresponding to a PCC, and two codewords are transmitted. Therefore, two response information resources are required. A PDSCH 713 is also transmitted in CC1 corresponding to the PCC, and also two codewords are transmitted and thus, two response information resources are required. In the case where a response information resource is allocated for each PDSCH, a resource index may be allocated that is calculated using, as a parameter, $n_{CCE}$ indicating a number of a CCE from among at least one CCE configuring a PDCCH of a PCC(CC1) which is an embodiment of the implicit allocation, to allocate a response information resource to one of the two codewords of the PDSCH 712 transmitted in subframe 2 of the PCC. To allocate a response information resource with respect to a remaining codeword of the PDSCH 712, a resource index may be allocated that is calculated using, as a parameter, a value obtained by adding 1 to $n_{CCE}$. As shown in Tables 16 and 17, a response information resource with respect to a first codeword of the PDSCH 712 may be indicated by Implicit_p_1 (n_CCE, subframe_2), and a response information resource with respect to a second codeword may be indicated by Implicit_p_2(n_CCE+1, ubframe_2).

The PDSCH 713 transmitted in subframe 3 through the PCC may also require two codewords. Allocation of two response resources is required and thus, an explicit allocation method may be applied to the two codewords as shown in Table 16, and Explicit_p_1(ARI_PAIR, subframe3) may be used for a first codeword of the PDSCH 713 and Explicit_p_2 (ARI_PAIR, subframe3) may be used for a second codeword. A TPC value transmitted through subframe 3 may be used as ARI resource indication information, and may also be used as an ARI value for allocating two resources as shown in Table 5 or 6. For example, when Table 5 is used as a mapping table and an ARI value transmitted in subframe 3 is '01', a resource of n3 may be allocated for the first codeword of the PDSCH 713 and a resource of n4 may be allocated for the second codeword of the PDSCH 713.

The implicit allocation scheme applied for the PDSCH 712 may be applied to the PDSCH 713. In this example, as illustrated in Table 17, a resource index may be allocated that is calculated using, as a parameter, $n_{CCE}$ indicating a number of a CCE from among at least one CCE configuring a PDCCH of subframe 3 of a PCC(CC1), which is an embodiment of the implicit allocation. To allocate a response information resource with respect to a remaining codeword of the PDSCH 713, a resource index may be allocated that is calculated using, as a parameter, a value obtained by adding 1 to $n_{CCE}$. As shown in Tables 16, a response information resource with respect to the first codeword of the PDSCH 712 may be indicated by Implicit_p_1(n_CCE, subframe_3), and a response information resource with respect to the second codeword may be indicated by Implicit_p_2(n_CCE+1, ubframe_3).

TABLE 16

| Resource 1 (first CW, PCC-subframe 2) | Resource 2 (second CW, PCC-subframe 2) | Resource 1 (first CW, PCC-subframe 3) | Resource 2 (second CW, PCC-subframe 3) |
| --- | --- | --- | --- |
| Implicit_p_1(n_CCE,subframe_2) | Implicit_p_2(n_CCE+1,subframe_2) | Implicit_p_1(ARI_PAIR,subframe_3) | Explicit_p_2(ARI_PAIR,subframe_3) |

TABLE 17

| Resource 1 (first CW, PCC-subframe 2) | Resource 2 (second CW, PCC-subframe 2) | Resource 1 (first CW, PCC-subframe 3) | Resource 2 (second CW, PCC-subframe 3) |
| --- | --- | --- | --- |
| Implicit_p_1(n_CCE,subframe_2) | Implicit_p_2(n_CCE+1,subframe_2) | Implicit_p_1(n_CCE,subframe_3) | Implicit_p_2(n_CCE+1,subframe_3) |

TABLE 18

| Resource 1 (first CW, PCC-subframe 2) | Resource 2 (second CW, PCC-subframe 2) | Resource 1 (first CW, PCC-subframe 3) | Resource 2 (second CW, PCC-subframe 3) |
| --- | --- | --- | --- |
| Implicit_p_1(n_CCE,subframe_2) | Implicit_p_2(n_CCE+1,subframe_2) | Implicit_p_1(n_CCE,subframe_3) | Explicit_p_2(ARI,subframe_3) |

Table 18 is an example where an ARI value is explicitly used for allocating a resource with respect to a second codeword in subframe 3

Referring to FIGS. 4 through 7, cross carrier scheduling has been performed in subframe 2 in FIGS. 4 and 6. In FIG. 4 where a single codeword is transmitted, a resource with respect to a PDSCH 412 transmitted in CC1 may be implicitly induced based on a first CCE. Resource allocation with respect to the PDSCH 422 of a cross carrier scheduled CC2 (SCC) may be implicitly induced based on a first CCE. In the PDSCH 612 of FIG. 6 for which two codewords are transmitted, resource allocation with respect to a second codeword may be implicitly performed through an n_CCE+1 index (Implicit_p_2(n_CCE+1, subframe_2)). In the case of CC2 of FIG. 6, a PDCCH indicating the PDSCH 622 may be transmitted through a PCC. In this example, a resource may be explicitly allocated using an ARI in the same manner as FDD. When two codewords are transmitted, the ARI mapping table of Table 5 or Table 6 that indicates an explicit resource pair may be used.

The case of cross carrier scheduling has been described with reference to FIGS. 4 through 6. FIG. 7 illustrates the case where cross carrier scheduling is not performed. Response information resource allocation in the case where cross carrier scheduling is not performed (non-cross carrier scheduling) will be described in detail. A function for explicit or implicit response information resource allocation in FIGS. 4 through 7 is merely an embodiment, and a variety of information for the explicit or implicit allocation, in addition to the function, may be used in calculation as parameters.

Figure 8:
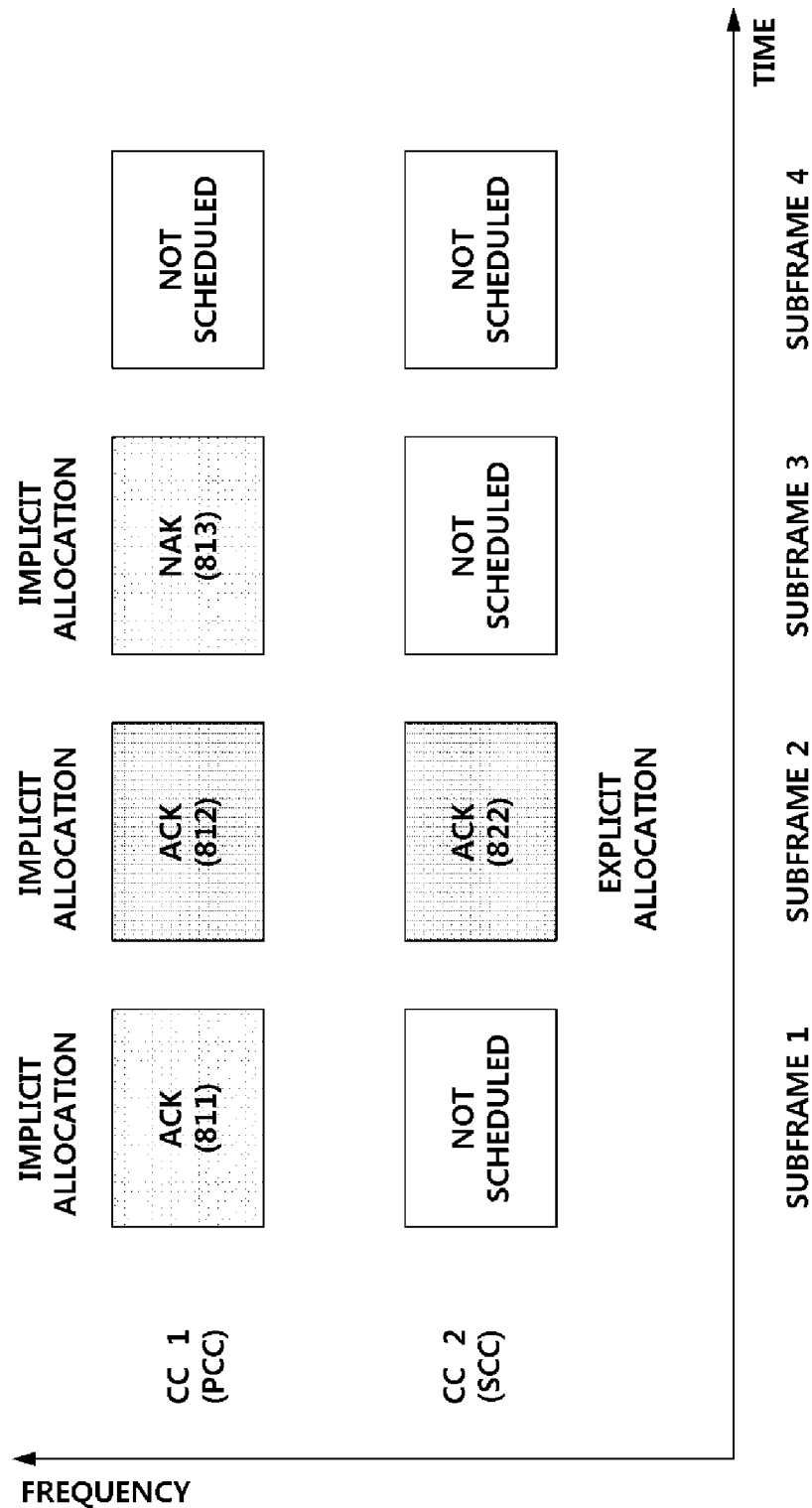
FIG. 8 is a diagram illustrating the case in which a single codeword is transmitted for each PDSCH without cross carrier scheduling according to an embodiment of the present invention.

FIG. 8 is a diagram illustrating the case in which 4 or less PDSCHs are provided and a codeword is transmitted for each PDSCH without cross carrier scheduling according to an embodiment of the present invention. 811, 812, and 813 correspond to PDSCHs transmitted in CC1 corresponding to a PCC, and 822 corresponds to a PDSCH transmitted in CC2 corresponding to an SCC. Unlike FIG. 4, cross carrier scheduling does not exist and thus, a PDCCH with respect to the PDSCH 822 may be included in subframe 2 of CC2 and transmitted. Therefore, in the case where a response information resource is allocated with respect to each PDSCH, 811, 812, and 813 transmitted in the PCC may allocate a resource index that is calculated using, as a parameter, $n_{CCE}$ indicating a number of a CCE from among at least one CCE configuring a PDCCH of the PCC(CC1), which is an embodiment of the implicit allocation as described above. As described with reference to FIG. 4, using $n_{CCE}$ as a parameter, a response information resource may be calculated to be Implicit_p_1 (n_CCE, subframe_1) with respect to the PDSCH 811, a response information resource may be calculated to be Implicit_p_2(n_CCE, subframe_2) with respect to the PDSCH 812, and a response information resource may be calculated to be Implicit_p_3(n_CCE, subframe_3) with respect to the PDSCH 813.

It is the case of non-cross carrier scheduling and thus, $n_{CCE}$ for the PDSCH 812 and $n_{CCE}$ for the PDSCH 822 are independently determined and they may be identical. Therefore, explicit allocation is required with respect to CC2 without allocating a response information resource in $n_{CCE}$. The ARI mapping table of FIG. 4 may be used by using, as an ARI value, a TPC value included in a PDCCH (transmitted in subframe 2 of CC2) with respect to the PDSCH 822 transmitted in subframe 2 of CC2 (Explicit_s_1(ARI, subframe_2)).

An example of response information resource allocation of FIG. 8 may be as shown in Table 19.

TABLE 19

| Resource 1 (PCC-subframe 1) | Resource 2 (PCC-subframe 2) | Resource 3 (PCC-subframe 3) | Resource 1 (SCC-Subframe 2) |
| --- | --- | --- | --- |
| Implicit_p_1(n_CCE, subframe_1) | Implicit_p_2(n_CCE, subframe_2) | Implicit_p_3(n_CCE, subframe_3) | Explicit_s_1(ARI, subframe_2) |

Figure 9:
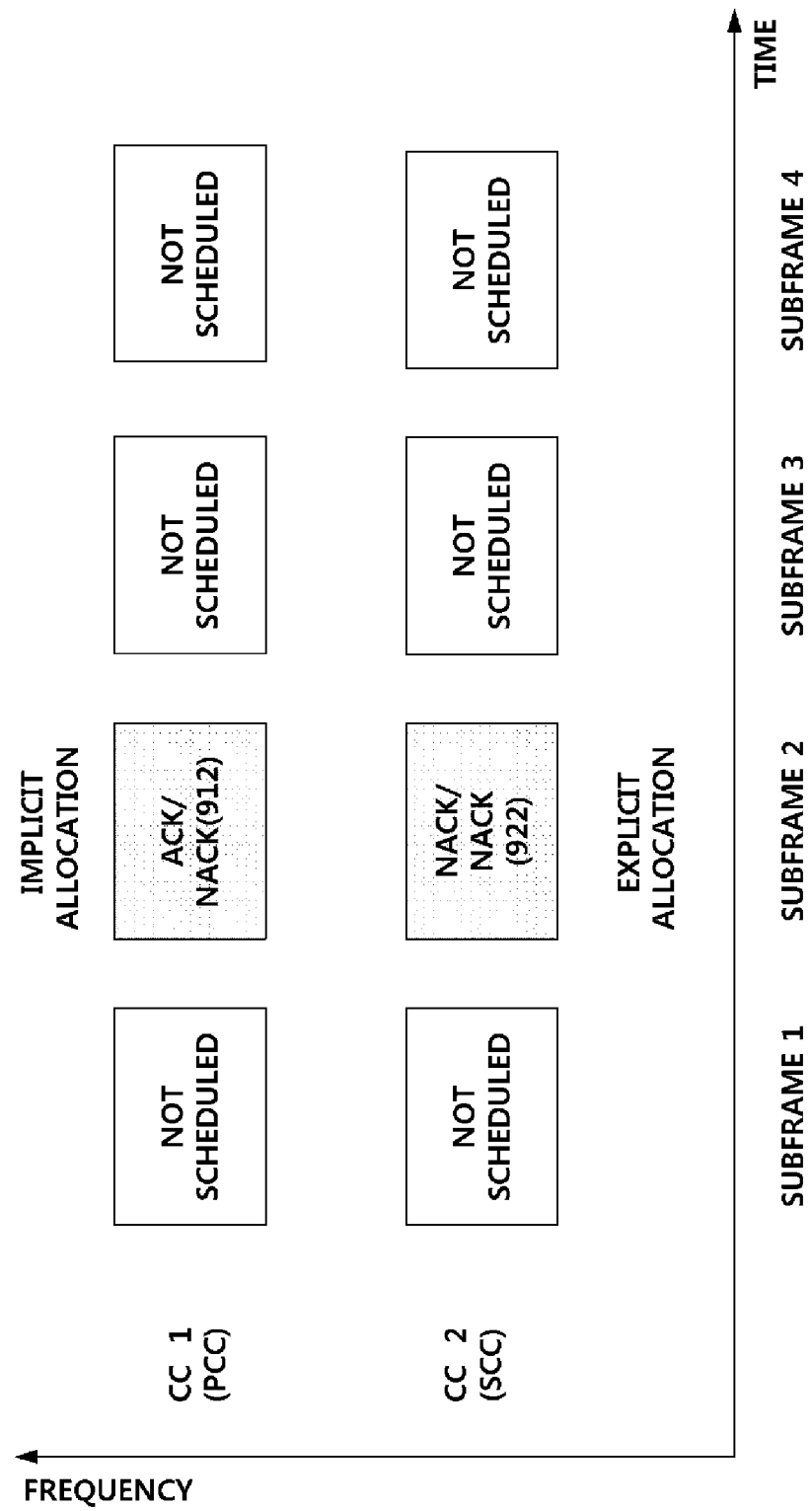
FIG. 9 is a diagram illustrating the case in which two codewords are transmitted for each PDSCH without cross carrier scheduling according to another embodiment of the present invention.

FIG. 9 is a diagram illustrating the case in which 4 or less PDSCHs are provided and two codewords are transmitted for each PDSCH without cross carrier scheduling according to another embodiment of the present invention.

A PDSCH 912 is transmitted in CC1 corresponding to a PCC, and two codewords are transmitted. Therefore, two response information resources are required. A PDSCH 922 is transmitted in CC2 corresponding to an SCC, and two codewords are transmitted and thus, two response information resources are required. CC2 and CC1 are transmitted without cross carrier scheduling and thus, a PDCCH is included in subframe 2 of CC1 and is transmitted with respect to the PDSCH 912, and a PDCCH is included in subframe 2 of CC2 and is transmitted with respect to a PDSCH 922. Therefore, PDCCHs are included in different regions (CC1, CC2) and may have identical $n_{CCE}$ indicating a number of a CCE from among at least one CCE configuring the PDCCH.

Therefore, to allocate a response information resource to one of the two codewords of to the PDSCH 912 transmitted in the PCC, a resource index may be allocated that is calculated using, as a parameter, $n_{CCE}$ indicating a number of a CCE from among at least one CCE configuring the PDCCH of a PCC(CC1), which is an embodiment of the implicit allocation (Implicit_p_1(n_CCE, subframe_2)). To allocate a response information resource with respect to a remaining codeword of the PDSCH 912, a resource index may be allocated that is calculated using, as a parameter, a value obtained by adding 1 to $n_{CCE}$ (Implicit_p_2(n_CCE+1, subframe_2)). The implicit calculation process is illustrated in Table 20.

The PDSCH 922 transmitted through the SCC may also require two response information resources. As described above, $n_{CCE}$ may not be used and an explicit allocation scheme may be used since cross carrier scheduling is not performed. Therefore, Explicit_s_1(ARI_PAIR, subframe2) may be used with respect to a first codeword of the PDSCH 922 and Explicit_s_2(ARI_PAIR, subframe2) may be used with respect to a second codeword, by applying the explicit allocation scheme to the two codewords as shown in Table 20. A TPC value transmitted through subframe 2 may be used as ARI resource indication information, and may also be used as an ARI value for allocating two resources as shown in Table 5 or 6. For example, when Table 5 is used as a mapping table and an ARI value transmitted in subframe 2 is '01', a resource of n3 may be allocated for the first codeword of the PDSCH 922 and a resource of n4 may be allocated for the second codeword of the PDSCH 922.

words are transmitted as shown in FIG. 9, an ARI value may be explicitly allocated and a resource pair may be allocated.

With reference to FIGS. 4 through 9, embodiments associated with the case in which 4 or less codewords are transmitted and also 4 or less response resources thereof are transmitted have been described based on the case of cross carrier scheduling and the case of to non-cross carrier scheduling, and based on the case in which a single codeword is transmitted and the case in which two codewords are transmitted. The described scheme is referred to as a mode A (mode A), and the standard for a number of response information resources, that is, 4, may be different for each embodiment. Bundling is not performed in mode A, and response information resource allocation schemes of FIGS. 4 through 9 may be variously calculated in addition to the schemes described above. Also, in addition to the scheduling schemes of FIGS. 4 through 9, there are various scheduling schemes to be applied. In this case, mechanisms for embodying the present invention may be applied.

An embodiment will be described that allocates a response information resource according to the present invention when bundling is performed, for example, when bundling is performed based on a predetermined standard (e.g., 4 or more response information resources).

As an embodiment of a bundling scheme for a mode B (when applied to TDD according to an embodiment of the present invention), a spatial-time domain bundling (spatial+time domain bundling) may be embodied. Depending on an embodiment, bundling may be performed based on a space or based on a time.

Hereinafter, an embodiment for embodying spatial-time domain bundling will be described based on 4 resources. That is, according to an embodiment of the present invention, there is provided a description based on time-domain bundling 2 where resources (bit) of the 4 response information resources correspond to bundled ACK/NACK information, and remaining 2 resources are used for error handling with respect to a last PDCCH missing case. 4 resources may also be an embodiment, and 3 resources may also be used. According to an embodiment, resource allocation applied to 2 component carrier and a TDD environment will be described.

Figure 10:
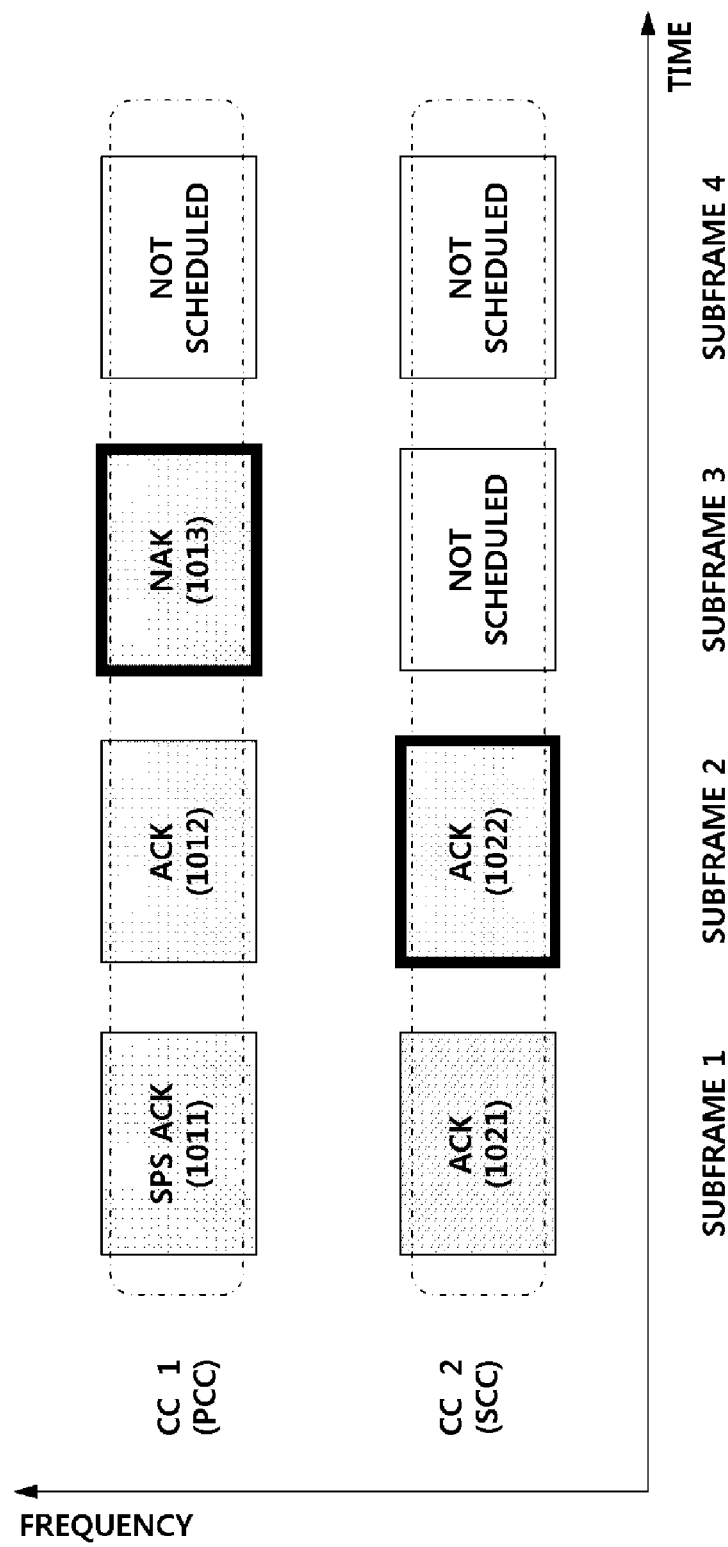
FIG. 10 is a diagram illustrating a wireless transmission environment where allocation of bundled ACK/NACK response information resources is required under a situation of cross carrier scheduling according to an embodiment of the present invention.

FIG. 10 is a diagram illustrating a wireless transmission environment where allocation of bundled ACK/NACK response information resources is required under a situation of cross carrier scheduling according to an embodiment of the present invention. In FIG. 10, although resource allocation is

TABLE 20

| Resource 1<br>(first CW, PCC-<br>subframe 2) | Resource 2<br>(second CW, PCC-<br>subframe 2) | Resource 1<br>(first CW, SCC-<br>subframe 2) | Resource 2<br>(second CW, SCC-<br>subframe 2) |
|---|---|---|---|
| Implicit_p_1(n_C CE,subframe_2) | Implicit_p_2(n_C CE+1,subframe_2) | Explicit_s_1(ARI_ PAIR,subframe_2) | Explicit_s_2(ARI_ PAIR,subframe_2) |

FIGS. 8 and 9 are examples of non-cross carrier scheduling. A response information resource with respect to a PDSCH transmitted in a PCC(CC1) in FIGS. 8 and 9 may be implicitly induced based on a first CCE. Also, response information resource allocation in CC2 may be explicitly performed by non-cross carrier scheduling. When two code-performed based on a PDCCH of the last detected subframe, the present invention may not be limited thereto, and response information resource allocation may be performed using a PDCCH of a subframe selected based on various criteria, such as a subframe received directly before the last detected subframe, the first received subframe, and the like.

Referring to FIG. 10, PDSCHs 1011, 1012, and 1013 are transmitted in subframes 1, 2, and 3 of CC1 (PCC), and PDSCHs 1021 and 1022 are transmitted in subframes 1 and 2 of CC2 (SCC). In subframe 1 of the PCC, SPS (Semi-Persistent Scheduling) is also transmitted. In FIG. 10, the last detected subframe (Last_Detected subframe) in the PCC is subframe 3 through which the PDSCH 1013 is transmitted. In this example, in the case of a first response information resource (Resource 1 PCC) that may be calculated in association with the PCC, an implicit allocation scheme may be applied that uses a value calculated using, as a parameter, $n_{CCE}$ of subframe 3 that a UE last detects, as shown in Table 21, 22, and 23 (Implicit_p_1(n_CCE, Last_detected_subframe)). In the same manner, in the case of a second response information resource (Resource 2 PCC) that may be calculated in association with the PCC, an implicit allocation scheme may be applied that uses a value calculated using, as a parameter, a value obtained by adding 1 to $n_{CCE}$ of subframe 3 that the UE last detects (Implicit_p_2(n_CCE+1, Last_detected_subframe)).

A response information resource calculated in CC2 (SCC) may be implicitly or explicitly allocated since cross carrier scheduling is performed.

Table 21 corresponds to the case where all of the two response resources that may be calculated in CC2 (SCC) are implicitly allocated, and resource allocation may be performed by using Implicit_s_1(n_CCE, Last_detected_subframe) as a first response information resource that is calculated using, as a parameter, $n_{CCE}$ of subframe 2 through which a PDSCH 1022 is transmitted and is last detected in the SCC, and using Implicit_s_2(n_CCE+1, Last_detected_subframe) as a second response information resource that is calculated using, as a parameter, a value obtained by adding 1 to $n_{CCE}$ of subframe 2 that a UE last detects.

Table 22 corresponds to the case where a first response resource is implicitly allocated and a second response resource is explicitly allocated from among the response resources that may be calculated in CC2 (SCC). As the first response information resource, Implicit_s_1(n_CCE, Last_detected_subframe) may be used. For explicit allocation, Explicit_s_2(ARI, Last_detected_subframe) may be used as the second response information resources, and a response information resource may be explicitly allocated using an ARI value included in a TPC of subframe 2 that detected last in the SCC.

In Table 23, all response resources that may be calculated in CC2(SCC) are explicitly allocated. A response information resource may be explicitly indicated using, as an ARI value, a TPC transmitted in subframe 2 that a UE detects last in the SCC. That is, response information resources calculated with respect to a first response information resource Explicit_s_1 (ARI_PAIR, Last_detected_subframe) and a second response information resource Explicit_s_2(ARI_PAIR, Last_detected_subframe) are allocated. That is, a resource pair as shown in an embodiment of Tables 5 and 6 may be selected from a TPC value.

Table 24 corresponds to an embodiment configured in the same mechanism as Tables 21, 22, and 23.

TABLE 21

| Resource 1 (PCC) | Resource 2 (PCC) | Resource 1 (SCC) | Resource 2(SCC) |
| --- | --- | --- | --- |
| Implicit_p_1(n_CCE, Last_detected_subframe) | Implicit_p_2(n_CCE+1, Last_detected_subframe) | Implicit_s_1(n_CCE, Last_detected_subframe) | Implicit_s_2(n_CCE+1, Last_detected_subframe) |

TABLE 22

| Resource 1 (PCC) | Resource 2 (PCC) | Resource 1 (SCC) | Resource 2(SCC) |
| --- | --- | --- | --- |
| Implicit_p_1(n_CCE, Last_detected_subframe) | Implicit_p_2(n_CCE+1, Last_detected_subframe) | Implicit_s_1(n_CCE, Last_detected_subframe) | Explicit_s_2(ARI, Last_detected_subframe) |

TABLE 23

| Resource 1 (PCC) | Resource 2 (PCC) | Resource 1 (SCC) | Resource 2(SCC) |
| --- | --- | --- | --- |
| Implicit_p_1(n_CCE, Last_detected_subframe) | Implicit_p_2(n_CCE+1, Last_detected_subframe) | Explicit_s_1(ARI_PAIR, Last_detected_subframe) | Explicit_s_2(ARI_PAIR, Last_detected_subframe) |

TABLE 24

| Resource 1 (PCC) | Resource 2 (PCC) | Resource 1 (SCC) | Resource 2(SCC) |
| --- | --- | --- | --- |
| Implicit_p_1(n_CCE, Last_detected_subframe) | Explicit_p_2(ARI_PAIR, Last_detected_subframe) | Implicit_s_1(n_CCE, Last_detected_subframe) | Explicit_s_2(ARI_PAIR, Last_detected_subframe) |

Figure 11:
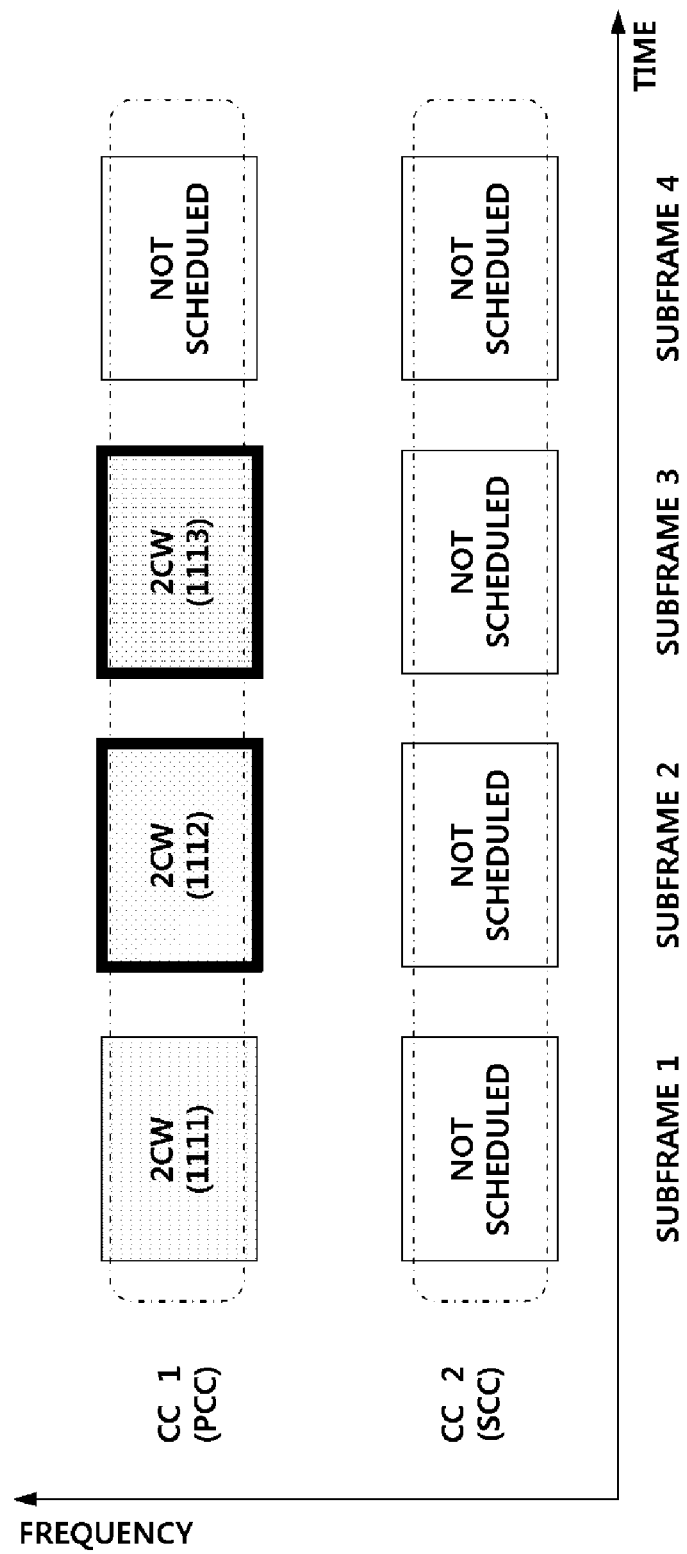
FIG. 11 is a diagram illustrating the case in which two codewords are transmitted over only a PCC under a situation of cross carrier scheduling according to an embodiment of the present invention.

FIG. 11 is a diagram illustrating a wireless transmission environment where allocation of a bundled ACK/NACK response information resource is required when PDSCHs 1111, 1112, and 1113 are transmitted in only a PCC under a situation of cross carrier scheduling, and two codewords are transmitted for each PDSCH, according to an embodiment of the present invention. In FIG. 11, resource allocation is performed based on a PDCCH of last detected subframe 3 through which the PDSCH 1113 is transmitted and a PDCCH of subframe 2 corresponding to a previous subframe of the last detected subframe, through which the PDSCH 1112 is transmitted. However, the present invention may not be limited thereto, and response to information resource allocation may be performed using a PDCCH of a subframe selected based on various criteria such as a first detected subframe and a last detected subframe, a first detected subframe and a subsequently detected subframe, and the like.

To allocate 4 response information resources, two response information resources may be explicitly allocated and the remaining two response information resources may be implicitly allocated. As provided in Table 25, a TPC value included in last detected subframe 3 through which the PDSCH 1113 is transmitted is used as an ARI value, and may be used as an ARI_PAIR indicating two response information resources. In this example, with respect to the first response information resource and the second response information resource, a set of two resources calculated based on Table 5 or 6 using a TPC value of the last detected subframe 3 (Last_detected_subframe) as an ARI_PAIR may be used as response information resources, that is, (Explicit_p_1(ARI_PAIR, Last_detected_subframe) and Explicit_p_2(ARI_PAIR, Last_detected_subframe)).

With respect to remaining two response information resources, an implicit allocation scheme may be applied that uses values calculated using, as parameters, $n_{CCE}$ of subframe 2, corresponds to a subframe (Last_detected_Subframe-1) directly before the last detected subframe, through which the PDSCH 1112 is transmitted, and a value obtained by adding 1 to $n_{CCE}$ (Implicit_p_1(n_CCE, Last_detected_subframe-1) and Implicit_p_2(n_CCE+1, Last_detected_subframe-1)). This is shown in Table 25.

TABLE 25

| Resource 1 (PCC) | Resource 2 (PCC) | Resource 3 (PCC) | Resource 4 (PCC) |
|---|---|---|---|
| Explicit_p_1(ARI_PAIR, Last_detected_subframe) | Explicit_p_2(ARI_PAIR, Last_detected_subframe) | Implicit_p_1(n_CCE, Last_detected_Subframe-1) | Implicit_p_2(n_CCE+1, Last_detected_Subframe-1) |

As an embodiment different from FIG. 11, implicit resource allocation is performed with respect to a PCC, and explicit resource allocation is performed with respect to an SCC, as shown in Table 26 and Table 27.

TABLE 26

| Resource 1 (PCC) | Resource 2 (PCC) | Resource 1 (SCC) | Resource 2(SCC) |
|---|---|---|---|
| Implicit_p_1(n_CCE, Last_detected_subframe) | Implicit_p_2(n_CCE+1, Last_detected_subframe) | Explicit_s_1(ARI_PAIR, Last_detected_subframe) | Explicit_s_2(ARI_PAIR, Last_detected_subframe) |

TABLE 27

| Resource 1 (PCC) | Resource 2 (PCC) | Resource 1 (SCC) | Resource 2(SCC) |
|---|---|---|---|
| Implicit_p_1(n_CCE, Last_detected_subframe) | Implicit_p_2(n_CCE+1, Last_detected_Subframe-1) | Explicit_s_1(ARI_PAIR, Last_detected_subframe) | Explicit_s_2(ARI_PAIR, Last_detected_subframe) |

Figure 12:
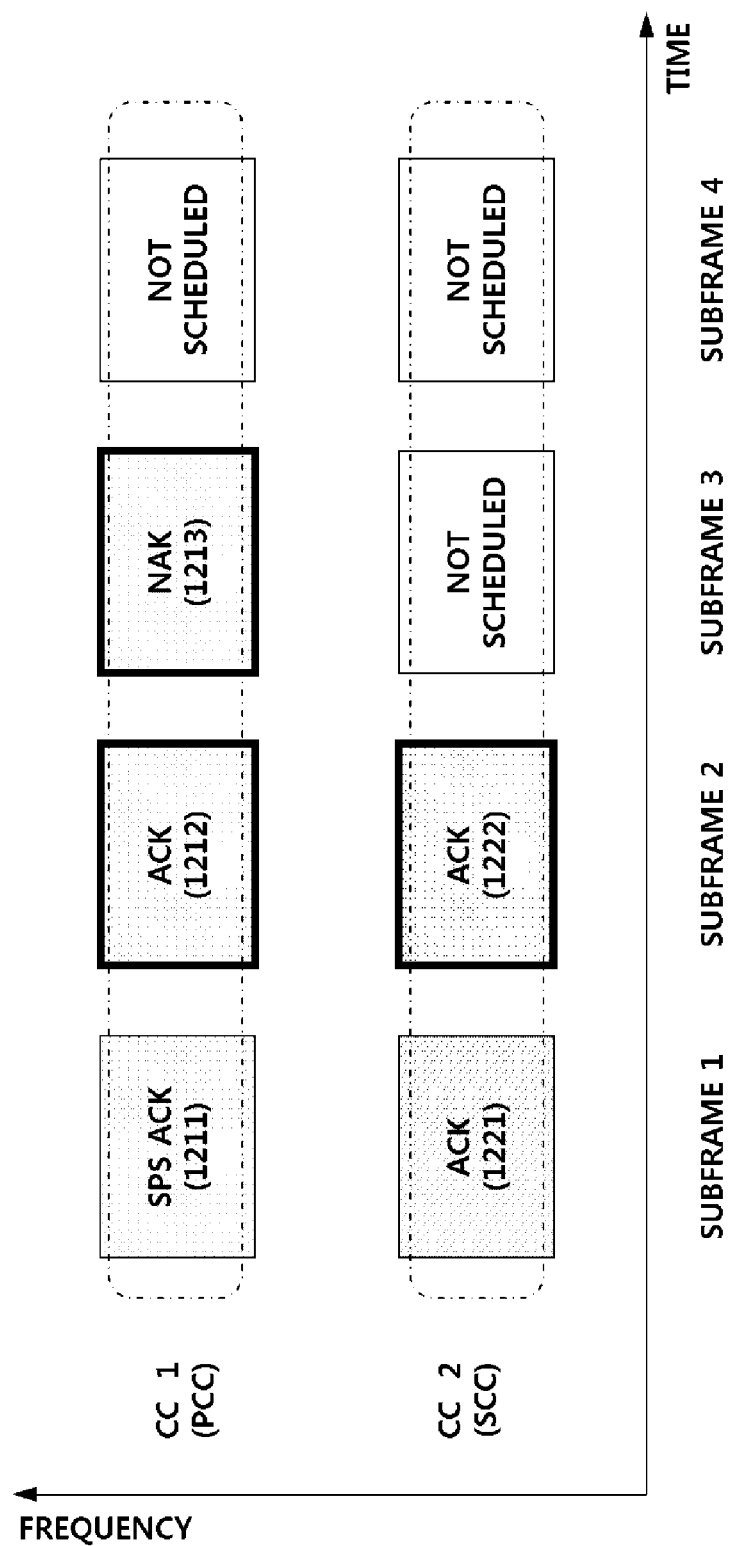
FIG. 12 is a diagram illustrating an example of resource allocation based on PDCCHs of last two subframes on a PCC that are detected by a user equipment in the PCC under a situation of cross carrier scheduling according to an embodiment of the present invention.

FIG. 12 is a diagram illustrating an example of resource allocation based on PDCCHs of the last two subframes on a PCC, which are detected by a user equipment in the PCC under a situation of cross carrier scheduling according to an embodiment of the present invention. PDSCHs 1211, 1212, and 1213 are transmitted in a PCC, and PDSCHs 1221 and 1222 are transmitted in an SCC. With respect to FIG. 12, three examples of resource allocation will be described as shown in Table 28, 29, and 30. However, resource allocation may be performed by applying another embodiment of the present invention with respect to FIG. 12.

Table 28 will be described in detail as follows.

TABLE 28

| Resource 1 (PCC) | Resource 2 (PCC) | Resource 1 (SCC) | Resource 2 (SCC) |
|---|---|---|---|
| Implicit_p_1(n_CCE, Last_detected_subframe) | Implicit_p_2(n_CCE, Last_detected_subframe-1) Explicit_p_2(ARI, Last_detected_subframe-1) | Implicit_s_1(n_CCE, Last_detected_subframe) | Implicit_s_2(n_CCE+1, Last_detected_subframe) Explicit_s_2(ARI, Last_detected_subframe) |

In the case of an allocation resource calculated in the PCC, a response information resource may be implicitly allocated using information calculated in two last detected subframes (subframes 2 and 3). That is, an implicit allocation scheme that uses, as a first response information resource, a value that is calculated using, as a parameter, $n_{CCE}$ of subframe 3 that is a subframe (Last_detected_Subframe) through which a PDSCH 1213 is transmitted may be applied (Implicit_p_1 (n_CCE, Last_detected_subframe).

An implicit allocation scheme that uses, as a second response information resource, a value that is calculated using, as a parameter, $n_{CCE}$ of subframe 2 that is a subframe (Last_detected_Subframe-1) through which a PDSCH 1212 is transmitted may be applied (Implicit_p_1(n_CCE, Last_detected_subframe-1), and an ARI mapping value indicated by a TPC of subframe 2 that is the subframe through which the PDSCH 1212 is transmitted may be explicitly used (Explicit_p_2(ARI, Last_detected_subframe-1)).

Two response information resources may be calculated using, as a parameter, $n_{CCE}$ of subframe 2, corresponding to a subframe last detected in an SCC, through which the PDSCH 1222 is transmitted (Implicit_s_1(n_CCE, Last_detected_subframe) and Implicit_s_2(n_CCE+1, Last_detected_subframe)). Also, an ARI mapping value indicated by a TPC of subframe 2 that is a subframe through which the PDSCH 1222 is transmitted may be explicitly used (Explicit_s_2 (ARI, Last_detected_subframe)).

TABLE 29

| Resource 1 (PCC) | Resource 2 (PCC) | Resource 1 (SCC) | Resource 2(SCC) |
|---|---|---|---|
| Implicit_p_1(n_CCE, Last_detected_subframe) | Explicit_p_2(ARI, Last_detected_subframe-1) | Explicit_s_1(ARI_PAIR, Last_detected_subframe) | Explicit_s_2(ARI_PAIR, Last_detected_subframe) |

Referring to Table 29, an implicit allocation scheme is used with respect to a first response information resource of the PCC and an explicit allocation scheme is used with respect to a second resource. That is, for the first response information resource of the PCC, an implicit allocation scheme that uses a value calculated using, as a parameter, $n_{CCE}$ of subframe 3 that is a subframe (Last_detected_Subframe) through which the PDSCH 1213 is transmitted may be applied (Implicit_p_1 (n_CCE, Last_detected_subframe). For the second response information resource, an ARI value that is calculated from a TPC of subframe 2 that is a subframe (Last_detected_Subframe-1) through which the PDSCH 1212 is transmitted may be explicitly used (Explicit_p_2(ARI, Last_detected_subframe-1)).

To indicate two response information resources with respect to the SCC, a set of two resources may be indicated by using an ARI corresponding to a TPC value of subframe 2 that is a subframe (Last_detected_Subframe) through which the PDSCH 1222 is transmitted (Explicit_s_1(ARI_PAIR, Last_detected_subframe) and Explicit_s_2(ARI_PAIR, Last_detected_subframe)).

TABLE 30

| Resource 1 (PCC) | Resource 2 (PCC) | Resource 1 (SCC) | Resource 2(SCC) |
|---|---|---|---|
| Explicit_p_1(ARI_PAIR, Last_detected_subframe-1) | Explicit_p_2(ARI_PAIR, Last_detected_subframe-1) | Explicit_s_1(ARI_PAIR, Last_detected_subframe) | Explicit_s_2(ARI_PAIR, Last_detected_subframe) |

Referring to Table 30, it is associated with an embodiment in which a resource is explicitly indicated for both the PCC and the SCC. That is, a set of two resources may be indicated using an ARI corresponding to a TPC value of subframe 2, corresponding to a previous subframe (Last_detected_Subframe-1) of a subframe last detected in the PCC, through which the PDSCH 1212 is transmitted (Explicit_p_1(ARI_PAIR, Last_detected_subframe-1) and Explicit_p_2(ARI_PAIR, Last_detected_subframe-1)). A set of two resources may be indicated using an ARI corresponding to a TPC value of subframe 2, corresponding to a subframe (Last_detected_Subframe) last detected in the SCC, through which the PDSCH 1222 is transmitted (Explicit_s_1(ARI_PAIR, Last_detected_subframe) and Explicit_s_2(ARI_PAIR, Last_detected_subframe)).

Also, to indicate 4 resources, it is embodied that a set of 4 resources is indicated by an ARI_PAIR. Table 31 corresponds to an example of allocating a set of 4 resources using an ARI_PAIR through a subframe of the PCC, and Table 32 corresponds to an example of allocating a set of 4 resources isare using an ARI_PAIR through a subframe of the SCC. Both cases may use an explicit allocation scheme associated with a set of four resources of Table 9 or 10.

TABLE 31

| Resource 1 (PCC) | Resource 2 (PCC) | Resource 1 (SCC) | Resource 2(SCC) |
| --- | --- | --- | --- |
| Explicit_p1(ARI_PAIR, Last_detected_subframe) | Explicit_p2(ARI_PAIR, Last_detected_subframe) | Explicit_p3(ARI_PAIR, Last_detected_subframe) | Explicit_p4(ARI_PAIR, Last_detected_subframe) |

TABLE 32

| Resource 1 (PCC) | Resource 2 (PCC) | Resource 1 (SCC) | Resource 2(SCC) |
| --- | --- | --- | --- |
| Explicit_s1(ARI_PAIR, Last_detected_subframe) | Explicit_s2(ARI_PAIR, Last_detected_subframe) | Explicit_s3(ARI_PAIR, Last_detected_subframe) | Explicit_s4(ARI_PAIR, Last_detected_subframe) |

In FIGS. 10 through 12 as described above, it may be applied under a situation of cross-carrier scheduling. In the case of non-cross carrier scheduling, $n_{CCE}$ of the PCC may not be used for indicating a response information resource in the SCC, that is, may not be used for both the PCC/SCC and thus, an explicit allocation scheme and an implicit allocation scheme may be applied as shown in Tables 33 through 35

TABLE 33

| Resource 1 (PCC) | Resource 2 (PCC) | Resource 1 (SCC) | Resource 2 (SCC) |
| --- | --- | --- | --- |
| Implicit_p_1(n_CCE, Last_detected_subframe) | Implicit_p_2(n_CCE+1, Last_detected_subframe) | Explicit_s_1(ARI_PAIR, Last_detected_subframe) | Explicit_s_2(ARI_PAIR, Last_detected_subframe) |

Referring to Table 33, to allocate 4 resources, Implicit_p_1 (n_CCE, Last_detected_subframe) may be used as a first response information resource that is a value calculated using, as a parameter, $n_{CCE}$ of a subframe (Last_detected_subframe) transmitted last in the PCC, and Implicit_p_2 (n_CCE+1, Last_detected_subframe) that is a value calculated by adding 1 to $n_{CCE}$ of the last transmitted subframe that has been used may be used as a second response information resource.

In the SCC, allocation may be explicitly performed that uses a TPC value of a last detected subframe (Last_detected_subframe). That is, the TPC of the last detected subframe is mapped to an ARI value indicting a set of resources as shown in Tables 5 and 6 using Explicit_s_1(ARI_PAIR, Last_detected_subframe) and Explicit_s_2(ARI_PAIR, Last_detected_subframe) and thus, two response information resources may be allocated.

TABLE 34

| Resource 1 (PCC) | Resource 2 (PCC) | Resource 1 (SCC) | Resource 2 (SCC) |
| --- | --- | --- | --- |
| Explicit_p_1(ARI_PAIR, Last_detected_subframe−1) | Explicit_p_2(ARI_PAIR, Last_detected_subframe−1) | Explicit_s_1(ARI_PAIR, Last_detected_subframe) | Explicit_s_2(ARI_PAIR, Last_detected_subframe) |

Table 34 is an embodiment that explicitly indicates a resource for both the PCC and the SCC, like the Table 30. That is, a set of two resources may be indicated using an ARI corresponding to a TPC value of a previous subframe (Last_detected_Subframe-1) of the last detected subframe of the PCC (Explicit_p_1(ARI_PAIR, Last_detected_subframe-1) and Explicit_p_2(ARI_PAIR, Last_detected_subframe-1)). a set of two resources may be indicated using an ARI corresponding a TPC value of the last detected subframe of the SCC (Explicit_s_1(ARI_PAIR, Last_detected_subframe) and Explicit_s_2(ARI_PAIR, Last_detected_subframe)).

TABLE 35

| Resource 1 (PCC) | Resource 2 (PCC) | Resource 1 (SCC) | Resource 2 (SCC) |
|---|---|---|---|
| Implicit_p_1(n_CCE, Last_detected_subframe) | Explicit_p_2(ARI, Last_detected_subframe-1) | Explicit_s_1(ARI_PAIR, Last_detected_subframe) | Explicit_s_2(ARI_PAIR, Last_detected_subframe) |

Table 35 may perform implicit allocation for a first response information resource of the PCC, and may perform explicit allocation for a second resource, like Table 29. That is, for the first response information resource of the PCC, an implicit allocation scheme that uses a value calculated using, as a parameter, $n_{CCE}$ of a last detected subframe (Last_detected_Subframe). For the second response information resource, an ARI value calculated from a TPC of a previous subframe (Last_detected_Subframe-1) of the last detected subframe may be used (Explicit_p_2(ARI, Last_detected_subframe-1)).

To indicate two response information resources for the SCC, a set of two resources may be indicated using an ARI corresponding to a TPC value of the last transmitted subframe (Last_detected_Subframe) (Explicit_s_1(ARI_PAIR, Last_detected_subframe) and Explicit_s_2(ARI_PAIR, Last_detected_subframe)).

FIGS. 4 through 12 and Tables 11 through 35 provide an embodiment of the present invention in which a base station implicitly or explicitly indicates a response information resource based on a signal transmission condition (a number of codewords and whether cross carrier scheduling is performed) or whether bundling is performed in a wireless communication network, so as to enable a user equipment to calculate a response information resource without a collision, and the user equipment determines the indication. Varied alternatives may be provided for various situations. The base station and the user equipment may statically use a predetermined scheme, or the user equipment determines indication for a response information resource through signaling of a scheme to be used during a predetermined period of time from among varied schemes, and includes response information in a resource indicated by the base station for transmission in an uplink. An embodiment of the signaling scheme may be an RRC signaling, but this may not be limited thereto. Also, a scheme (implicit signaling) that determines that signaling is implicitly performed may be used although signaling between the user equipment and the base station is not performed separately. In an embodiment of the present invention, this may be applicable when a number of CCEs configuring a PDCCH is 2. This may be limited to the case where an ARI is applicable, and may be applied to various embodiments described above.

FIGS. 4 through 12 and Tables 11 through 35 correspond to an embodiment that uses a TPC field for resource allocation, and a subframe having a PDCCH received first in a PCC may use a TPC field in the corresponding PDCCH according to the original use of the TPC and may control transmission power (electric power). All TPCs in remaining subframes on the PCC may be used as ARIs, and all PDCCHs corresponding to an SCC may be used as ARIs. As an embodiment to achieve the above, an ARI value may indicate a single value. In this example, when indices of the PCC/SCC are used, the indices may be mixed together for referring to an ARI value in an explicit resource allocation, and it may be embodied that which component carrier corresponds to a subframe including a TPC field to be used does not matter. That is, TPC values of subframes (both the PCC and SCC) excluding a TPC field of a first subframe on the PCC may be indicated by a single value and thus, a predetermined subframe may not need to be specified. In this example, according to an embodiment of the present invention, it may be embodied that a subframe of Explicit_p_n(ARI. subframe) (n is an identifier to identify a function that calculates a response information resource) and a subframe of Explicit_s_n(ARI. subframe) (n is an identifier to identify a function that calculates a response information resource) are not separately designated in above tables. Also, it may be embodied that a TPC value included in each subframe indicates a different ARI to allocate a larger number of resources. In a predetermined mode (e.g., time with spatial bundling), a subframe may be designated or set in advance for implicit resource allocation. For example, a subframe that a UE detects last in a PCC or a previous subframe of the last detected subframe may be used.

Figure 13:
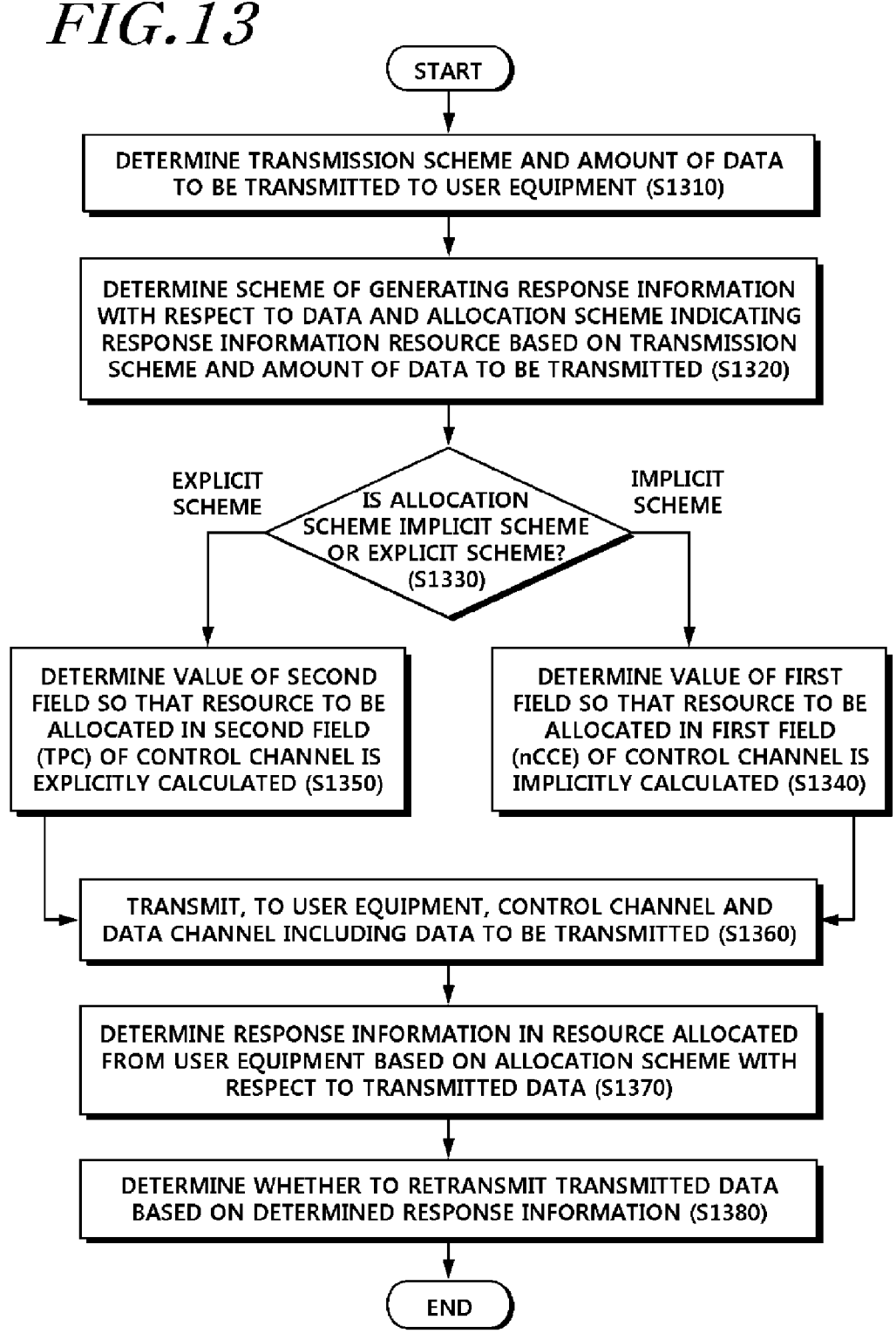
FIG. 13 is a diagram illustrating a process of including information indicating a response information resource in a control channel when a base station transmits a signal to a data channel according to an embodiment of the present invention.

FIG. 13 is a diagram illustrating a process of including information indicating a response information resource in a control channel when a base station transmits a signal to a data channel according to an embodiment of the present invention. An embodiment of the control channel may be a PDCCH, and an embodiment of the data channel may be a PDSCH. Response information may be various such as ACK/NACK/DTX and the like.

First, a transmission scheme or an amount of data to be transmitted to a user equipment from a data channel is determined in step S1310. Determining whether a single codeword or two codewords are transmitted, determining whether cross carrier scheduling or non-cross carrier scheduling is used as a transmission scheme, and the like may be included.

A scheme of generating response information with respect to the data and an allocation scheme that indicates a response information resource are determined based on the amount of data to be transmitted or the transmission scheme in step S1320. The scheme of generating the response information may be one of a scheme of generating response information by bundling a plurality of pieces of response information and a scheme of generating response information by multiplexing a plurality of pieces of response information.

The allocation scheme may be one of an implicit allocation scheme that implicitly performs calculation in a first field and an explicit allocation scheme that explicitly performs calculation in a second field in step S1330. The first field is a field applied to calculation of an allocation resource of the control channel, and may correspond to $n_{CCE}$ that has been described above, and the second field is a field applied to calculation of power control information of the control channel, and may correspond to a TPC.

Therefore, an allocation scheme to be used may be determined and step S1340 or S1350 may be performed. First, in the case of implicit allocation, a value of the first field may be determined so that a resource to be allocated in the first field ($n_{CCE}$) of the control channel is implicitly calculated as in step S1340. In the case where indicating a plurality of response information resources is required, a resource adjacent to the resource implicitly allocated in the first field may be allocated as the response information resource. This has been described through the example that allocates a response information resource by adding 1 or more to $n_{CCE}$.

In the case of an explicit allocation scheme, a value of the second field may be determined so that a resource to be allocated in the second field (TPC) of the control channel is explicitly calculated as in step S1350. An embodiment that uses cross carrier scheduling or performs bundling may include an example of indicating resource allocation of an ARI table using a TPC value. Also, in the case where two or more response information resources are indicated, the second field may be indication information indicating a set of two or more resources.

The control channel including the fields determined to indicate a resource and the data channel including data to be transmitted are transmitted to the user equipment in step S1360.

Response information may be determined in a resource allocated from the user equipment based on the allocation scheme with respect to the transmitted data in step S1370. The response information resource transmitted by the user equipment may be resource determined in step S1340 and step S1350. HARQ may be performed by determining whether to perform retransmission of the transmitted data based on the transmitted response information in the corresponding resource in step S1380.

The data transmission scheme or the amount of data to be transmitted, the scheme of generating the response information, and the resource allocation and indication scheme have been described with reference to FIGS. 4 through 12 and Tables 11 through 29. They may be variously selected based on varied transmission environments, and when a plurality of transmission schemes exist in a predetermined environment, a base station may perform signaling, with respect to a user equipment, associated with a scheme to be used in advance. Also, when the transmission scheme is predefined and the base station and the user equipment store the corresponding information, the signaling may not be required. The response information resource may be transmitted through an uplink control channel.

Figure 14:
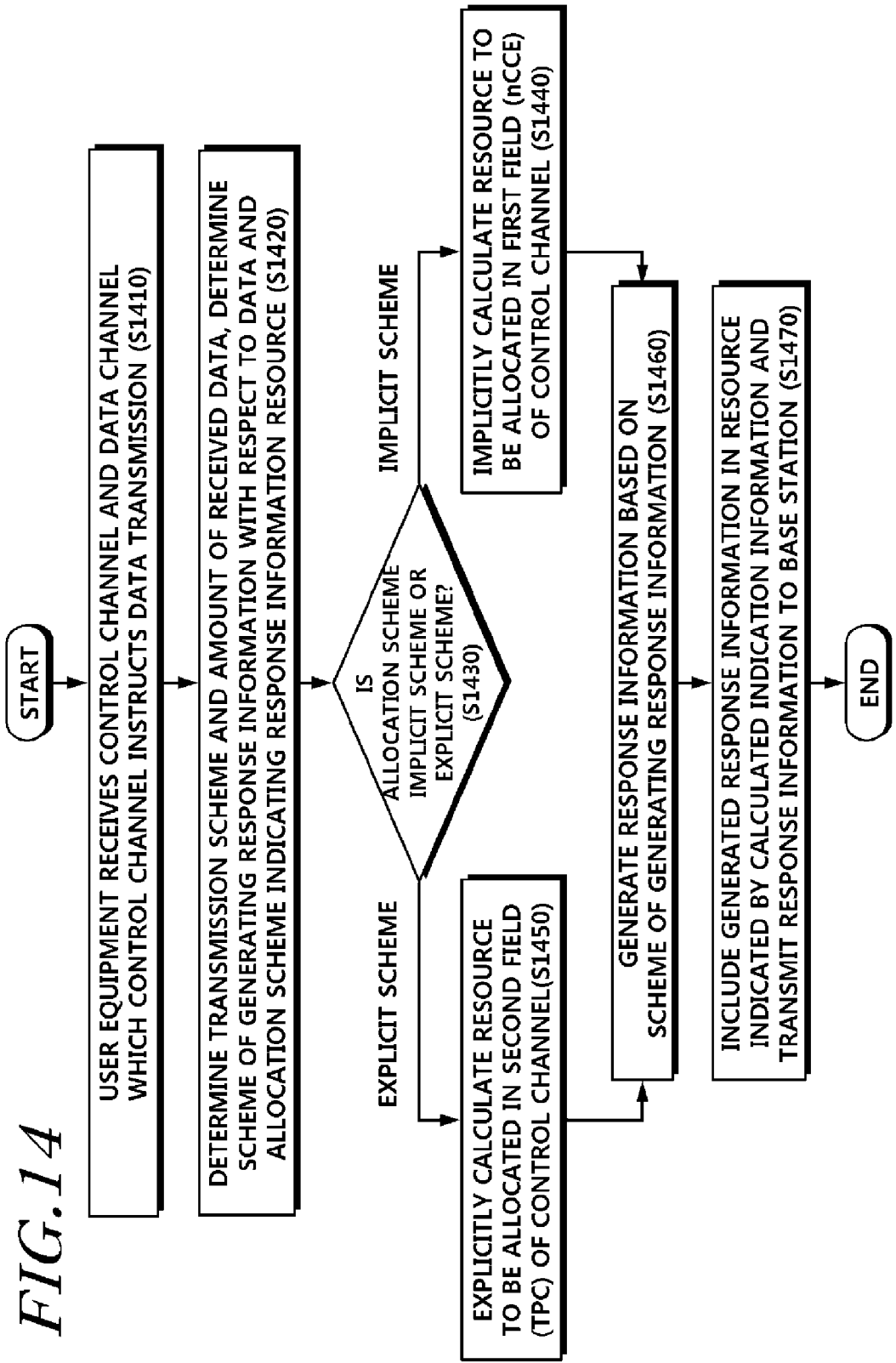
FIG. 14 is a diagram illustrating a process of processing performed in a user equipment that receives a signal included in a data channel transmitted from a base station, and transmits response information in response to the reception according to an embodiment of the present invention.

FIG. 14 is a diagram illustrating a process of processing performed in a user equipment that receives a signal included in a data channel transmitted from a base station, and transmits response information in response to the reception according to an embodiment of the present invention. An embodiment of a control channel may be a PDCCH that has been described above, and an embodiment of the data channel may be a PDSCH. Response information may be various such as ACK/NACK/DTX and the like.

The user equipment receives, from the base station, a control channel and a data channel which the control channel instructs data transmission in step S1410. An amount of the received data or transmission scheme is determined, and a scheme of generating response information with respect to the data and an allocation scheme indicating the response information resource are determined based on the amount of the received data or the transmission scheme in step S1420. The scheme of generating the response information may be one of a scheme of generating response information by bundling a plurality of pieces of response information and a scheme of generating response information by multiplexing a plurality of pieces of response information. The indication information for allocating a resource may be generated and transmitted by the base station based on an implicit or explicit allocation scheme in step S1430. More particularly, the allocation scheme may be one of an implicit allocation scheme that implicitly performs calculation in a first field of the control channel and an explicit allocation scheme that explicitly performs calculation in a second field of the control channel. The first field is a field applied to calculation of an allocation resource of the control channel, and may correspond to $n_{CCE}$ that has been described above, and the second field is a field applied to calculation of power control information of the control channel, and may correspond to a TPC that has been described above.

Therefore, the user equipment proceeds with step S1440 or step S1450 based on an allocation scheme that is used based on an environment where the data is transmitted, and information associated with signaling performed with the base station, and the like. First, in the case of implicit allocation, a resource to be allocated in the first field ($n_{CCE}$) of the control channel is implicitly calculated and the corresponding resource is used as in step S1440. In the case where indicating a plurality of response information resources is required, a resource adjacent to the resource implicitly allocated in the first field may be allocated as the response information resource. This has been described through the example that allocates a response information resource by adding 1 or more to $n_{CCE}$.

In the case of the explicit allocation scheme, a resource to be allocated in the second field (TPC) of the control channel is explicitly calculated and the corresponding resource is used as in step S1450. An embodiment that uses cross carrier scheduling or performs bundling may include an example of indicating resource allocation of an ARI table using a TPC value. Also, in the case where two or more response information resources are indicated, a set of two or more resources may be allocated using the second field value.

Response information is generated based on the scheme of generating response information, and the generated response information is included in the allocated resource (the resource calculated based on indication information) and is transmitted to the base station in step S1470. The base station may perform an HARQ process based on the transmitted response information.

The data transmission scheme or the amount of the received data, the scheme of generating the response information, and the resource allocation and indication scheme have been described with reference to FIGS. 4 through 12 and Tables 11 through 29. They may be variously selected based on varied transmission environments, and when a plurality of transmission schemes exist in a predetermined environment, the base station may perform, with respect to the user equipment, signaling associated with a scheme to be used in advance. Also, when the transmission scheme is predefined and the base station and the user equipment store the corresponding information, the signaling may not be required. The user equipment determines a region to which a response information resource is allocated based on an environment where the data is transmitted and information signaled by the base station, and includes response information in an allocated resource for transmission. The response information resource may be transmitted through an uplink control channel.

Figure 15:
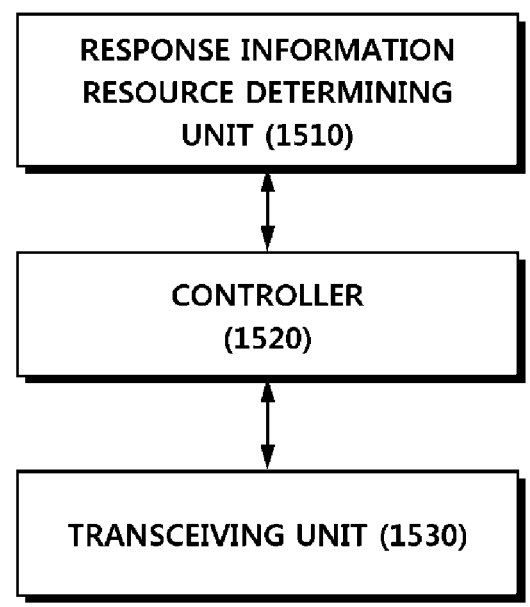
FIG. 15 is a diagram illustrating a configuration of a base station according to an embodiment of the present invention.

FIG. 15 is a diagram illustrating a configuration of a base station according to an embodiment of the present invention.

An embodiment of a control channel may be a PDCCH that has been described above, and an embodiment of a data channel may be a PDSCH. Response information may be various such as ACK/NACK/DTX and the like. The entire configuration includes a response information resource determining unit 1510, a controller 1520, and a transceiving unit 1530. The response information resource determining unit 1510 determines a transmission scheme or an amount of data to be transmitted to a user equipment from a data channel, and determines a scheme of generating response information with respect to the data and an allocation scheme that indicates a response information resource based on the transmission scheme or the amount of data to be transmitted. For the determination, the transmission scheme or the amount of data to be transmitted to the user equipment may be determined. Determining whether a single codeword or two codewords are transmitted, determining whether cross carrier scheduling or non-cross carrier scheduling is used as the transmission scheme, and the like may be included.

The scheme of generating the response information may be one of a scheme of generating response information by bundling a plurality of pieces of response information and a scheme of generating response information by multiplexing a plurality of pieces of response information.

The allocation scheme may be one of an implicit allocation scheme that implicitly performs calculation in a first field of a control channel and an explicit allocation scheme that explicitly performs calculation in a second field of the control channel. The first field is a field applied to calculation of an allocation resource of the control channel, and may correspond to $n_{CCE}$ that has been described above, and the second field is a field applied to calculation of power control information of the control channel, and may correspond to a TPC that has been described above.

Therefore, when the response information resource determining unit 1510 determines the use of the implicit allocation scheme, a value of the first field may be determined so that a resource to be allocated in the first field ($n_{CCE}$) of the control channel is implicitly calculated. In the case where indicating a plurality of response information resources is required, a resource adjacent to the resource implicitly allocated in the first field may be allocated as the response information resource. This has been described through the example that allocates a response information resource by adding 1 or more to $n_{CCE}$. In the case of an explicit allocation scheme, a value of the second field may be determined so that a resource to be allocated in the second field (TPC) of the control channel is explicitly calculated. An embodiment that uses cross carrier scheduling or performs bundling may include an example of indicating resource allocation of an ARI table using a TPC value. Also, in the case where two or more response information resources are indicated, the second field may be indication information indicating a set of two or more resources.

The controller 1520 sets a value of a predetermined field of the control channel based on the determined allocation scheme, and the transceiving unit 1530 transmits, to the user equipment, the control channel and the data channel including the data to be transmitted, and receives response information transmitted from the user equipment with respect to the transmitted data, in a resource allocated based on the allocation scheme. The controller 1520 determines the transmitted response information, and determines whether to retransmit the transmitted data based on the determined response information.

The data transmission scheme or the amount of data to be transmitted, the scheme of generating the response information, and the resource allocation and indication scheme have been described with reference to FIGS. 4 through 12 and Tables 11 through 29. They may be variously selected based on varied transmission environments, and when a plurality of transmission schemes exist in a predetermined environment, the base station may perform, with respect to the user equipment, signaling associated with a scheme to be used in advance. The transmitted response information resource may be transmitted through an uplink control channel.

Figure 16:
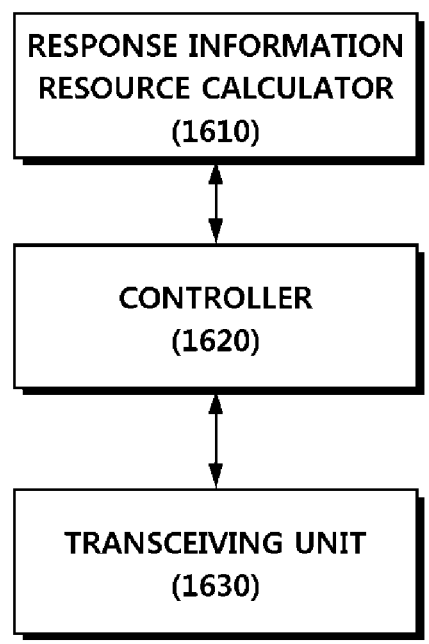
FIG. 16 is a diagram illustrating a configuration of a user equipment according to an embodiment of the present invention.

FIG. 16 is a diagram illustrating a configuration of a user equipment according to an embodiment of the present invention. An embodiment of a control channel may be a PDCCH that has been described above, and an embodiment of the data channel may be a PDSCH. Response information may be various such as ACK/NACK/DTX and the like.

The user equipment includes a response information resource calculator 1610, a controller 1620, and a transceiving unit 1630. In particular, the transceiving unit 1630 receives, from a base station, a control channel and a data channel which the control channel instructs data transmission. The response information resource calculator 1610 determines a transmission scheme or an amount of received data, and determines a scheme of generating response information with respect to the data and an allocation scheme indicating a response information resource based on the transmission scheme or the amount of received data, and calculates response information resource indication information using a value of a predetermined field of the control channel based on the allocation scheme. The controller 1620 generates the response information resource based on the scheme of generating the response information, and generates a control channel by including the generated response information in a resource indicated by the calculated indication information, and controls the transceiving unit 1630 to transmit the control channel to the base station.

The scheme of generating the response information may be one of a scheme of generating response information by bundling a plurality of pieces of response information and a scheme of generating response information by multiplexing a plurality of pieces of response information. The indication information for allocating a resource may be generated and transmitted by the base station based on an implicit or explicit allocation scheme. More particularly, the allocation scheme may be one of an implicit allocation scheme that implicitly performs calculation in a first field of the control channel and an explicit allocation scheme that explicitly performs calculation in a second field of the control channel. The first field is a field applied to calculation of an allocation resource of the control channel, and may correspond to $n_{CCE}$ that has been described above, and the second field is a field applied to calculation of power control information of the control channel, and may correspond to a TPC that has been described above.

Therefore, the response information resource calculator 1610 may calculate a resource based on an allocation scheme that is used based on an environment where the data is transmitted, and information associated with signaling performed with the base station, and the like. First, in the case of implicit allocation, a resource to be allocated in the first field ($n_{CCE}$) of the control channel is implicitly calculated and the corresponding resource is used as the response resource. In this example, when indicating a plurality of response information resources is required, a resource adjacent to the resource implicitly allocated in the first field may be allocated as the response information resource. This has been described through the example that allocates a response information resource by adding 1 or more to $n_{CCE}$.

In the case of the explicit allocation scheme, a resource to be allocated in the second field (TPC) of the control channel is explicitly calculated and the corresponding resource is used. An embodiment that uses cross carrier scheduling or performs bundling may include an example of indicating resource allocation of an ARI table using a TPC value. Also, in the case where two or more response information resources are indicated, two or more resource pairs may be allocated using the second field value.

The controller 1620 generates response information based on the scheme of generating the response information, includes the generated response information in the allocated resource (the resource calculated based on the indication information), and controls the transceiving unit 1630 to transmit the response information to the base station. The base station may perform an HARQ process based on the transmitted response information.

The data transmission scheme or the amount of received data, the scheme of generating the response information, and the resource allocation and indication scheme have been described with reference to FIGS. 4 through 12 and Tables 11 through 29. They may be variously selected based on varied transmission environments, and when a plurality of transmission schemes exist in a predetermined environment, the base station may perform, with respect to the user equipment, signaling associated with a scheme to be used in advance. The user equipment determines a region to which a response information resource is allocated based on an environment where the data is transmitted and information signaled by the base station, and includes response information in an allocated resource for transmission. The response information resource may be transmitted through an uplink control channel.

A response information resource indicator (ACK/NACK Resource Indicator, ARI) may be information indicated by a TPC field. An ARI_PAIR indicates a set of two or more resources, that is, resource sets. It means that an ARI value transmitted through a TPC field is one, but two or more resources are allocated through this. The mapping between an ARI and resources is as illustrated in Table 4 through Table 10. The ARI resource mapping table of Tables 4 through 10 may be transferred to a user equipment in advance through a higher layer signaling. That is, an explicitly allocated resource set and a corresponding ARI value may be transferred to the user equipment in advance through a higher layer signaling. Subframe_number shows information associated with a subframe that includes a TPC field to be used, for explicit information allocation, that is, for the use of the TPC field. Hereinafter, a method and apparatus for allocating a response information resource of SPS and transmitted data will be described.

The following embodiment includes indication information in a control channel and transmits the control channel so that the user equipment determines a resource where response information is to be stored based on an SNS, an increase in an amount of transmitted data, and a network configuration.

For this, semi-persistent scheduling transmission will be briefly described.

$N^{(1)}_{PUCCH}$ is a total number of PUCCH format 1/1a/1b resources required for Semi-Persistent Scheduling (SPS) transmission and SR (Service Request) transmission. In the case of the semi-persistent scheduling transmission and the SR (Service Request) transmission, a PDCCH indicating a corresponding PDSCH transmission does not exist and thus, a base station explicitly informs a user equipment of $N^{(1)}_{PUCCH}$.

A TPC value may be used as a value that induces a PUCCH resource with respect to SPS(Semi-Persistent Scheduling) transmission. That is, when all of the fields used for a DCI format are identical to Table 36, the user equipment recognizes that SPS is activated (SPS Activation).

TABLE 36

|  | DCI format 0 | DCI format 1/1A | DCI format 2/2A/2B/2C |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process Number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

When all of the fields used for a DCI format are identical to Table 37, the user equipment recognizes that SPS is released (SPS Release).

TABLE 37

|  | DCI format 0 | DCI format 1A |
|---|---|---|
| TPC command for sehceduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

SPS refers to a scheme of semi-statically scheduling a resource during a predetermined period of time. When the SPS is activated, the base station may not need to transmit scheduling information for each subframe. In general, the SPS is applicable to transmission and reception of voice data such as VoIP which is allocated once and causes little change in a resource, but this may not be limited thereto. The SPS may be activated or deactivated through a PCC. Unlike the SPS, a scheme that provides control information for each new data packet is referred to as Dynamic Scheduling.

When a DCI format is identical to 1/1A/1B/1C/1D and the like as shown in Table 38, it indicates that a base station transmits a codeword. The configuration of Table 38 associated with the DCI format is an embodiment, and this may be extendable.

TABLE 38

DCI format

| DCI Format | Description |
| --- | --- |
| 0 | used for the scheduling of PUSCH(Uplink grant) |
| 1 | used for the scheduling of one PDSCH codeword |
| 1A | used for the compact scheduling of one PDSCH codeword and random access procedure initiated by a PDCCH order |
| 1B | used for the compact scheduling of one PDSCH codeword with precoding information |
| 1C | used for very compact scheduling of one PDSCH codeword and notifying MCCH change |
| 1D | used for the compact scheduling of one PDSCH codeword with precoding and power offset information |
| 2 | used for scheduling PDSCH to UEs configured in spatial multiplexing mode |
| 2A | used for scheduling PDSCH to UEs configured in large delay CDD mode |
| 3 | used for the transmission of TPC commands for PUCCH and PUSCH with 2-bit power adjustments |
| 3A | used for the transmission of TPC commands for PUCCH and PUSCH with single bit power adjustments |

Referring to Tables 36 and 37, a TPC value for a downlink SPS scheduling may be used as index information (resource index) indicating PUCCH resource information as shown in the following Table 39.

TABLE 39

| Value of 'TPC command for PUCCH' | $n_{PUCCH}^{(1,p)}$ |
| --- | --- |
| '00' | The first PUCCH resource index configured by the higher layers |
| '01' | The second PUCCH resource index configured by the higher layers |
| '10' | The third PUCCH resource index configured by the higher layers |
| '11' | The fourth PUCCH resource index configured by the higher layers |

Referring to the configuration of table 39, in the case where a codeword is transmitted in a downlink when SPS scheduling is instructed, a TPC value may indicate a resource of a PUCCH, for example, a resource where response information is to be included. Table 39 shows four cases (four resource indices) indicating a single resource. Each resource index is set in a higher layer and is shared between the user equipment and the base station.

Therefore, when SPS and a single codeword are transmitted together, a resource that provides a piece of response information may be allocated. However, when two codewords are transmitted together with SPS, allocation of a resource to store two pieces of response information may be required. When channel selection is set, as many PUCCH format 1a/1b resources as a number of ACK/NACK bits may be required to send possible ACK/NACK bit values for each CW. Therefore, although it is a characteristic of the channel selection that two resources to store two pieces of response information are required, the present invention may not be limited thereto. This will be described with reference to FIG. 17.

Figure 17:
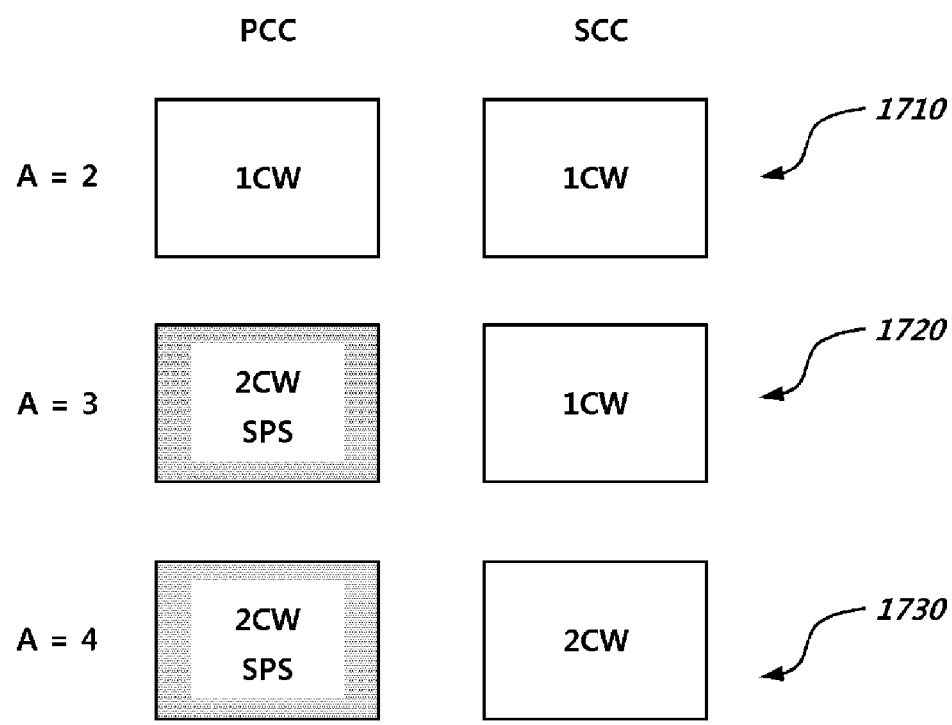
FIG. 17 is a diagram illustrating the case in which a response information resource is insufficient when SPS is transmitted together with dynamic allocation by a PDCCH.

FIG. 17 is a diagram illustrating the case in which a response information resource is insufficient when SPS is transmitted together with dynamic allocation by a PDCCH. As described above, when channel selection is set, as many PUCCH format 1a/1b resources as a number of ACK/NACK bits may be required to send possible ACK/NACK bit values for each CW. Therefore, although it is a characteristic of the channel selection that two resources to store two pieces of response information are required, the present invention may not be limited thereto. In 1710 of FIG. 17, 1CW is transmitted respectively through a PCC and an SCC. In this example, a TPC field of the PCC may be used as PI, that is, information controlling power, and a TPC (2 bit) of the SCC is configured to include response information resource indication information. In the example of 1710, 2 CW (1CW for the PCC, 1CW for the SCC) are transmitted and thus, two ACK/NACK resources (A=2) are required. This means that both the PCC and the SCC include dynamic allocation. With respect to a TPC field value of another SCC, an ARI mapping table that indicates a single resource may be used so that a response information resource may be allocated for a single codeword.

In 1720, 2CW is transmitted through the PCC and 1CW is transmitted through the SCC. Also, SPS is instructed in the PCC. That is, when the PCC is in a transmission mode that is capable of transmitting 2CW, and the SCC is in a transmission mode that may merely transmit 1CW, 1CW SPS transmission occurs through the PCC. A size of A/N information of channel selection may be determined based on a number of CCs and a transmission mode. In 1720, a total of 3 codewords (PCC: 2CW, SCC 1CW) are transmitted and thus, three ACK/NACK resources (A=3) are required. However, a single piece of response information resource may be indicated using a TPC field value through SPS, as shown in Table 39, and 2 response information resources may be required in the PCC since there is 2CW. That is, a single piece of response information resource is indicated through the SPS and thus, allocation for another response information resource may be required. With respect to 1CW transmitted through the SCC, an explicit or implicit scheme may be applied. Therefore, in 1720, SPS transmission occurs in the PCC of which the transmission mode supports 2 codewords and thus, there is a problem in that allocation for another resource is required in addition to the resource allocated for the SPS transmission.

In the same manner, in 1730 of FIG. 17, the PCC additionally requires another response information resource indication like 1720, and the SCC may indicate 2CW through an ARI indicating a set of two resources as shown in Table 5 or Table 6. However, indication information for allocating a single piece of response information resource in the PCC may not be included. Therefore, a scheme to supplement this may be required.

That is, as illustrated in FIG. 17, in the case where channel selection is set under a FDD/TDD CA environment (2CCs), when SPS transmission is performed in the PCC (2CW transmission mode) and dynamic scheduling is performed in a CC different from the PCC where the SPS is transmitted, there is a desire for a scheme of securing a resource required for channel selection transmission.

Figure 18:
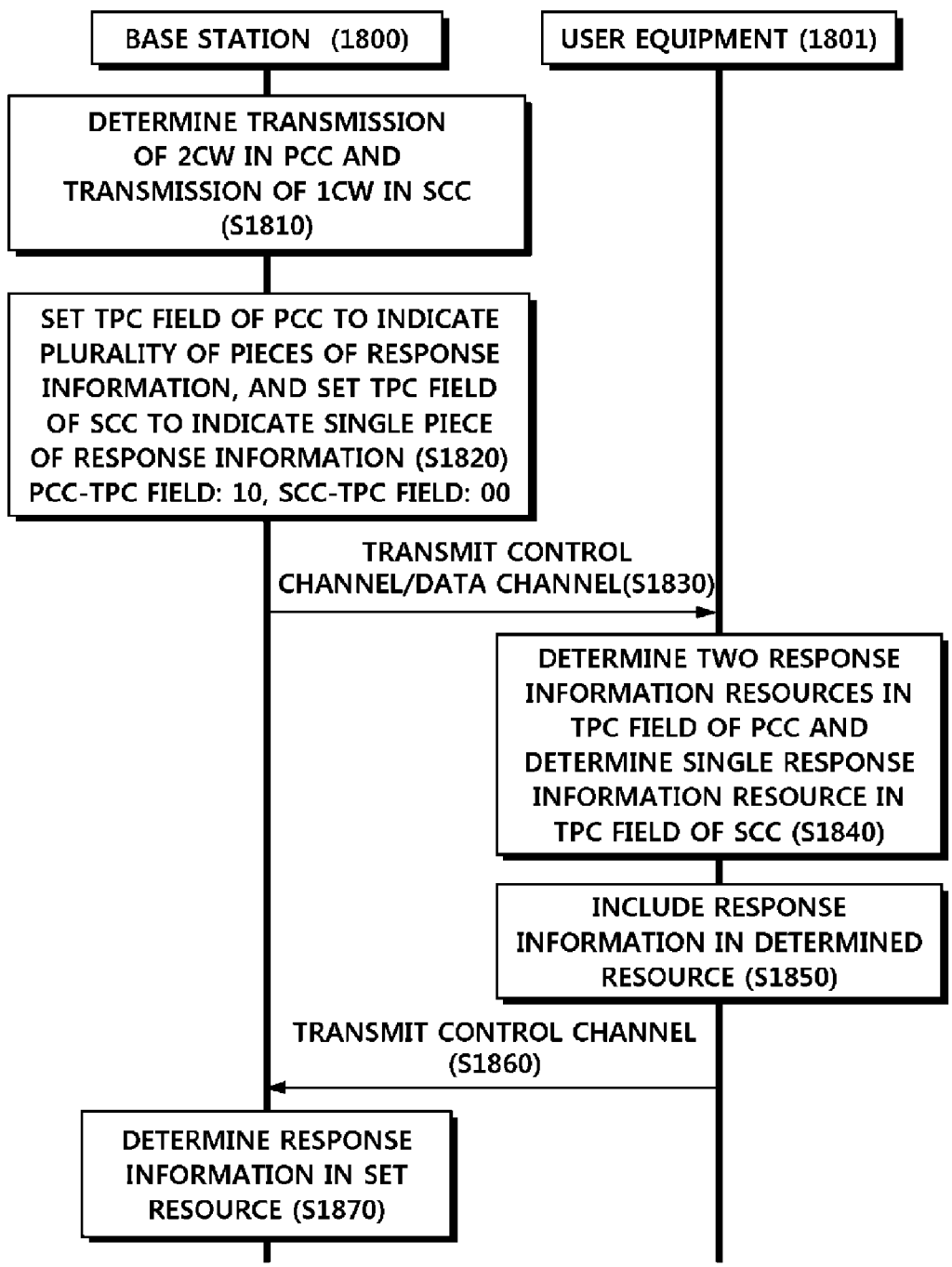
FIG. 18 is a diagram illustrating the case of indicating a response information resource when SPS and 2CW are transmitted through a PCC according to an embodiment of the present invention.

FIG. 18 is a diagram illustrating the case of indicating a response information resource when SPS and 2 CW are transmitted through a PCC according to an embodiment of the present invention. FIG. 18 provides the case that utilizes the ARI mapping table that has been described with reference to Table 4 through Table 10.

A base station 1800 determines SPS transmission in a PCC (2CW transmission mode) and transmission of 1CW in an SCC in step S1810. A TPC field of the PCC is set to indicate a plurality of pieces of response information in step S1820. That is, the TPC field of the PCC may be set to indicate a set of two resources using the ARI mapping table of Tables 5 and 6, unlike Table 39. For example, the value is set to '10' by applying Table 5, and a resource of {n5, n6} may be allocated. With respect to the SCC, a TPC field of a PDCCH indicating data transmitted in the SCC is set to indicate a resource pair for explicit resource allocation. The value may be applied to be '01' by applying Table 4, and in this example, {n2} may be allocated. That is, the response information resource indicator may indicate {n5, n6} and {n2}.

The base station 1800 transmits a control channel of which a TPC field is set to a predetermined value and a data channel to a user equipment 1801. An embodiment of the control channel is a PDCCH, and an embodiment of the data channel is a PDSCH. The user equipment determines, from information included in the received PDCCH, a response information resource indicator associated with a resource where response information is to be stored. That is, two response information resources are determined from a TPC field of the PCC, and a single response information resource is determined from a TPC field of the SCC. For example, when the field of the PCC is set to '10' of Table 5, a response information resource with respect to the two CWs (2CW) transmitted in the PCC may be {n5, n6}. When the TPC field of the PDCCH indicating the data transmitted in the SCC is set to '01' of Table 4, {n2} may be a response information resource. Subsequently, the user equipment 1801 is assigned with resources for control channel transmission with respect to the received three codewords, that is, {n5, n6} in the PCC and {n2} in the SCC in step S1850, and may transmit response information to the base station 1800 through the resources in step S1860. In this example, the control channel may be a PUCCH. The base station 1800 determines the response information included in the resource that is set in advance in step S1820, in step S1870, and determines whether to perform retransmission (HARQ process). The user equipment 1801 transmits a PUCCH or transmits a PUCCH together with a PUSCH. That is, when data to be transmitted in an uplink exists, the uplink data and the response information may be transmitted through a data channel by including response information in the data channel. When simultaneous transmission of a PUSCH and a PUCCH is set, UEs may transmit response information through the PUCCH and may transmit data information through the PUSCH. In general, when the PUSCH transmission does not exist, the response information may be transmitted through the PUCCH channel.

Although FIG. 18 illustrates the case where a single codeword is transmitted in the SCC, this may be applied to the case where two codewords are transmitted. That is, resource allocation may be performed so that a TPC field of a PDCCH indicating data transmitted in the SCC indicates two response information resources, as shown in Table 5 or Table 6. Therefore, when the TPC field of the PDCCH indicating the data transmitted in the SCC is '11' by applying Table 5, a pair of response information resources with respect to the two codewords transmitted in the SCC may be {n7, n8}.

That is, in the embodiment of FIG. 18, the ARI mapping table of Tables 4 through 10 may be utilized using a TPC field.

With respect to a CC(SCC) where SPS is not transmitted, an existing SPS resource table may be used as it is without performing dynamic scheduling. In this example, transmission may be performed using PUCCH format 1a/1b.

Figure 19:
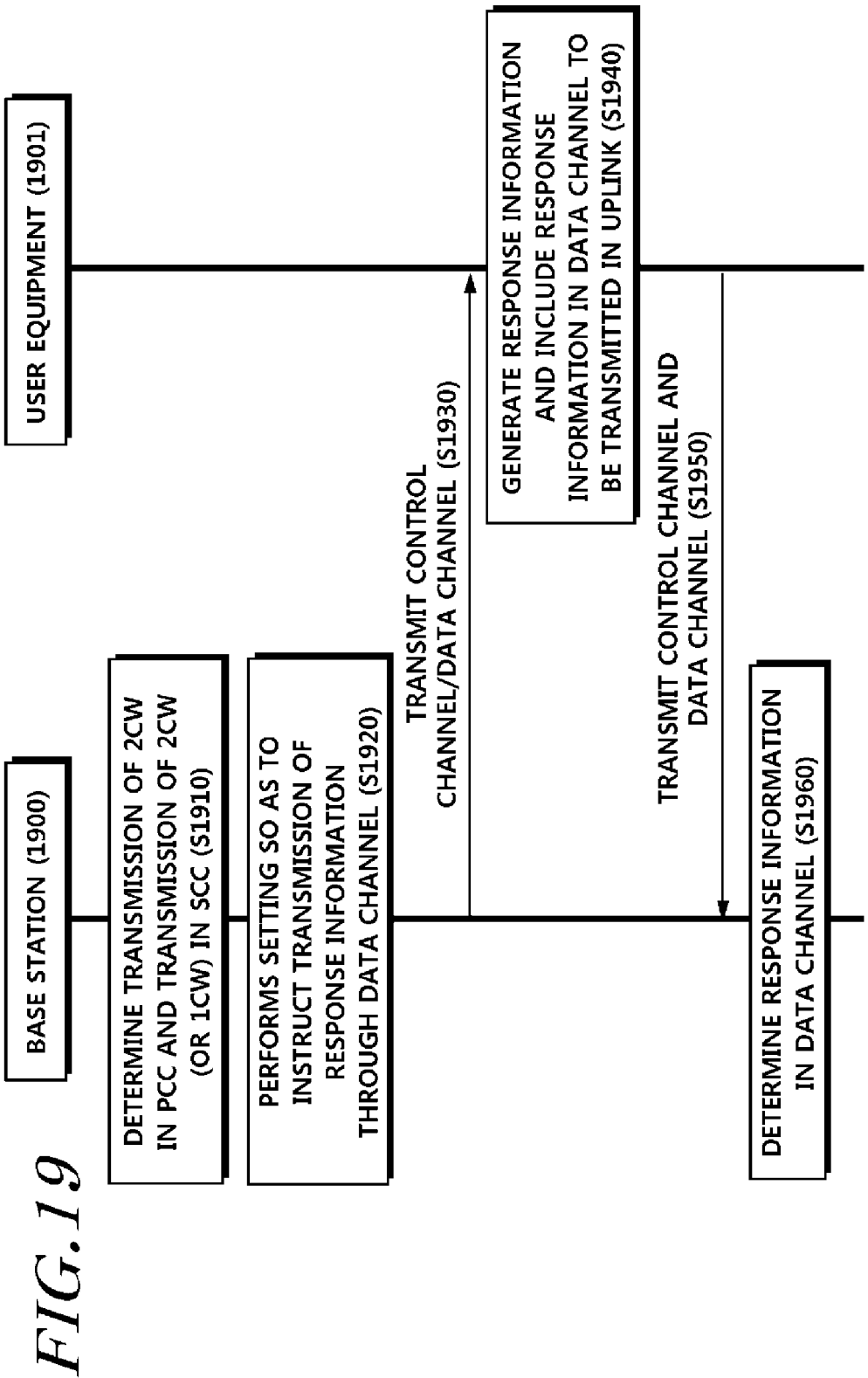
FIG. 19 is a diagram illustrating the case in which a response information resource is instructed to be included in a data channel when SPS and 2CW are transmitted through a PCC according to another embodiment of the present invention.

FIG. 19 is a diagram illustrating the case in which it is instructed that a response information resource is included in a data channel when SPS transmission of 2CW is performed through a PCC according to another embodiment of the present invention. Unlike FIG. 18, it is embodied that a user equipment does not use a control channel, which is a limited region, for transmitting response information but use a data channel for transmitting the response information. A base station 1900 determines transmission of 2CW in a PCC and 2CW (or 1CW) in an SCC in step S1910. The base station performs setting so as to instruct transmission of response information through a data channel in step S1920. The data channel may be a PUSCH. In this example, whether a resource of response information with respect to data transmitted in the PCC is PUSCH, and whether a resource of response information with respect to data transmitted in the SCC is PUSCH may be determined in advance and may be agreed between the base station/user equipment, and the configurations may be reported in step S1920. The base station 1900 transmits, to a user equipment 1901, a data channel and a control channel including configuration information instructing transmission of response information through a data channel. The user equipment 1901 generates response information in the transmitted control channel and the data channel, and includes the response information in a data channel to be transmitted in an uplink in step S1940. Subsequently, the user equipment 1901 transmits the control channel and the data channel to the base station 1900 in step S1950. The base station 1900 determines the response information transmitted in the data channel in step S1960, and determines whether to perform retransmission (HARQ process).

The embodiment of FIG. 19 provides an example of transmitting response information through a PUSCH as opposed to a PUCCH when PUSCH transmission exists. That is, the response information such as ACK/NACK may be transmitted through the PUSCH based on a piggyback scheme. When the PUSCH transmission does not exist, the scheme of FIG. 18 may be used.

Figure 20:
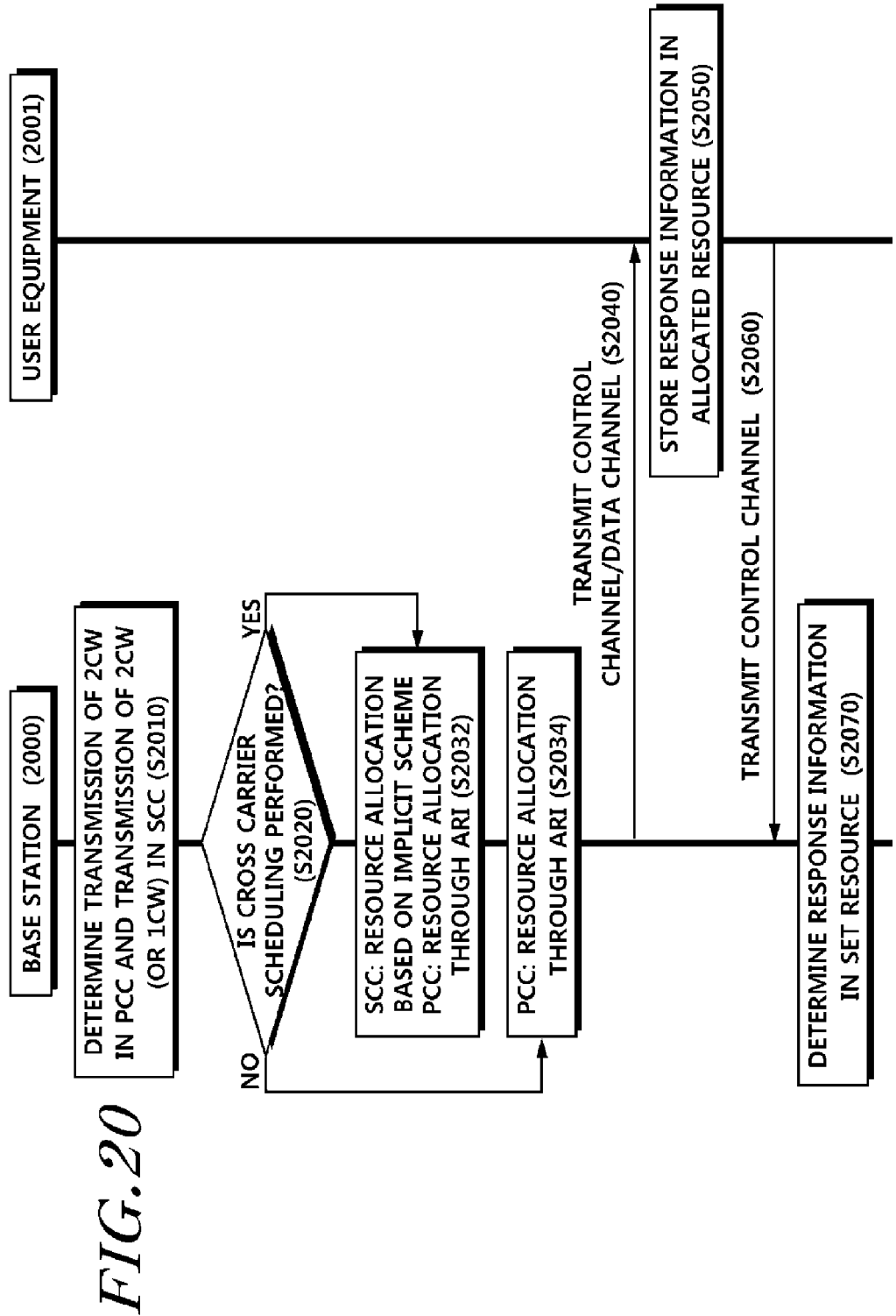
FIG. 20 is a diagram illustrating another embodiment that indicates a response information resource when SPS and 2CW are transmitted through a PCC according to an embodiment of the present invention.

FIG. 20 is a diagram illustrating another embodiment that indicates a response information resource when SPS and 2CW are transmitted through a PCC according to an embodiment of the present invention. FIG. 19 also shows the case of utilizing the ARI mapping table of Tables 4 through 10. FIG. 20 is capable of indicating one more resource required when SPS transmission is performed in a PCC of which a transmission mode is set to a 2CW transmission mode, using an ARI value allocated to the SCC. There are two cases. In the case of cross carrier scheduling, resource allocation with respect to the SCC may be performed by applying an implicit scheme that allocates a resource through nCCE and a value obtained by adding 1 to nCCE (n_CCE and n_CCE+1). An ARI is used as resource indication for the PCC.

In the case of non-cross carrier scheduling, an ARI is used for resource indication for PCC SPS 2CW. That is, in this example, an ACK/NACK resource for PCC SPS second CW may be indicated by an ARI of the SCC.

Hereinafter, detailed descriptions thereof will be provided with reference to FIG. 20. A base station 2000 determines a transmission mode for transmitting two codewords in a PCC. In an SCC, one or two codewords may be transmitted in step S2010. The base station 2000 determines whether cross carrier scheduling is performed in step S2020. When cross carrier scheduling is performed, the base station 2000 allocates one or two response information resources based on an implicit resource allocation ($n_{CCE}$ and $n_{CCE}+1$) with respect to the SCC. A resource with respect to one of the two codewords of the PCC may be allocated using an ARI of a PDCCH for PDSCH transmission on the SCC in step S2032. A single resource is allocated through an ARI and thus, mapping based on Table 4 as described above may be performed.

In the case of non-cross carrier scheduling, it is embodied that response information resources with respect to SPS 2 codewords are indicated using a TPC of the SCC as an ARI in step S2034. The base station transmits, to a user equipment, a control channel including indication information of an allocated resource and a data channel in step S2040.

The user equipment determines information ($n_{CCE}$, $n_{CCE}+1$, ARI, and the like) indicating allocation with respect to a resource based on whether cross carrier scheduling is performed, and stores response information in the corresponding resource in step S2050, and transmits a stored control channel in step S2060.

Transmitting a channel means transmitting information (control information, data information, and the like) through a channel.

The base station 2000 may determine response information transmitted in a data channel in step S2070, and may determine whether to perform retransmission (HARQ process).

Figure 21:
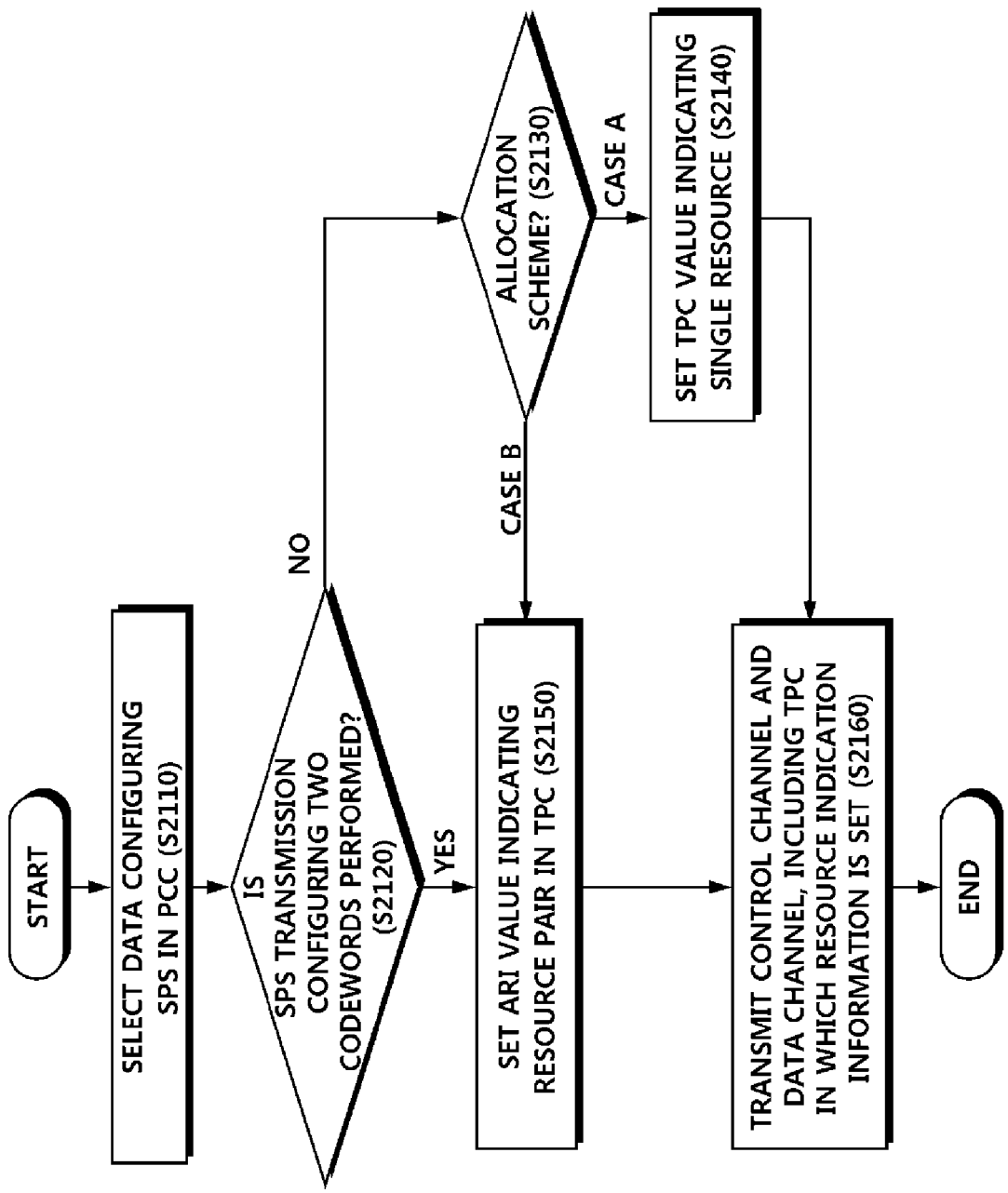
FIG. 21 is a diagram illustrating the indication of a response information resource when a number of codewords configuring SPS transmission is 1CW and when it is 2CW according to another embodiment of the present invention.

FIG. 21 is a diagram illustrating indicating a response information resource when a number of codewords configuring SPS transmission is 1CW and when it is 2CW according to another embodiment of the present invention.

When SCC transmission is performed in a PCC of which a transmission mode is set to a transmission mode for 2 codewords, indication for an additional resource for a piece of response information is required. For this, when SPS transmission configured of a single codeword is performed, resource allocation using a TPC field of Table 39 may be performed, and when SPS transmission is performed in a PCC of which a transmission mode is set to a transmission mode for two codewords, resource allocation may be performed by indicating a pair of resources by mapping a TPC field of Table 5 or Table 6 to an ARI. As another example, while a mapping table of Table 5 or Table 6 that indicates two resources are used, when SPS to transmission configured of a single codeword is performed, one resource of a pair of resources indicated by Table 5 or Table 6 may be used as a resource of response information. Case A corresponds to the case that selects one of Table 39 corresponding to a TPC table for mapping a single resource and Table 5 of an ARI mapping table for mapping two resources based on a number of transmitted codewords configuring SPS. Case B corresponds to the case that uses Table 5 corresponding to the ARI mapping table for mapping two resources and sets whether two mapped resources in a pair of resources or only one of the two resources is used, based on a number of codewords transmitted together with SPS. Detailed descriptions thereof will be described as follows. In FIG. 21, resource allocation associated with an SCC is left out of discussion.

Data configuring SPS is selected in a PCC in step S2110. Whether the corresponding SPS transmission data is configured of two codewords is determined in step S2120. When it is configured of two codewords, an ARI value indicating a resource pair indicating two resources as shown in Table 5 is set in a TPC in step S2150.

When it is configured of a single codeword, whether case A or case B is used is determined in step S2130. In the case of case B, Table 5 is applied equally although a single resource is required to be indicated. That is, an ARI value indicating a resource pair is set in a TPC in step S2150. Although it indicates a resource pair, one of the two resources actually stores response information. When a value of '01' is stored in the TPC, a first resource {n3} of two resources {n3, n4} is indicated to be used as a response information resource. In the case of case A, a TPC value of Table 39 is used to indicate a single resource. Therefore, when a value of '01' of Table 39 is stored in the TPC, a second resource {n2} of Table 39 is indicated to be used as a response information resource.

Figure 22:
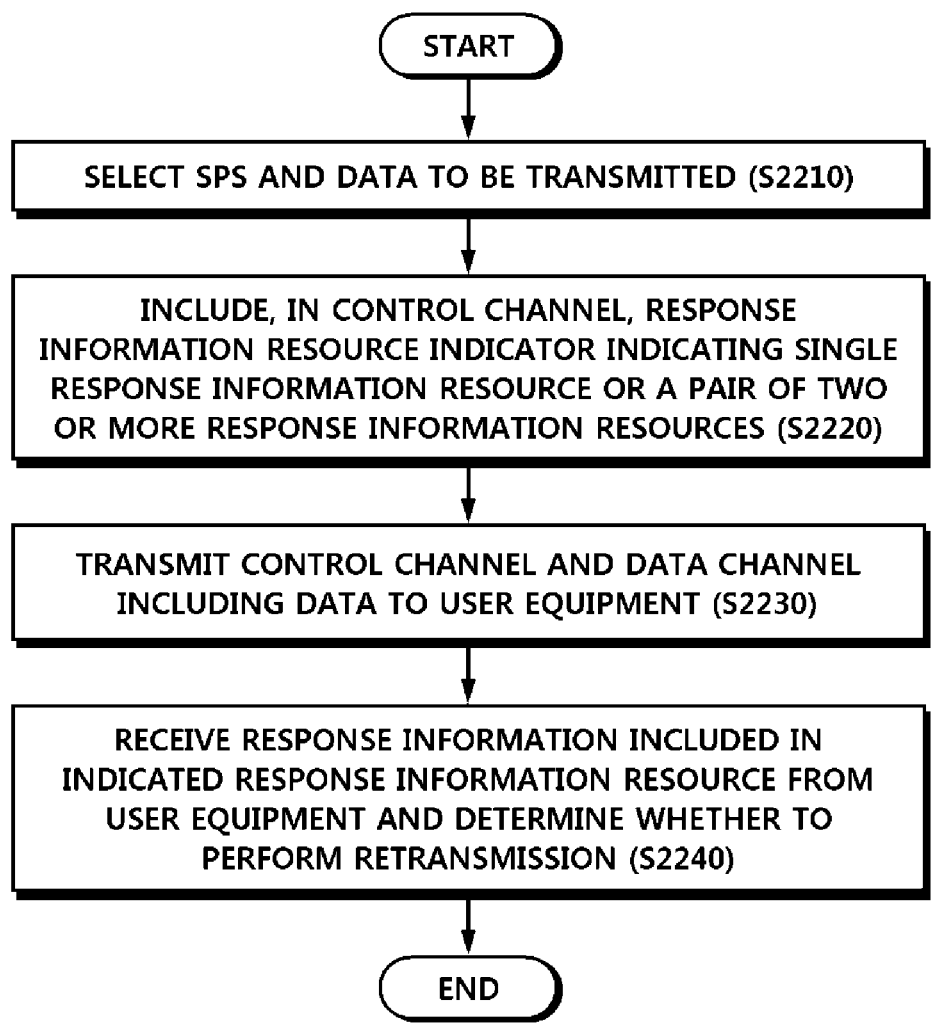
FIG. 22 is a diagram illustrating a process of indicating a resource where response information is to be stored when 2 codewords are transmitted in the case where a base station transmits SPS according to an embodiment of the present invention.

FIG. 22 is a diagram illustrating a process of indicating a resource where response information is to be stored when 2 codewords are transmitted in the case where a base station transmits SPS according to an embodiment of the present invention. An embodiment of a downlink control channel may be a PDCCH, and an embodiment of a downlink data channel may be a PDSCH. An embodiment of an uplink control channel may be a PUCCH, and an embodiment of an uplink data channel may be a PUSCH.

To implement the embodiments described with reference to FIGS. 18, 19, 20, and 21, the base station may perform a process of FIG. 22. First, the base station selects SPS to be transmitted and data required for two or more response information resources in step S2210.

The base station includes, in a control channel, response information resource indicator indicating a single piece of response information resource or a set of the two or more response information resources with respect to the selected data in step S2220. The base station transmits the control channel and a data channel including the data to a user equipment in step S2230, and the corresponding user equipment generates response information by verifying the received data, and includes the response information in an indicated resource for transmission. That is, the base station receives response information included in the indicated response information resource from the user equipment, and determines whether to perform retransmission in step S2240.

In regard to a response information resource indicator included in a control channel, according to an example of non-cross carrier scheduling in FIG. 18 and FIG. 20, the resource indicator may be set in a TPC field of a control channel of a PCC where SPS is transmitted. For example, when the SPS is transmitted in a first component carrier (PCC), and data requiring one or more response information resources is transmitted in a second component carrier (SCC), it is embodied that a response information resource indicator indicating a first response information resource and a second response information resource with respect to the two or more response information resources of the first component carrier is determined and the response information resource indicator is included in a TPC field of a control channel of the first component carrier. It is embodied that a response information resource indicator indicating a third response information resource with respect to the one or more response information resources of the second component carrier is determined and the response information resource indicator is included in a TPC field of a control channel of the second component carrier.

In the embodiment of FIG. 19, a response information resource indicator is embodied to indicate a response information resource to be transmitted in a data channel. That is, the embodiment enables the response information to be included in a PUSCH and thus, the data channel including the response information may be received from the user equipment and whether to perform retransmission may be determined.

In addition, like cross carrier scheduling of FIG. 20, a response information resource indicator indicating a first response information resource and a second response information resource with respect to two or more response information resources of the first component carrier (PCC) is determined and the response information resource indicator is included in the TPC field of the control channel of the first component carrier, and a parameter of the control channel is set so that one or more response information resources of the second component carrier (SCC) is implicitly calculated.

Also, it is embodied that a single resource is indicated by changing an ARI table to be included in a TPC, like case A of FIG. 21. For this, conversion of a mapping table (case A) when a single codeword is transmitted and when two codewords are transmitted, or allocation of response information to only one of resources even though a resource pair are indicated may be agreed between the base station and the user equipment in advance, In step S2240, the response information may be included in a control channel or a data channel of an uplink, and the control channel and the data channel of the uplink may be a PUCCH and a PUSCH, respectively. In the case where a data channel is included, the case of including response information in a PUSCH and receiving the response information based on a piggyback scheme, like FIG. 19, may be included.

Figure 23:
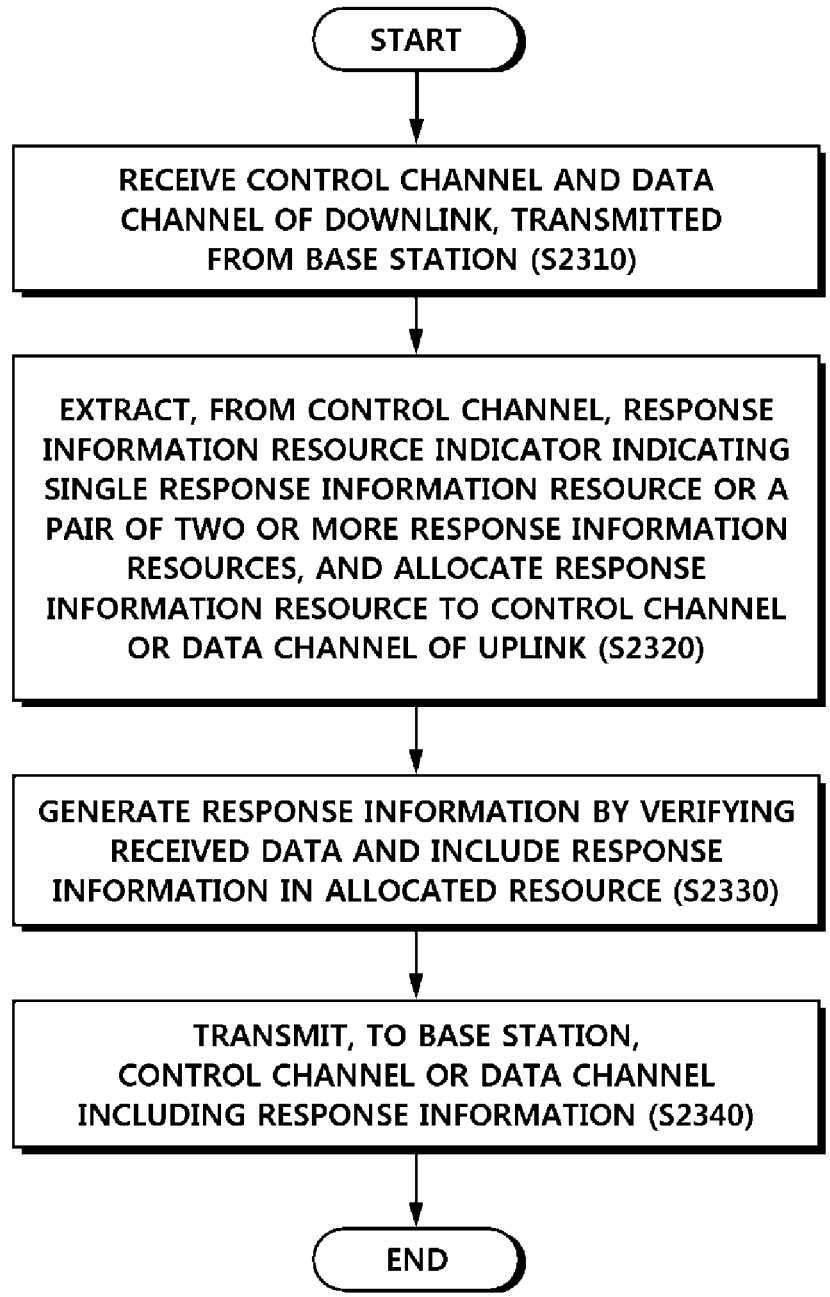
FIG. 23 is a diagram illustrating a process of indicating a resource where response information is to be stored when 2 codewords are transmitted in the case where a base station transmits SPS according to an embodiment of the present invention.

FIG. 23 is a diagram illustrating a process of indicating a resource where response information is to be stored when 2 codewords are transmitted in the case where a base station transmits SPS according to an embodiment of the present invention.

A user equipment receives a control channel and a data channel of a downlink transmitted by a base station in step S2310. An embodiment of the downlink control channel may be a PDCCH, and an embodiment of the downlink data channel may be a PDSCH. An embodiment of an uplink control channel may be a PUCCH and an embodiment of an uplink data channel may be a PUSCH.

When SPS is included in the received control channel, and two or more response information resources exist with respect to data received in a first component carrier where the SPS is included, the user equipment extracts a response information resource indicator indicating a response information resource or a set of two or more response information resources from the control channel, and allocates a response information resource to a control channel or a data channel of an uplink in step S2320.

Allocation of the response information resource may be various as described above. That is, as described in non-cross carrier scheduling in FIG. 18 and FIG. 20, when two component carriers exist, SPS is transmitted in a first component carrier (PCC), and data requiring one or more response information resources is transmitted in a second component carrier (SCC), the user equipment extracts a response information resource indicator included in a TPC field of a downlink control channel of the first component carrier and allocates two response information resources, and extracts a response information resource indicator included in a TPC field of a downlink control channel indicating data transmitted in the second component carrier and allocates a response information resource with respect to data transmitted in the second component carrier.

By applying the embodiment of FIG. 19, the response information resource indicator indicates a response information resource to be transmitted in a data channel, and allocation is performed so that the response information is included in the uplink data channel for transmission. In this example, the data channel may be a PUSCH.

By applying cross carrier scheduling of FIG. 20, when SPS is transmitted in a first component carrier (PCC), data requiring one or more response information resources is transmitted in a second component carrier (SCC), and cross carrier scheduling is performed between the first component carrier and the second component carrier, the user equipment extracts a value of a TPC field of a control channel of the first component carrier and allocates two or more response information resources of the first component carrier, and implicitly allocates one or more response information resources of the second component carrier based on a parameter of a downlink control channel that instructs data transmission of the second component carrier.

Through the allocation, the user equipment determines a resource where response information is to be included, and then generates response information by verifying received data and includes the response information in the allocated resource in step S2330. Also, the user equipment may generate response information by verifying the received data, and then may determine resource allocation. Accordingly, the order may be changed during an implementation process. When the user equipment transmits, to a base station, the control channel or data channel of the uplink including the response information in step S2340, the base station receives the same and determines whether to perform retransmission. The control channel or the data channel of the uplink may be a PUCCH and a PUSCH, respectively. In the case where a data channel is included, the case of including response information in a PUSCH and receiving the response information based on a piggyback scheme, like FIG. 19, may be included.

Also, like FIG. 21, an allocation scheme may be differently construed based on a transmitted codeword. For example, like case A of FIG. 21, a resource may be allocated based on an agreement that a TPC value indicates a single resource. That is, the user equipment receives SPS and a downlink control channel and data channel including data requiring a single piece of response information resource, extracts a response information resource indicator indicating a single piece of response information resource from a TPC field of the downlink control channel, allocates the single piece of response information resource to an uplink control channel, generates response information by verifying the received data of the downlink data channel, includes the response information in the allocated response information resource, and transmits the uplink control channel including the response information to the base station.

Figure 24:
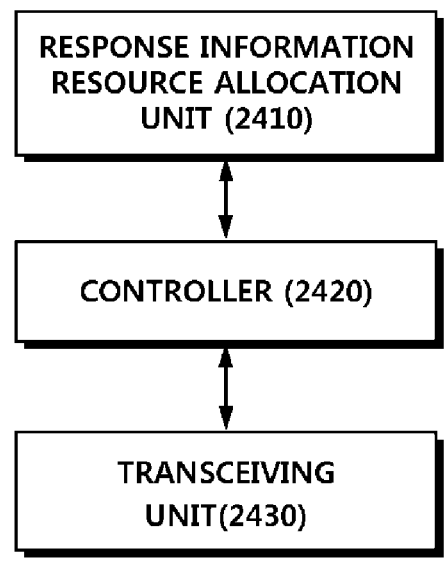
FIG. 24 is a diagram illustrating a configuration of a base station according to an embodiment of the present invention.

FIG. 24 is a diagram illustrating a configuration of a base station according to an embodiment of the present invention. The configuration of FIG. 24 may configure a base station, or may correspond to a component for embodying a module coupled with the base station. The entire configuration includes a response information resource allocating unit 2410, a controller 2420, and a transceiving unit 2430. The response information resource allocating unit 2410 allocates a space where response information for data to be transmitted is to be stored and includes indication information in a control channel so that a user equipment determines the same, or sets a predetermined parameter of the control channel so that the user equipment determines an implicitly allocated and indicated resource. Detailed descriptions thereof will be provided as follows. The response information resource allocating unit 2410 calculates a response information resource indicator indicating a single piece of response information resource or a set of two or more response information resources with respect to SPS to be transmitted and data requiring two or more response information resources. The controller 2420 includes the response information resource indicator in a downlink control channel, and the transceiving unit 2430 transmits, to the user equipment, the control channel and a data channel including the data, and receives, from the user equipment, response information included in the indicated response information resource.

The controller 2420 determines whether to perform retransmission based on the response information that the transceiving unit 2430 receives.

In varied embodiments of FIGS. 18 through 21, the response information resource allocating unit 2410 may allocates response information resource, and an example for each embodiment is described as follows. In the case of non-cross carrier scheduling in FIG. 18 and FIG. 20, when SPS is transmitted in a first component carrier, and data requiring one or more response information resources is transmitted in a second component carrier, the response information resource allocating unit 2410 determines a first response information resource indicator indicating a first response information resource and a second response information resource with respect to two or more response information resources of the first component carrier, and determines a second response information resource indicator indicating a third response information resource with respect to one or more response information resources of the second component carrier. The controller 2420 includes the first response information resource indicator in a TPC field of a control channel of the first component carrier, and includes the second response information resource indicator in a TPC field of a control channel of the second component carrier. Subsequently, the transceiving unit 2430 transmits the control channel.

Like FIG. 19, the response information resource allocating unit 2410 generates a response information resource indicator to indicate a response information resource to be transmitted in a data channel of an uplink, and when the transceiving unit 2430 receives data channel including response information from the user equipment, the controller 2420 determines whether to perform retransmission based on the response information included in the data channel.

Also, in the example of cross carrier scheduling of FIG. 6, when SPS is transmitted in the first component carrier, data requiring one or more response information resources is transmitted in the second component carrier, and cross carrier scheduling is performed between the first component carrier and the second component carrier, the response information resource allocating unit 2410 determines a first response information resource indicator indicating a first response information resource and a second response information resource with respect to two or more response information resources of the first component carrier, and determines a parameter of a control channel to be a second response information resource indicator so that one or more response information resources of the second component carrier is implicitly calculated. The controller 2420 includes the first response information resource indicator in a TPC field of a control channel of the first component carrier, and generates a control channel having a value of the second response information resource indicator as a parameter of the control channel. Subsequently, the transceiving unit 2430 transmits the control channel and a data channel.

Also, in the case of setting a different allocation scheme, that is, a different allocation table, like FIG. 21, the response information resource allocating unit 2410 sets, in a TPC field of a control channel, a response information resource indicator indicating a single piece of response information resource so as to indicate a single piece of response information resource with respect to SPS and data requiring a single piece of response information resource. When a single piece of response information resource is required, indicating a single resource through a TPC field may be agreed in advance between a base station and a user equipment.

Figure 25:
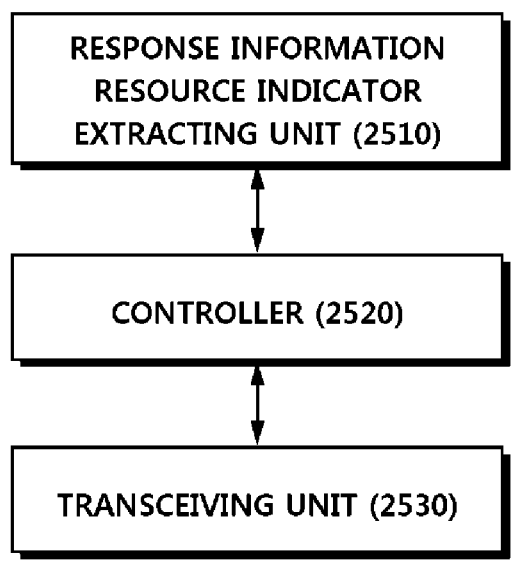
FIG. 25 is a diagram illustrating a configuration of a user equipment according to an embodiment of the present invention.

FIG. 25 is a diagram illustrating a configuration of a user equipment according to an embodiment of the present invention. The configuration of FIG. 25 may configure a user equipment, or may correspond to a component for embodying a module coupled with the user equipment. The entire configuration includes a response information resource indicator extracting unit 2510, a controller 2520, and a transceiving unit 2530. The transceiving unit 2530 receives a control channel and a data channel of a downlink, which are transmitted from a base station. When SPS is included in the received control channel, and two or more response information resources exist with respect to data received in a first component carrier where the SPS is included, the response information resource indicator extracting unit 2510 extracts, from the control channel, a response information resource indicator indicating a single piece of response information resource or a set of two or more response information resources. The controller 2520 allocates a response information resource in a control channel or a data channel of an uplink, which is indicated by the extracted response information resource indicator, generates response information by verifying the received data, and includes the response information in the allocated resource, and the transceiving unit 2530 transmits, to the base station, the control channel or the data channel of the uplink, which includes the response information.

In more particular, there are varied response information resource allocation schemes and indicator extraction schemes. In an example of non-cross carrier scheduling in FIG. 18 and FIG. 20, when SPS is transmitted in a first component carrier and data requiring one or more response information resources is transmitted in a second component carrier (SCC), the response information resource indicator extracting unit 2510 extracts a first response information resource indicator included in a TPC field of a downlink control channel of the first component carrier, and extracts a second response information resource indicator, indicating data transmitted in the second component carrier, included in a TPC field of a downlink control channel. The controller 2520 allocates two response information resources with respect to the data transmitted in the first component carrier to a resource indicated by the first response information resource indicator, and allocates a response information resource with respect to data transmitted in the second component carrier to a resource indicated by the second response information resource indicator.

By applying the embodiment of FIG. 19, the response information resource indicator indicates a resource transmitted in a data channel, and the controller 2520 includes the response information in the uplink data channel, and the transceiving unit 2530 transmits the uplink data channel. In more particular, to overcome a problem occurring when SPS data on a PCC (SPS Data on PCC) and general data on an SCC (general data on SCC) are simultaneously transmitted in the case where channel selection is set, ACK/NACK information may be included in a PUSCH for transmission when PUSCH allocation (PUSCH grant) exists. In this example, a response information resource indicator (ARI) may not be required.

By applying cross carrier scheduling of FIG. 20, when SPS is transmitted in a first component carrier (PCC), data requiring one or more response information resources is transmitted in a second component carrier (SCC), and cross carrier scheduling is performed between the first component carrier and the second component carrier, the response information resource indictor extracting unit 2510 extracts a value of a TPC field of a control channel of the first component carrier as a first response information resource indicator, and implicitly extracts a second response information resource indicator from a parameter of a downlink control channel that instructs data transmission of the second component carrier. The controller 2520 allocates two or more response information resources of the first component carrier to a resource indicated by the first response information resource indicator, and implicitly allocates one or more response information resources of the second component carrier to a resource indicated by the second response information resource indicator.

Through the allocation, a resource where response information is to be included is determined, and then response information is generated by verifying the received data and the response information is included in the allocated resource. Also, after response information is generated by verifying the received data, resource allocation may be determined. Accordingly, the order may be changed during an implementation process. When the control channel or data channel of an uplink including the response information is transmitted to a base station, the base station receives the same and determines whether to perform retransmission. The control channel or the data channel of the uplink may be a PUCCH and a PUSCH, respectively. In the case where a data channel is included, the case of including response information in a PUSCH and receiving the response information based on a piggyback scheme, like FIG. 19, may be included.

Also, like FIG. 21, an allocation scheme may be differently construed based on a transmitted codeword. For example, like case A of FIG. 21, a resource may be allocated based on an agreement that a TPC value indicates a single resource. That is, the transceiving unit 2530 receives SPS and a downlink control channel and data channel including data requiring a single piece of response information resource, and the response information resource indicator extracting unit 2510 extracts a response information resource indicator indicating a single piece of response information resource from a TPC field of the downlink control channel. The controller 2520 allocates the single piece of response information resource to an uplink control channel, generates response information by verifying the received data of the downlink data channel, and includes the response information in the allocated response information resource, and the transceiving unit 2530 transmits the uplink control channel including the response information to the base station.

In a wireless communication system according to an embodiment of the present invention that has been described with reference to FIGS. 17 through 25, a method for a wireless system using one or more component carriers to allocate a response information resource with respect to SPS and transmitted data includes including, in a downlink control channel, a response information resource indicator indicating a single piece of response information resource or a set of two or more response information resources with respect to SPS to be transmitted and data requiring two or more response information resources, transmitting, to a user equipment, the control channel and a data channel including the data, and receiving, from the user equipment, response information included in the indicated response information resource, and determining whether to perform retransmission.

In a wireless communication system according to another embodiment of the present invention, a method for a user equipment using one or more component carriers to allocate a response information resource with respect to SPS and transmitted data includes receiving a control channel and a data channel of a downlink, which are transmitted from a base station, when SPS is included in the received control channel and two or more response information resources exist with respect to data received in a first component carrier where the SPS is included, extracting, from the control channel, a response information resource indicator indicating a single piece of response information resource or a set of two or more response information resources, and allocating a response information resource to a control channel or a data channel of an uplink, generating response information by verifying the received data and including the response information in the allocated resource, and transmitting, to the base station, the control channel or the data channel of the uplink, including the response information.

A base station according to another embodiment of the present invention, a wireless system using one or more component carriers, includes a response information resource allocating unit to calculate a response information resource indicator indicating a single piece of response information resource or a set of two or more response information resources with respect to SPS to be transmitted and data requiring two or more response information resources, a controller to include the response information resource indicator in a downlink control channel, and a transceiving unit to transmit, to a user equipment, the control channel and a data channel including the data, and receives, from the user equipment, response information included in the indicated response information resource. The controller determines whether to perform retransmission based on the response information that the transceiving unit receives.

A user equipment according to another embodiment of the present invention, the user equipment using one or more component carriers includes a transceiving unit to receive a control channel and a data channel of a downlink, which are transmitted from a base station, a response information resource indicator extracting unit to extract, from the control channel, a response information resource indicator indicating a single piece of response information resource or a set of two or more response information resources when SPS is included in the received control channel and two or more response information resources exist with respect to data received in a first component carrier where the SPS is included, and a controller to allocate a response information resource to a resource of a control channel or a data channel of an uplink, which is indicated by the extracted response information resource indicator, to generate response information by verifying the received data, and to include the response information in the allocated resource. The transceiving unit transmits, to the base station, the control channel or data channel of the uplink, including the response information.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. A method of allocating a resource for response information transmission based on a transmission environment in a wireless communication system, the method comprising:
   determining a transmission scheme or an amount of data to be transmitted from a data channel to a user equipment, determining, based on the transmission scheme or the amount of data to be transmitted, a scheme of generating response information with respect to the data and an allocation scheme indicating a response information resource, and setting a value of a predetermined field of a control channel based on the allocation scheme;
   transmitting, to the user equipment, the control channel and the data channel including the data to be transmitted;
   determining response information transmitted from the user equipment with respect to the transmitted data in the resource allocated based on the allocation scheme; and
   determining whether to retransmit the transmitted data based on the determined response information,
   wherein the allocation scheme corresponds to one of an implicit allocation scheme that implicitly performs calculation in a first field of the control channel and an explicit allocation scheme that explicitly performs calculation in a second field of the control channel.

2. The method as claimed in claim 1, wherein the first field is applied to calculation of an allocation resource of the control channel, and the second field is applied to calculation of power control information of the control channel.

3. The method as claimed in claim 1, wherein, when two or more response information resources are indicated based on the implicit allocation scheme, a resource adjacent to a resource implicitly allocated in the first field is allocated as the response information resource.

4. The method as claimed in claim 1, wherein, when two or more response information resources are indicated based on the explicit allocation scheme, the second field includes indication information indicating a set of two or more resources.

5. The method as claimed in claim 1, wherein the scheme of generating the response information corresponds to one of a scheme of generating response information by bundling a plurality of pieces of response information and a scheme of generating response information by multiplexing a plurality of pieces of response information.

6. A method of allocating a resource for response information transmission based on a transmission environment, and performing transmission in a wireless communication system, the method comprising:
   receiving, by a user equipment from a base station, a control channel and a data channel which the control channel instructs data transmission;
   determining a transmission scheme or an amount of received data, determining, based on the transmission scheme or the amount of received data, a scheme of generating response information with respect to the data and an allocation scheme indicating a response information resource, and calculating response information resource indication information using a value of a predetermined field of the control channel based on the allocation scheme; and
   generating the response information resource based on the scheme of generating the response information, and including the generated response information in a resource indicated by the calculated indication information for transmission to the base station,
   wherein the allocation scheme corresponds to one of an implicit allocation scheme that implicitly performs calculation in a first field of the control channel and an explicit allocation scheme that explicitly performs calculation in a second field of the control channel.

7. The method as claimed in claim 6, wherein the first field is applied to calculation of an allocation resource of the control channel, and the second field is applied to calculation of power control information of the control channel.

8. The method as claimed in claim 6, wherein two or more response information resources are indicated based on the implicit allocation scheme, a resource adjacent to a resource implicitly allocated in the first field is allocated as the response information resource.

9. The method as claimed in claim 6, wherein, when two or more response information resources are indicated based on the explicit allocation scheme, the second field includes indication information indicating a set of two or more resources.

10. The method as claimed in claim 6, wherein generating the response information corresponds to one of a scheme of generating response information by bundling a plurality of pieces of response information and a scheme of generating response information by multiplexing a plurality of pieces of response information.

11. A base station, comprising:
    a response information resource determining unit to determine a transmission scheme or an amount of data to be transmitted from a data channel to a user equipment, to determine, based on the transmission scheme or the amount of data to be transmitted, a scheme of generating response information with respect to the data and an allocation scheme indicating a response information resource;
    a controller to set a value of a predetermined field of a control channel based on the determined allocation scheme; and
    a transceiving unit to transmit the control channel and a data channel including data to be transmitted to the user equipment, and to receive, from the user equipment, response information transmitted with respect to the transmitted data in a resource allocated based on the allocation scheme,
    wherein the controller determines the transmitted response information and determines whether to retransmit the transmitted data based on the determined response information, and the allocation scheme corresponds to one of an implicit allocation scheme that implicitly performs calculation in a first field of the control channel and an explicit allocation scheme that explicitly performs calculation in a second field of the control channel, and the first field is applied to calculation of an allocation resource of the control channel and the second field is applied to calculation of power control information of the control channel.

12. The base station as claimed in claim 11, wherein generating the response information corresponds to one of a scheme of generating response information by bundling a plurality of pieces of response information and a scheme of generating response information by multiplexing a plurality of pieces of response information.

13. A user equipment, comprising:
- a transceiving unit to receive, by the user equipment from a base station, a control channel and a data channel which the control channel instructs data transmission;
- a response information resource calculator to determine a transmission scheme or an amount of received data, to determine, based on the transmission scheme or the amount of received data, a scheme of generating response information with respect to the data and an allocation scheme to indicate a response information resource, and to calculate response information resource indication information using a value of a predetermined field of the control channel based on the allocation scheme; and
- a controller to generate the response information resource based on the scheme of generating the response information, and to include the generated response information in a resource indicated by the calculated indication information for generation of a control channel,
- wherein the controller controls the transceiving unit to transmit the control channel to the base station, the allocation scheme corresponds to one of an implicit allocation scheme that implicitly performs calculation in a first field of the control channel or an explicit allocation scheme that explicitly performs calculation in a second field of the control channel, and the first field is applied to calculation of an allocation resource of the control channel and the second field is applied to calculation of power control information of the control channel.

14. The user equipment as claimed in claim 13, wherein generating the response information corresponds to one of a scheme of generating response information by bundling a plurality of pieces of response information and a scheme of generating response information by multiplexing a plurality of pieces of response information.

* * * * *